(12) United States Patent
Fritz et al.

(10) Patent No.: US 8,431,180 B2
(45) Date of Patent: Apr. 30, 2013

(54) PAINT SHOP AND METHOD OF OPERATING A PAINT SHOP

(75) Inventors: Hans-Georg Fritz, Ostfildern (DE); Jens Holzheimer, Tamm (DE); Dietmar Wieland, Waiblingen (DE); Frank Herre, Oberriexingen (DE); Jürgen Weschke, Weil der Stadt (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/163,316

(22) Filed: Jun. 17, 2011

(65) Prior Publication Data

US 2011/0274827 A1 Nov. 10, 2011

Related U.S. Application Data

(63) Continuation of application No. PCT/EP2009/001305, filed on Feb. 24, 2009.

(30) Foreign Application Priority Data

Dec. 19, 2008 (DE) .......................... 10 2008 064 043

(51) Int. Cl.
*B05D 1/00* (2006.01)
*B05D 3/04* (2006.01)
*B01D 46/04* (2006.01)
*B01D 37/02* (2006.01)

(52) U.S. Cl.
USPC .............. 427/8; 118/610; 118/712; 427/345; 427/421.1

(58) Field of Classification Search .................. 55/385.1; 95/278, 279; 118/309, 603, 610, 612, 694, 118/712; 427/8, 185, 345, 421.1, 426; 454/50, 454/51, 52, 66

See application file for complete search history.

(56) References Cited

U.S. PATENT DOCUMENTS

| 1,710,469 | A | 4/1929 | Boardman |
| 3,041,808 | A | 7/1962 | Snyder |

(Continued)

FOREIGN PATENT DOCUMENTS

| CA | 2043549 A1 | 12/1991 |
| CA | 2697442 A1 | 3/2009 |

(Continued)

OTHER PUBLICATIONS

European Patent Office, International Search Report in International Application No. PCT/EP2009/001305 (Oct. 6, 2009).

(Continued)

*Primary Examiner* — Michael Cleveland
*Assistant Examiner* — Alexander Weddle
(74) *Attorney, Agent, or Firm* — Leydig, Voit & Mayer, Ltd.

(57) ABSTRACT

In a paint plant which comprises at least one spray-painting device incorporating at least one application unit for painting workpieces and in particular motor vehicle bodies with a fluid paint, in order to enable the fluid paint overspray i.e. the paint particles which are not adhering to the workpieces that are to be painted and which are picked up and carried along in an air flow passing through the application area of the paint shop, to be re-separated from this air flow and also to enable the cleansed air flow to be returned to the application area in an air re-circulating system or else expelled into the environment of the plant, the paint shop comprises a device for separating fluid paint overspray from a stream of crude gas that contains overspray particles wherein this device comprises at least one filter element for separating the overspray from the stream of crude gas.

12 Claims, 35 Drawing Sheets

U.S. PATENT DOCUMENTS

| | | | |
|---|---|---|---|
| 4,010,013 | A | 3/1977 | Murayama |
| 4,094,654 | A | 6/1978 | Prinzing |
| 4,417,541 | A | 11/1983 | Schäfer |
| 4,422,576 | A | 12/1983 | Saito et al. |
| 4,464,184 | A | 8/1984 | Cera et al. |
| 5,020,470 | A | 6/1991 | West et al. |
| 5,326,599 | A | 7/1994 | Shutic |
| 5,591,240 | A | 1/1997 | Ophardt et al. |
| 6,230,470 | B1 | 5/2001 | Kimmerle et al. |
| 7,163,359 | B2 | 1/2007 | Moser |
| 7,478,976 | B2 | 1/2009 | Kleineidam et al. |
| 7,785,420 | B2 | 8/2010 | Beijbom et al. |
| 2001/0011522 | A1* | 8/2001 | Nelen .......................... 118/695 |
| 2002/0020347 | A1 | 2/2002 | Gelain |
| 2005/0019106 | A1 | 1/2005 | Moser |
| 2005/0095071 | A1 | 5/2005 | Kleineidam et al. |
| 2006/0196416 | A1* | 9/2006 | Shutic et al. .................. 118/326 |
| 2008/0229925 | A1 | 9/2008 | Wieland et al. |
| 2008/0229926 | A1* | 9/2008 | Wieland et al. ................. 95/278 |
| 2009/0209188 | A1 | 8/2009 | Wieland et al. |
| 2010/0197213 | A1 | 8/2010 | Holzheimer et al. |
| 2010/0199912 | A1 | 8/2010 | Holzheimer et al. |
| 2011/0045194 | A1 | 2/2011 | Herre et al. |

FOREIGN PATENT DOCUMENTS

| | | |
|---|---|---|
| DE | 70 14 433 U1 | 4/1970 |
| DE | 24 49 065 A1 | 4/1976 |
| DE | 25 29 127 A1 | 10/1976 |
| DE | 81 15 387 U1 | 12/1981 |
| DE | 31 30 096 A1 | 5/1982 |
| DE | 39 25 818 A1 | 2/1991 |
| DE | 42 11 465 A1 | 10/1993 |
| DE | 42 38 378 A1 | 5/1994 |
| DE | 43 03 753 A1 | 8/1994 |
| DE | 196 10 566 A1 | 9/1994 |
| DE | 69103218 T2 | 12/1994 |
| DE | 295 08 187 U1 | 7/1995 |
| DE | 44 11 058 A1 | 10/1995 |
| DE | 694 03 003 T2 | 8/1997 |
| DE | 694 04 175 T2 | 10/1997 |
| DE | 197 36 331 A1 | 10/1998 |
| DE | 695 04 511 T2 | 5/1999 |
| DE | 299 07 779 U1 | 7/1999 |
| DE | 199 24 130 A1 | 12/2000 |
| DE | 100 28 553 A1 | 12/2001 |
| DE | 101 09 574 C2 | 9/2002 |
| DE | 101 30 173 A1 | 1/2003 |
| DE | 197 05 523 C2 | 1/2003 |
| DE | 202 18 192 U1 | 3/2003 |
| DE | 202 20 435 U1 | 7/2003 |
| DE | 103 41 979 A1 | 3/2005 |
| DE | 103 50 332 A1 | 5/2005 |
| DE | 103 61 266 A1 | 7/2005 |
| DE | 199 24 130 B4 | 8/2005 |
| DE | 102005013709 A1 | 9/2006 |
| DE | 102005013711 A1 | 9/2006 |
| DE | 102005048579 A1 | 4/2007 |
| DE | 102005048580 A1 | 4/2007 |
| DE | 202006009381 U1 | 8/2007 |
| DE | 202007010385 U | 2/2008 |
| DE | 102007048248 A1 | 5/2009 |
| EP | 0 415 511 A1 | 3/1991 |
| EP | 0 645 193 A1 | 3/1995 |
| EP | 0 761 577 A1 | 3/1997 |
| EP | 1 512 465 A1 | 3/2005 |
| EP | 1 427 536 B1 | 8/2005 |
| EP | 1 704 925 A2 | 9/2006 |
| EP | 1 704 926 A2 | 9/2006 |
| GB | 598428 A | 2/1948 |
| GB | 2 035 834 A | 6/1980 |
| JP | 49-047227 A | 11/1975 |
| JP | 52-020524 A | 5/1977 |
| JP | 53-109274 A | 9/1978 |
| JP | 56-048263 A | 5/1981 |
| JP | 59-206075 A | 11/1984 |
| JP | 02-123025 A | 5/1990 |
| JP | 06-278868 A | 10/1994 |
| JP | 07-037311 U | 7/1995 |
| JP | 07-251021 A | 10/1995 |
| JP | 09-299732 A | 11/1997 |
| JP | 10-296026 A | 11/1998 |
| JP | 2008-536661 T | 9/2008 |
| WO | WO 91/16141 A | 10/1991 |
| WO | WO 99/12657 A1 | 3/1999 |
| WO | WO 01/36108 A1 | 5/2001 |
| WO | WO 03/024612 A1 | 3/2003 |
| WO | WO 2004/000497 A1 | 12/2003 |
| WO | WO 2004/087331 A1 | 10/2004 |
| WO | WO 2006/099999 A1 | 9/2006 |
| WO | WO 2006/100001 A1 | 9/2006 |
| WO | WO 2007/039275 A1 | 4/2007 |
| WO | WO 2007/039276 A1 | 4/2007 |
| WO | WO 2007039275 A1 * | 4/2007 |
| WO | WO 2009/026984 A1 | 3/2009 |
| WO | WO 2009/026986 A1 | 3/2009 |
| WO | WO 2009/026987 A1 | 3/2009 |

OTHER PUBLICATIONS

European Patent Office, Examination Report in European Application No. 09 177 930.6 (Nov. 10, 2011).

* cited by examiner

PAINT SHOP AND METHOD OF OPERATING A PAINT SHOP

RELATED APPLICATION

This application is a continuation application of PCT/EP2009/001305 filed Feb. 24, 2009, the entire specification of which is incorporated herein by reference.

FIELD OF DISCLOSURE

The present invention relates to a paint shop which comprises at least one painting device incorporating at least one application unit for painting workpieces and especially vehicle bodies with a fluid paint, and a device for separating fluid paint overspray from a stream of crude gas containing overspray particles, wherein this device comprises at least one filter element for separating the overspray from the stream of crude gas.

Such a paint shop enables the fluid paint overspray, i.e. the fluid paint which is not adhering to the workpieces that are to be painted and which is picked up and carried along in the form of overspray particles by an air flow passing through the application area of the paint shop, to be re-separated from this air flow and also enables the cleansed air flow to be returned to the application area in an air re-circulating system or expelled into the environment of the plant.

The term "fluid paint" is used in this description and in the accompanying Claims—in contrast to the term "powder coating"—to designate a paint having a fluidic consistency, from liquid to pasty (in the case of a PVC paint for example). In particular, the term "fluid paint" encompasses the terms "liquid paint" and "wet paint".

The overspray particles of which the fluid paint overspray consists may be solid or liquid particles and in particular, droplets.

SUMMARY OF THE INVENTION

In a special embodiment of the invention, provision is made for the device for separating fluid paint overspray from the stream of crude gas containing overspray particles to comprise at least one filter device for separating fluid paint overspray from the stream of crude gas containing overspray particles which comprises at least one filter element for separating the overspray from the stream of crude gas and at least one auxiliary material reservoir for accommodating a filtering material, wherein the filter device comprises at least one inlet opening through which the stream of crude gas enters the filter device such that it is directed into the auxiliary material reservoir.

Hereby, the auxiliary material serves as a barrier layer which is deposited on the surfaces of the filter element in order to prevent these surfaces from sticking together due to the adhering overspray particles. Furthermore, the auxiliary material serves to achieve the effect that the filter cake in the filter element remains passable to a flowing medium and is not closed.

By periodically cleaning the filter elements of the filter device, the mixture of auxiliary material and fluid paint overspray passes from the filter elements into the auxiliary material reservoir and from there, it can be e.g. sucked out so as to be fed back to the paint shop for renewed use as an auxiliary material.

Furthermore, the mixture of auxiliary material and fluid paint overspray present in the auxiliary material reservoir may be whirled up by means of blasts of compressed air from a compressed air lance so that it rises up from the auxiliary material reservoir and is then deposited on the filter elements.

The fluidic particle-like auxiliary material is also referred to as a "precoat" material or filter aid material.

The described arrangement of the filter device enables auxiliary material to be applied to the at least one filter element in a simple and efficient manner without the auxiliary material entering the application area in which the stream of crude gas absorbs the fluid paint overspray.

Preferably, provision is made for the inlet opening of the filter device to be configured and oriented in such a manner that the stream of crude gas enters the filter device such that it is directed into the auxiliary material reservoir in that it is diverted in an interior space of the auxiliary material reservoir.

Due to the fact that the stream of crude gas is diverted directly into the auxiliary material reservoir, the effect is achieved that an adequate quantity of auxiliary material is supplied to the stream of crude gas and/or that an adequate quantity of auxiliary material which has been whirled up by means of a fluidising device is carried from the auxiliary material reservoir to the at least one filter element by the stream of crude gas.

The stream of crude gas enters a filter device through the inlet opening, said filter device being otherwise closed with respect to the flow path of the stream of crude gas located prior to the inlet opening and also with respect to the application area of the paint shop. It is thereby ensured furthermore, that no auxiliary material from the auxiliary material reservoir will get into the flow path of the stream of crude gas located prior to the inlet opening or into the application area since, for this to happen, this auxiliary material would have to move against the direction of flow of the stream of crude gas through the inlet opening.

By virtue of using such a filter device, one may dispense with an additional nozzle arrangement for injecting auxiliary material into the stream of crude gas.

Furthermore, it is not necessary when using such a filter device to temporarily close parts of the flow path of the stream of crude gas from the application area to the filter device during the process of introducing auxiliary material into the stream of crude gas.

Preferably, the auxiliary material is introduced into the stream of crude gas exclusively within the filter device, after the stream of crude gas has passed the inlet opening of the filter device.

In order to enable the direction of flow of the stream of crude gas to be orientated in as precise a manner as possible, provision is preferably made for the inlet opening to be in the form of an inlet channel extending in the direction of flow of the stream of crude gas.

In order to increase the maximum rate of flow of the stream of crude gas in the inlet channel, provision may be made for the inlet channel to have a through-flow cross section which narrows in the direction of flow of the stream of crude gas up to a narrow section.

In order to reduce the rate of flow of the stream of crude gas after its passage through the narrow section at which the stream of crude gas exhibits its maximum rate of flow and thereby prevent the stream of crude gas from striking the auxiliary material in the auxiliary material reservoir at too high a rate of flow, provision may be made for the inlet channel to have a through-flow cross section which expands in the direction of flow of the stream of crude gas onwardly from a narrow section.

In a preferred embodiment of the invention, the inlet opening is bounded downwardly by a lower guidance surface.

For the purposes of guiding the stream of crude gas into the auxiliary material reservoir in the desired manner, it is expedient if the lower guidance surface is inclined to the horizontal at least in sections thereof, namely in particular, such that the lower guidance surface is inclined downwardly—as seen in the direction of flow of the stream of crude gas.

It has proved to be particularly expedient, if the lower guidance surface is inclined to the horizontal at least in sections thereof at an angle of at least approximately 30°, preferably at an angle of at least approximately 40°.

Furthermore, it has proved to be expedient for the lower guidance surface to be inclined to the horizontal at least in sections thereof at an angle of at most approximately 75°, preferably of at most approximately 65°.

In order to prevent the stream of crude gas breaking-away from the lower guidance surface and to ensure a directed flow into the auxiliary material reservoir, it is of advantage if the lower guidance surface has an upper section and a lower section which follows on the upper section in the direction of flow of the stream of crude gas, wherein the lower section is inclined to the horizontal to a greater extent than the upper section.

Furthermore, it is expedient for the guidance of the stream of crude gas, if the inlet opening is bounded upwardly by an upper guidance surface.

Preferably, the upper guidance surface is also inclined to the horizontal at least in sections thereof, namely in particular, in such a manner that the upper guidance surface is inclined downwardly—as seen in the direction of flow of the stream of crude gas.

Hereby, it has proved to be expedient for the upper guidance surface to be inclined to the horizontal at least in sections thereof at an angle of at least approximately 30°, preferably at an angle of at least approximately 40°.

Moreover, it has proved to be expedient for the upper guidance surface to be inclined to the horizontal at least in sections thereof at an angle of at most approximately 75°, preferably at an angle of at most approximately 65°.

The average rate of flow of the stream of crude gas when passing the narrowest part of the inlet opening should be sufficiently high as to prevent auxiliary material or fluid paint overspray that has been cleaned off the at least one filter element from leaking out through the inlet opening.

Preferably, the average rate of flow of the stream of crude gas when passing the narrowest part of the inlet opening amounts to at least approximately 2 m/s, and in particular, to at least approximately 3 m/s.

Furthermore, it has proved to be expedient for the average rate of flow of the stream of crude gas when passing the narrowest part of the inlet opening to amount to at most approximately 8 m/s, preferably to at most approximately 5 m/s.

In order to achieve a well oriented stream of crude gas into the auxiliary material reservoir, the inlet opening is preferably configured in such a way that the stream of crude gas does not break-away in the region of the inlet opening.

In order to achieve the effect that the stream of crude gas loaded with overspray comes into contact with as few components of the filter device upon which the overspray could settle as possible before reaching the at least one filter element, it is of advantage if the auxiliary material reservoir is constructed and arranged relative to the inlet opening in such a manner that the stream of crude gas emerging from the inlet opening is diverted in the auxiliary material reservoir towards the at least one filter element.

In order to achieve the effect that as little auxiliary material as possible reaches the region of the inlet opening of the filter device, it is expedient for the filter device to comprise at least one restraining element which keeps the auxiliary material from the auxiliary material reservoir away from the inlet opening.

Such a restraining element is particularly effective, if it projects into an interior space of the filter device and/or into an interior space of the auxiliary material reservoir.

In a preferred embodiment of the invention, provision is made for the restraining element, which may be in the form of a restraining metal plate for example, to form a lower boundary of the inlet opening.

In this case in particular, provision may be made for the restraining element to comprise a section of a guidance surface for the stream of crude gas which is inclined to the horizontal to a greater extent than a further section of the guidance surface that is located before the section of the guidance surface arranged on the restraining element in the direction of flow of the stream of crude gas. The stream of crude gas is thereby effectively prevented from breaking-away from the guidance surface.

Furthermore, it is of advantage for the filter device to comprise at least one filter shielding element which is constructed and arranged in such a manner that it prevents the crude gas entering the filter device from the inlet opening from flowing directly to the at least one filter element. The effect is thereby achieved that insofar as possible the entire stream of crude gas entering the filter device will first pass directly into the auxiliary material reservoir and only then, when it is loaded with auxiliary material, does it reach the at least one filter element.

In particular, such a filter shielding element may be in the form of a screening plate.

In order to prevent insofar as possible material (auxiliary material and fluid paint overspray) that has been cleaned off the at least one filter element from reaching the region of the inlet opening of the filter device, it is of advantage for the filter device to comprise at least one deflector element which keeps material cleaned off the at least one filter element away from the inlet opening for the crude gas.

Preferably, the at least one deflector element diverts the material cleaned off the at least one filter element into the auxiliary material reservoir.

In particular, such a deflector element may be in the form of a deflector plate.

In order to prevent auxiliary material and/or overspray from being deposited in the vicinity of the inlet opening, it is of advantage for the filter device to comprise at least one covering element which covers a corner area of the inlet opening so that auxiliary material and/or overspray are kept away from the corner area of the inlet opening.

In particular furthermore, such a covering element may have a substantially triangular covering surface.

In particular, such a covering element may be in the form of a cover plate.

As an alternative or in addition to the provision of such a covering element, provision may be made for the inlet opening to have a corner surface in at least one corner area which is oriented at an angle to the vertical and at an angle to the horizontal so that auxiliary material and/or overspray slides downwardly at the corner surface due to the inclination of the corner surface.

In particular, such a corner surface may be provided on a covering element that is provided in the corner area of the inlet opening.

In order to increase the amount of auxiliary material that is absorbed by the stream of crude gas whilst flowing through the auxiliary material reservoir, the filter device may comprise at least one fluidising device for whirling up the auxiliary material that is present in the auxiliary material reservoir.

The filter device described is suitable, in particular, for use in a device for separating fluid paint overspray from a stream of crude gas containing overspray particles which comprises at least one such filter device and a flow chamber through which the stream of crude gas flows from an application area of a paint shop to the inlet opening of the at least one filter device.

Preferably thereby, the through-flow cross section of the flow chamber for the stream of crude gas decreases along the direction of flow of the stream of crude gas up to the at least one inlet opening of the at least one filter device. Thereby, the rate of flow of the stream of crude gas increases when flowing through the flow chamber up to the at least one inlet opening of the at least one filter device, this thus preventing the auxiliary material and/or overspray from the filter device reaching the application area of the paint shop against the direction of flow of the stream of crude gas.

In particular, provision may be made for the flow chamber to be bounded by at least one substantially horizontal boundary wall by means of which the through-flow cross section of the flow chamber for the stream of crude gas decreases in step-like manner.

Furthermore, it is of advantage for the device to comprise at least one flow guide plate which is arranged above at least one filter device and is inclined to the horizontal at an angle of at most approximately 10° and preferably at an angle of at most approximately 3° in such a way that any liquid reaching the flow guide plate does not get into the flow path of the stream of crude gas. This, for example, thereby prevents fire-extinguishing water or fluid paint escaping from a burst hose in the application area from getting into the flow path of the stream of crude gas and from there, into the filter device.

If the device comprises at least one gangway that is accessible to an operator, then the upper surface thereof is preferably inclined to the horizontal at least in sections thereof at an angle of at most approximately 10°, and preferably at an angle of at most approximately 3°, in such a way that liquid falling onto the accessible gangway does not get into the flow path of the stream of crude gas. This, for example, also serves the purpose of keeping fire-extinguishing water or fluid paint escaping from a burst hose within the application area out of the flow path of the stream of crude gas through the flow chamber.

The device described for separating fluid paint overspray is suitable, in particular, for use in a plant for painting objects and in particular painting vehicle bodies which comprises at least one application area for applying fluid paint to objects that are to be painted and at least one such device for separating fluid paint overspray.

It has proved to be expedient hereby, if the vertical spacing of the application area from the inlet opening of the filter device amounts to at least approximately 1.0 m, preferably to at least approximately 1.5 m.

The present invention can offer the advantage that as little overspray as possible will remain stuck to the walls of the flow chamber or to the walls of the filter device on its way to the at least one filter element.

The at least one filter element is preferably accommodated in a box that is closed insofar as possible so that auxiliary material or overspray cleaned off the filter element will not reach the application area without the need for parts of the flow path of the stream of crude gas having to be occasionally blocked for this purpose.

The air flow within the filter device may be established in such a way that the distribution of the auxiliary material on the filter element or on the filter elements is effected in as homogeneous a manner as possible.

The capacity of the filter device described may be matched to the amount of crude gas passing through the application area.

The filter device described is suitable, in particular, for use in dry fluid-paint-overspray precipitations systems for paint booths in the automobile industry or in more general industrial paint shop areas.

The filter device described enables auxiliary material to be introduced into the stream of crude gas and cleaning of the filter elements to be effected during the ongoing painting processes.

The device for separating fluid paint overspray from the stream of crude gas containing overspray particles preferably comprises at least one filter device for separating fluid paint overspray from the stream of crude gas containing overspray particles, wherein the filter device comprises at least one filter element for separating the overspray from the stream of crude gas and at least one auxiliary material reservoir for accommodating an auxiliary material. This auxiliary material is supplied to the stream of crude gas that is loaded with fluid paint overspray before the stream of crude gas has passed at least one filter element for separating the overspray from the stream of crude gas. The auxiliary material reservoir is preferably provided with at least one level sensor for the purposes of determining the level of the auxiliary material in the auxiliary material reservoir.

This construction of the auxiliary material reservoir enables the current operational state of the auxiliary material reservoir to be monitored in a simple manner in order to be able to specifically control, in particular, the process of emptying-out a mixture of auxiliary material and fluid paint overspray from the auxiliary material reservoir.

In this case, the proportion of the fluid paint overspray in the mixture of auxiliary material and fluid paint overspray that is present in the auxiliary material reservoir is always increasing in the course of operation of the auxiliary material reservoir, this being something which leads to a decrease in the density of the mixture. Consequently, the volume of the barrier layer which has built up on the at least one filter element becomes ever greater. The level of the material in the auxiliary material reservoir immediately before the filter element is subjected to a cleaning process therefore continues to decrease. Consequently, the proportion of the fluid paint overspray in the mixture present in the auxiliary material reservoir can be assessed from the actual level of the auxiliary material in the auxiliary material reservoir before the at least one filter element is subjected to a cleaning process.

Contrariwise, as the operational period gets longer, the level of the material present in the auxiliary material reservoir continues to increase immediately after the at least one filter element is subjected to a cleaning process since, due to the cleaning process, the entire amount of material including the separated fluid paint overspray that was deposited on the filter element has reached the auxiliary material reservoir and a new barrier layer has still not built up on the filter element immediately after a cleaning process. Consequently, the proportion of the fluid paint overspray in the mixture present in the auxiliary material reservoir can also be assessed from the level of the material in the auxiliary material reservoir immediately after a cleaning process.

Thus, the operational state of the auxiliary material reservoir and the condition of the material present therein can be reliably monitored, and this can be done for each auxiliary material reservoir individually, by means of a level sensor for the determination of the level of the auxiliary material in the auxiliary material reservoir.

In order to enable the level in the auxiliary material reservoir to be determined as precisely as possible, the level sensor is preferably able to produce a signal which corresponds to a value from a multiplicity of discrete height levels or from a continuum of height levels.

In a preferred embodiment of the invention, provision is made for the level sensor to be in the form of an analogue sensor.

In particular, the level sensor may be in the form of a capacitive sensor.

In order that the result of the measurement made by the level sensor will be impaired to the least possible extent by edge effects, it is of advantage if the level sensor is arranged in an interior space of the auxiliary material reservoir in such a way that it is spaced from the walls of the auxiliary material reservoir.

It has proved to be particularly expedient for the level sensor to comprise a substantially rod-shaped sensor element.

The longitudinal direction of the level sensor, thus in particular, the longitudinal direction of the rod-shaped sensor element is preferably oriented substantially vertically in order to obtain as large a resolution as possible in regard to the different measurable height levels.

Preferably, the longitudinal direction of the level sensor, thus in particular, the longitudinal direction of the rod-shaped sensor element is oriented substantially perpendicularly to a base of the auxiliary material reservoir.

In order to enable the material present in the auxiliary material reservoir to be thoroughly mixed and its surface smoothed as well as to enable material bridges caused by an undermining process to be broken up, it is of advantage for the auxiliary material reservoir to be provided with a means for mixing the material that is present in the auxiliary material reservoir.

Such a mixing device may, for example, be in the form of a fluid base of the auxiliary material reservoir through which a gaseous medium and in particular compressed air may pass in order to fluidise the material present in the interior space of the auxiliary material reservoir and thus locally equalize different height levels of the material within the auxiliary material reservoir.

As an alternative or in addition thereto, provision may also be made for the auxiliary material reservoir to be provided with an agitator for mixing the material and homogenizing the contents.

Such an agitator may comprise a shaft provided with paddles.

The shaft may be oriented substantially horizontally or substantially vertically.

The paddles may be arranged on the shaft such as to be angularly spaced from each other and/or mutually displaced in the axial direction of the shaft.

The shaft may be set into rotary motion by an electric motor for example.

As an alternative or in addition thereto, provision may also be made for the shaft to be set into rotary motion pneumatically, and in particular, by means of a turbine that is subjected to compressed air. A pneumatic drive offers the advantage that sparking is avoided and adequate protection from explosion is thereby ensured.

In order to prevent the base of the auxiliary material reservoir, and in particular a fluid base, from being damaged by larger falling objects, it is expedient for the auxiliary material reservoir to comprise at least one retaining device which prevents the objects from reaching the base of the auxiliary material reservoir.

Such a retaining device may comprise, in particular, a retaining grid which is arranged above the base of the auxiliary material reservoir and incorporates passage openings for allowing auxiliary material and overspray to pass through the retaining grid.

In order to make it possible to gain entry to the interior space of the auxiliary material reservoir for maintenance purposes, provision may be made for the auxiliary material reservoir to have an entrance opening in a side wall thereof and for said entrance to be closable by means of a closure element.

In particular, provision may be made for the interior space of the auxiliary material reservoir to be accessible to an operator by passing through the entrance opening.

Hereby, the level sensor may be held directly or indirectly on the closure element for the entrance opening, for example on an inspection door.

In order to whirl up the auxiliary material and thus introduce it into the stream of crude gas being passed through the auxiliary material reservoir and/or in order to obtain homogenisation of the mixture consisting of auxiliary material and the overspray bound thereto which is present in the auxiliary material reservoir, the auxiliary material reservoir may be provided with a fluidising device for whirling up the auxiliary material present in the auxiliary material reservoir.

In this case, it is particularly expedient for maintenance and repair purposes, if the level sensor is connected to the fluidising device so as to form a common manipulable unit.

In particular, provision may be made for the level sensor and the fluidising device to be held together on the closure element for the entrance opening in the side wall of the auxiliary material reservoir so that the level sensor and the fluidising device are removable from the interior space of the auxiliary material reservoir by removing the closure element from the entrance opening.

The fluidising device preferably comprises at least one outlet nozzle for a gaseous medium which is at an enhanced pressure.

The outlet nozzle may be arranged statically or in rotatable manner on a mounting plate of the fluidising device.

In both cases, provision may be made for the orientation of the outlet nozzle relative to the side walls of the auxiliary material reservoir to be adjustable.

In the case of the gaseous medium of enhanced pressure, this may, for example, be compressed air at an absolute pressure of at least approximately 2 bar.

Preferably, the fluidising device comprises at least two outlet nozzles. A larger number of outlet nozzles such as four outlet nozzles for example, is also conceivable.

The outlet nozzle is preferably arranged approximately centrally in the auxiliary material reservoir. The spacing to the upper surface of the material in the auxiliary material reservoir should amount to at least approximately 15 cm.

Preferably, at least one outlet nozzle of the fluidising device is in the form of a conical jet.

In one preferred embodiment of the invention, the gaseous medium emerging from the outlet nozzle or from the outlet nozzles forms a median cone which stretches over substantially the entire base surface of the auxiliary material reservoir so as to thereby obtain improved utilization of the material contained therein.

The auxiliary material reservoir described is suitable in particular for use in a filter device for separating fluid paint overspray from a crude gas containing overspray particles which comprises at least one filter element for separating the overspray from the stream of crude gas and at least one such auxiliary material reservoir.

Hereby, the auxiliary material reservoir is preferably arranged below at least one filter element of the filter device in such a way that, when cleaning the filter elements, the material (a mixture of auxiliary material and fluid paint overspray) dropping down therefrom enters the auxiliary material reservoir.

Furthermore, provision is preferably made for the auxiliary material reservoir to be located in the flow path of the stream of crude gas flowing through the filter device from an inlet opening to the at least one filter element.

It is particularly expedient, if the stream of crude gas enters the filter device through the inlet opening of the filter device such that it is directed directly into the auxiliary material reservoir and is deflected in the auxiliary material reservoir in such a way that it then flows to the at least one filter element.

The auxiliary material reservoir preferably contains a mixture consisting of auxiliary material and fluid paint overspray bound thereto which reaches the auxiliary material reservoir due to the process of cleaning the at least one filter element.

The filter device described is particularly suitable for use in a device for separating fluid paint overspray from a stream of crude gas containing overspray particles which comprises at least one such filter device and a flow chamber through which the stream of crude gas flows from an application area of a paint shop to an inlet opening of the at least one filter device.

Such a device for separating fluid paint overspray is particularly suitable for use in a plant for painting objects, and in particular vehicle bodies, which comprises at least one application area for applying fluid paint to the objects that are to be painted and at least one such a device for separating fluid paint overspray.

Furthermore, provision may be made for the paint shop to comprise a device for introducing auxiliary material into the flow path of a stream of crude gas loaded with fluid paint overspray before the stream of crude gas has passed at least one filter element for separating the overspray from the stream of crude gas, wherein the device for introducing the auxiliary material comprises the following:
 a detecting device for determining whether there is an adequate flow of crude gas through the at least one filter element; and
 a blocking device for blocking the introduction of auxiliary material into the flow path of the stream of crude gas if the detecting device determines the lack of an adequate flow of crude gas.

Thereby, it is possible to reliably prevent the introduction of auxiliary material into the application area of a paint shop even when the system is not operating correctly.

Hereby, an adequate flow of crude gas is to be understood as being a stream of crude gas which is such that a predetermined (e.g. empirically determined) minimum quantity of crude gas passes the at least one filter element for separating the overspray per unit of time.

If no such adequate flow of crude gas through the at least one filter element is present, then the danger exists that auxiliary material introduced into the flow path of the stream of crude gas enters into the application area of the paint shop against the normal direction of flow of the stream of crude gas.

Due to the described block on the introduction of auxiliary material into the flow path of the stream of crude gas in the absence of an adequate flow of crude gas, the introduction of auxiliary material into the application area of the paint shop is reliably prevented even in the case of such an operational malfunction.

Hereby in particular, the device may comprise a control device which serves as a detecting device for determining whether an adequate flow of crude gas is present, and/or as a blocking device for blocking the introduction of auxiliary material into the flow path of the stream of crude gas.

The device for introducing auxiliary material into the flow path of the stream of crude gas preferably comprises at least one fluidising device for whirling up the auxiliary material present in an auxiliary material reservoir, wherein the functioning of the fluidising device is blockable in the absence of an adequate flow of crude gas.

Furthermore, the device for introducing auxiliary material into the stream of crude gas may comprise a cleaning device for cleansing auxiliary material off at least one filter element, wherein the functioning of the cleaning device is blockable in the absence of an adequate flow of crude gas.

In particular, provision may be made for the device for introducing auxiliary material into the flow path of the stream of crude gas to comprise pressure sensors for measuring a decrease of pressure in at least one filter element.

Furthermore, provision may be made for the device for introducing auxiliary material into the flow path of the stream of crude gas to comprise at least one device for monitoring the operational state of a fan that is arranged downstream of the at least one filter element.

Hereby, the device may, for example, comprise a current monitoring instrument for monitoring the operational state of the fan.

As an alternative or in addition thereto, the device may comprise a frequency converter for monitoring the operational state of the fan.

As an alternative or in addition thereto, the device may also comprise a differential pressure gauge for the measurement of the decrease of pressure at the fan.

Furthermore, provision may be made for the device for introducing auxiliary material into the flow path of the stream of crude gas to comprise at least one volumetric flow meter.

In particular, provision may be made for at least one volumetric flow meter to be arranged downstream of the at least one filter element.

Such a device for introducing auxiliary material into the flow path of a stream of crude gas loaded with fluid paint overspray is suitable in particular for use in a device for separating fluid paint overspray from a stream of crude gas containing overspray particles, which comprises at least one filter element for separating the overspray from the stream of crude gas and at least one such a device for introducing auxiliary material into the flow path of the stream of crude gas loaded with fluid paint overspray.

Such a device for separating fluid paint overspray is particularly suitable for use in a plant for painting objects, and in particular vehicle bodies, which comprises at least one application area for applying fluid paint to the objects that are to be painted and at least one such a device for separating fluid paint overspray.

Furthermore, provision may be made for the device for separating fluid paint overspray from the stream of crude gas containing overspray particles to comprise at least one unit, wherein the unit comprises the following:
 a filter element accommodating chamber for accommodating at least one filter element for separating the overspray from the stream of crude gas;

at least one auxiliary material reservoir for accommodating an auxiliary material which is supplied to the stream of crude gas before the stream of crude gas passes the at least one filter element;

at least one partition wall for separating the filter element accommodating chamber from a flow chamber of the device for separating fluid paint overspray through which the stream of crude gas flows before entering the unit; and at least one inlet opening through which the stream of crude gas from the flow chamber enters the unit.

Due to the use of one or preferably a plurality of units of this kind, it becomes possible to assemble a device for separating fluid paint overspray from a stream of crude gas containing overspray particles in a particularly simple and rapid manner.

By using one or preferably a plurality of units of this kind which are lined up in one or in a plurality of rows in a longitudinal direction of the device for separating fluid paint overspray, a device for the separation of fluid paint overspray having any desired crude gas cleaning capacity is created in a simple and rapid manner.

Due to this modular manner of construction, such a device for separating fluid paint overspray that is built up in modular manner is expandable as desired even after it has first been assembled by adding further modules or units when so required.

Such a unit will also be referred to hereinafter as a module, a filter module or a filter device.

Hereby, the flow properties of the stream of crude gas in the filter element accommodating chamber of each unit remain unaffected by the addition of further units for the purposes of expanding the capacity thereof. The reason for this is that these flow properties are basically determined by the dimensioning of the inlet opening through which the stream of crude gas from the flow chamber enters the unit, and also due to the fact that each unit is separated by its own partition wall from the flow chamber through which the stream of crude gas flows before its entry into the unit.

The partition wall of the unit may comprise a wall that is set at an angle to the horizontal or a wall that extends substantially vertically.

The inlet opening of the unit may be bounded in the upward direction by a lower edge of the partition wall, and in particular a wall of the partition wall that is set at an angle to the horizontal or a wall that extends substantially vertically.

Each of the units thus represents a self-sufficient filter device for separating fluid paint overspray from a stream of crude gas containing overspray particles which is usable either individually or together with other units.

In a preferred embodiment of the invention, provision is made for the inlet opening of the unit to be bounded downwardly by a lower guidance surface.

For the desired guidance of the stream of crude gas into the interior space of the unit and in particular into the auxiliary material reservoir, it is expedient if the lower guidance surface is inclined to the horizontal at least in sections thereof, namely in particular, in such a way that the lower guidance surface is inclined downwardly—as seen in the direction of flow of the stream of crude gas.

It has proven to be particularly expedient, if the lower guidance surface is inclined to the horizontal at least in sections thereof at an angle of at least approximately 30°, preferably at an angle of at least approximately 40°.

Furthermore, it has proved to be expedient for the lower guidance surface to be at least partly in the form of a guidance element which projects to one side over a support structure of the unit.

In particular, such a guidance element may be in the form of an intake slope.

In a preferred embodiment of the unit described, provision is made for the unit to comprise at least one filter element which is arranged in the filter element accommodating chamber.

In order to be able to connect the units to one another or to partition walls that are respectively arranged between two neighbouring modules in a simple manner, it is expedient for the unit to comprise at least one connecting element for connecting the unit to a neighbouring further unit or to a neighbouring partition wall.

In particular, such a connecting element may form a part of a support structure of the unit.

For example, provision may be made for the connecting element to be in the form of a substantially vertically running support.

Furthermore, the connecting element may have a contact surface for abutment on a contact surface of a neighbouring unit or a neighbouring partition wall.

In order in particular to produce such a flat contact surface and to provide adequate mechanical stability for the arrangement, it is expedient if the connecting element has a substantially U-shaped cross section at least in sections thereof.

In order to be able to extract individual units in a simple manner from a row of mutually connected units when this becomes necessary such as for repair and/or maintenance purposes for example, it is of advantage if the connecting element is connectable in releasable manner to a neighbouring unit or to a neighbouring partition wall.

In particular, provision may be made for the connecting element to be configured such as to be bolted to a neighbouring unit or to a neighbouring partition wall.

By bolting the connecting elements to one another, the static load sustainable by the connecting elements is increased.

In a preferred embodiment of the invention, provision is made for the unit to comprise a support structure which carries at least one of the other elements of the unit, and preferably all the other elements of the unit.

The unit described is preferably arranged to be pre-assembled so that after the pre-assembly process, it may be handled and transported as a whole in a pre-assembled state.

The unit described is suitable, in particular, for use in a device for separating fluid paint overspray from a stream of crude gas containing overspray particles which comprises at least one such a unit and a flow chamber through which the stream of crude gas flows before the entry thereof into the at least one unit.

In a preferred embodiment of such a device, provision is made for the device to comprise at least two units which succeed one another in a longitudinal direction of the device.

Hereby in particular, provision may be made for at least two units to be arranged directly next to each other.

Thereby, the two units may be connected to one another in releasable manner.

As an alternative thereto, provision may be made for the device to comprise at least one partition wall by means of which the filter element accommodating chambers of at least two of the units that succeed one another in a longitudinal direction of the device are separated from each other. Due to such a separation of the filter element accommodating chambers of mutually neighbouring units, longitudinal currents between the filter element accommodating chambers of the units and thus mutual interference with the flow properties in the units are prevented. A defined zoned separation of the stream of crude gas through the units is thereby obtained, this thereby resulting in a well-defined setting for the stream of crude gas within the individual units.

Furthermore, provision may also be made for the device to comprise at least one partition wall by means of which successive sections of the flow chamber are separated from each other in a longitudinal direction of the device.

Hereby, the partition walls which separate the successive sections of the flow chamber from each other in a longitudinal direction of the device may be identical to the partition walls which separate the filter element accommodating chambers of the units that succeed one another in the longitudinal direction of the device.

Furthermore, in a preferred embodiment of such a device, provision is made for the device for separating fluid paint overspray to comprise at least two units which are spaced from each other in a transverse direction of the device.

Hereby, by changing the spacing between the units that are spaced from each other in the transverse direction of the device, the overall assemblage of units can be adapted to the width of the flow chamber of the device without this entailing any change to the units themselves.

Preferably in this case, the at least two units are arranged in such a way that their respective inlet openings face each other.

The region of the flow chamber remaining between the two units having mutually facing inlet openings forms a narrowed section of the flow chamber in which the rate of flow of the stream of crude gas flowing to the inlet openings of the units is higher than it is in a section of the flow chamber located above the units. In this way, there is produced a rising speed profile in the stream of crude gas, this offering the advantage that auxiliary material and overspray are more easily kept away from the inlet openings and held back in the units.

In a preferred embodiment of the invention, provision is made for a gangway that is accessible to an operator to be arranged between at least two of the units which are spaced from each other in a transverse direction of the device.

By means of a variation in the width of the accessible gangway, the overall assemblage consisting of the units and the accessible gangway arranged therebetween can be adapted to any desired width of the flow chamber of the device for the separation of fluid paint overspray.

In addition, the height of the overall assemblage of units can be easily adapted to any desired height of the flow chamber of the device for the separation of fluid paint overspray by merely altering the length of the supports of the support structure for the units, or, for example, by adding extension pieces to these supports.

The described device for separating fluid paint overspray is particularly suitable, for use in a plant for painting objects, and in particular vehicle bodies, which comprises at least one application area for applying fluid paint to the objects that are to be painted and at least one such a device for separating fluid paint overspray.

Preferably thereby, the flow chamber of the device for separating fluid paint overspray is arranged at least partly underneath the application area.

It is particularly expedient, if the entire device for separating fluid paint overspray including the flow chamber and the units is arranged within the vertical projection of the application area of the paint shop.

Furthermore, provision may be made for the device for separating fluid paint overspray from the stream of crude gas containing overspray particles to comprise at least two filter devices each of which incorporates an inlet opening through which a partial stream of crude gas enters the filter device concerned and at least one filter element for separating the overspray from the partial stream of crude gas, wherein the device comprises at least one reservoir for accommodating a material cleaned off the filter elements of a plurality of filter devices and a mixing device for mechanically mixing the material cleansed from a plurality of filter devices.

By virtue of such an embodiment of the device for separating fluid paint overspray from the stream of crude gas containing overspray particles, it is possible to maintain the fluidity of the mixture of auxiliary material and of the fluid paint overspray cleaned off the filter elements in the auxiliary material reservoirs in a simple and efficient manner.

The flow properties of the mixture of auxiliary material and fluid paint overspray are critical to the correct functioning of such a device for separating fluid paint overspray. If the flow properties are no longer satisfactory, then material exchange no longer takes place in the auxiliary material reservoirs. The material in the auxiliary material reservoirs can no longer flow to the suction opening, and the state-of-filling of the tanks remains above the value which would terminate the suction process. In this case, the painting process must be interrupted and the material in the auxiliary material reservoirs must be decompacted manually in such a way that it becomes flowable again and can thus be sucked out.

Even if the auxiliary material reservoirs are provided with fluid bases in the form of plates of sintered plastic in order to allow the material contained in the auxiliary material reservoirs to be fluidised by supplying compressed air thereto, an adequate decompacting process for re-establishing the desired flow properties of the material cannot be ensured thereby. Namely, the adherence properties of the particles in the mixture consisting of auxiliary material and fluid paint overspray are substantially stronger than the flow forces produced by the compressed air so that the layer of the material as a whole will increase or else channels will form in the material through which the compressed air will flow upwardly. Additionally, the process of fluidising the material is made more difficult due to the large spread in the distribution of particle sizes of the auxiliary material (in a range of from approximately 2 μm to approximately 100 μm).

For the purposes of fluidising a batch of particles having a diameter of 2 μm to a porosity of approximately 0.85, a rate of flow of 0.00016 m/s is enough. For the purposes of fluidising a batch of particles having a diameter of 100 μm, one needs a rate of flow of 0.35 m/s, i.e. a rate of flow that is approximately 2,000 times higher than is the case for particles having a diameter of 2 μm. Consequently, even if the flow forces should outweigh the forces of adhesion, uniform fluidisation conditions cannot be obtained simply by feeding in compressed air. Rather, a sort of classifying process occurs whereby the fine components are carried away whilst the coarse components remain immovably on the base of the auxiliary material reservoirs. This classifying effect also arises if the auxiliary material is whirled up by compressed air blasts by means of fluidising devices located above the auxiliary material reservoirs.

The concept underlying the solution to this problem described above is that material cleansed from a plurality of filter devices through each of which there is a partial stream of crude gas should be collected in one and the same reservoir and mechanically mixed within the reservoir by means of a mixing device in order to mechanically destroy the adhesion between the particles of the cleansed material, to prevent "growth" of the reservoir with the cleansed material and to obtain a greatest possible degree of homogeneity of the material in the reservoir by the process of mixing material cleansed from different filter devices.

A more secure process is thereby obtained, and the material in the reservoir can be concentrated up to higher level of concentration of the fluid paint overspray contained therein without endangering the fluidity of the mixture of auxiliary material and fluid paint overspray.

If, however, each filter device has its own auxiliary material reservoir associated thereto, then a very large number of such auxiliary material reservoirs have to be provided and have to be constantly and precisely monitored in regard to the composition of the material therein. Due to the different loading of the different filter devices with fluid paint overspray which is dependent upon the location of the filter devices concerned relative to the application area in which the fluid paint overspray enters the stream of crude gas, the concentration factor, i.e. the proportion of fluid paint overspray to the entire amount of material present in the respective auxiliary material reservoir, differs greatly from auxiliary material reservoir to auxiliary material reservoir. The fluidity of the concentrated auxiliary-material/paint-mixture differs accordingly. If the suction process in just one auxiliary material reservoir is no longer being implemented correctly, then this leads to an interruption of the process and requires manual intervention. The times for the material exchange must be set individually for each auxiliary material reservoir and they have to be selected in such a way that one can be certain of being above the critical range of concentration of fluid paint overspray. This means a high consumption of materials, both of fresh auxiliary material as well as auxiliary material loaded with fluid paint overspray, and in consequence high expenditure for the storage and the transportation of the auxiliary material.

In contrast thereto, just one reservoir has to be monitored in regard to the quantity of material therein and the concentration factor thereof in the case of the device described above for separating fluid paint overspray for a plurality of filter devices through each of which there is a partial stream of crude gas. Furthermore, due to the fact that the material cleansed from a plurality of different filter devices is mechanically mixed, it becomes possible to compensate for particularly high concentrations of fluid paint overspray in the material cleansed from a certain filter device by mixing it with material that is less loaded with fluid paint overspray and which has been cleansed from other filter devices. In consequence, the material present in the larger reservoir can be concentrated to a higher level of concentration of fluid paint overspray without impairing the fluidity of the mixture consisting of auxiliary material and fluid paint overspray.

Moreover, the constructional outlay required for the production of a single large reservoir is much less than the outlay required for the production of many small auxiliary material reservoirs each of which is associated with just one filter device.

Due to the larger interior space of the reservoir associated with a plurality of filter devices, it is also more easily possible to accommodate a suitable mixing device in the interior space of the reservoir.

Preferably, the reservoir is in the form of a trough which extends from a region located vertically below a first filter device up to a region located vertically below a second filter device, whereby in principle as many further filter devices as desired may be arranged between the first filter device and the second filter device.

In a preferred embodiment of the invention, provision is made for the reservoir to accommodate material that has been cleansed from at least three different filter devices.

The mixing device preferably comprises at least one mixing tool that is rotatable about a substantially horizontally oriented axis of rotation. Thorough mixing of the material contained in the reservoir along the direction of the axis of rotation is thereby obtained so that the material in the reservoir does not exhibit differences of concentration.

In order to enable thorough mixing to also be achieved in long reservoirs for accommodating the material cleaned off the filter elements of a plurality of filter devices, provision may be made for the mixing device to comprise at least two shafts which are rotatable about a substantially horizontally oriented axis of rotation and which are arranged one behind the other along the axis of rotation.

By the use of a plurality of shorter shafts instead of just a single long shaft for holding the mixing tools, the drive power necessary for the production of the rotary motion of the mixer tools can be reduced.

In order to destroy the binding forces between the particles of the material present in the reservoir, the mixing device may be provided suitable mixer tools as desired.

In particular, provision may be made for the mixing device to comprise at least one paddle, at least one ploughshare and/or at least one helix, screw or spiral.

For thorough mixing of the material disposed in the reservoir, it is expedient, if the mixing device comprises at least two helices having opposite directions of rotation.

Since a classifying effect whereby fine components of the material are carried out of the storage tank does not occur as a result of the mechanical mixing of the material in the reservoir, the particle size distribution of the auxiliary material in the case of the device described may be selected in such a way as to result in as large a surface area as possible which embeds and thus de-bonds the fluid paint particles.

In particular, an auxiliary material may be used in which at least 20 percent by weight of the particles have a particle size of less than 2 μm.

The density of the auxiliary material being used, such as stone dust for example, may amount to approximately 2.75 $g/cm^3$ for example.

Auxiliary materials that are also usable in the device described are ones having bulk material properties which are to be described as cohesive.

If the reservoir comprises a material outlet opening for extracting auxiliary material loaded with fluid paint overspray from the reservoir, then it is expedient if the mixing device comprises a mixing tool which assists the discharge of the material through the material outlet.

Furthermore, the reservoir may comprise an inlet for fresh auxiliary material in order to reduce the concentration of fluid paint overspray in the material in the reservoir by supplying fresh auxiliary material thereto.

Preferably the inlet for fresh auxiliary material is arranged in a first end region of the reservoir and the reservoir comprises a material outlet opening which is arranged in a second end region of the reservoir that is located opposite the first end region.

Particularly thorough mixing of the material disposed in the reservoir is achieved if the mixing device sweeps over a mixing region in the course of a complete revolution and the reservoir comprises a mixing section having an internal contour corresponding to the outer contour of the mixing region.

It is particularly expedient if the reservoir comprises a mixing section and if the mixing device sweeps over substantially the entire mixing section of the reservoir in the course of a complete revolution.

Provision is preferably made hereby for substantially the entire amount of material that is accommodated in the reservoir to be located in the mixing section of the reservoir in the normal operation of the device.

The mixing section of the reservoir may, in particular, be substantially cylindrical or in the form of a section of a cylinder.

The reservoir is preferably arranged vertically directly below the filter devices from which the reservoir receives the cleansed material.

Furthermore, provision may be made for the partial streams of crude gas to be at least partially fed through the reservoir in order to pick up auxiliary material from the reservoir.

Furthermore, provision may be made for a stream of a medium that forms a layer differing from a paint used for painting the workpieces to be applicable by means of the application unit of at least one painting device of the paint shop for the purposes of applying a layer to a surface.

Thereby, a painting device is provided which is employable in a flexible and space-saving manner and which incorporates as small a number of components as possible.

In this case for example, due to the fact that a stream of a medium that forms a layer differing from a paint used for painting the workpieces is applicable by means of the application unit, a layer can be applied to a surface that is not to be painted by means of the painting device in a simple manner. It is thereby possible to dispense with separate coating devices. In consequence, the painting device comprises a smaller number of components.

In one embodiment of the invention, provision is made for the application unit to comprise a paint applicator for applying paint to the workpieces that are to be painted, whereby the medium forming a layer differing from the paint used for painting the workpieces is applicable by means of said applicator.

As an alternative or in addition thereto, provision may be made for the application unit to comprise a medium delivery assembly for delivering the layer-forming medium in addition to the paint applicator.

It is advantageous, if the painting device comprises a switching device by means of which a paint supply line or a medium supply line is selectively connectable to the paint applicator.

In particular, provision may be made for the paint applicator to comprise a delivery line for delivering paint or medium into which a paint supply line or a medium supply line selectively flows. One thereby dispenses with the need to provide separate paint and medium delivery lines.

It is expedient, if the painting device comprises a reservoir into which paint that is still disposed in the delivery line and/or medium that is still disposed in the delivery line when switching between a paint delivery mode and a medium delivery mode is feedable. In this way, one can prevent a workpiece that is to be painted from being contaminated with a layer-forming medium that is still disposed in the delivery line or a surface to which a layer-forming medium is to be applied from being contaminated with paint that is still disposed in the delivery line.

In order to provide a surface that is not to be painted with a protective layer in a particularly simple way, provision is preferably made for the surface that is not to be painted to have the layer-forming medium applicable thereto by means of the application unit.

In particular, provision may be made for a surface that is located outside the painting device itself, for example, a surface of a boundary wall of a paint booth to have the layer-forming medium applicable thereto by means of the application unit.

Preferably, all the areas attainable by the painting device are arranged to have the layer-forming medium applicable thereto.

A simple way of supplying the painting device with the medium is ensured, in particular, if the painting device comprises a storage tank for the layer-forming medium.

Advantageously, the painting device comprises a pump for propelling a stream of paint and/or a stream of medium that is to be supplied to the application unit.

In one embodiment of the invention, provision is made, apart from a paint and the layer-forming medium, for a cleaning medium for cleaning a surface and in particular for cleaning a surface contaminated with paint overspray and/or a surface coated by means of the layer-forming medium, to also be applicable by means of the application unit.

Preferably, the cleaning medium is in the form of a fluid or is in particulate form.

For the purposes of assisting a manual cleaning process, provision is preferably made for the automatic application of a cleaning medium or the washing-off of a manually applied cleaning medium by means of the painting device.

For example, provision may be made for a high-pressure water jet to be applicable by means of the application unit for the purposes of cleansing a surface. A contaminated surface can thus be cleaned in a particularly simple way. To this end for example, a high pressure cleaner may be arranged on the application unit, said cleaner preferably being displaceable by means of a moving device and being displaceable in particular together with the application unit.

In order to prevent high air humidity in the environment of the painting device from the very beginning, provision may be made for a cleaning process to be effected with a gaseous medium.

In one embodiment of the invention, provision is made for the layer-forming medium to comprise a layer-forming material which picks up a liquid component of the paint used for painting the workpieces and forms together with the paint an easily cleanable layer. By applying the layer-forming medium to a surface that is not to be painted, it can be ensured that in operation of the painting device, paint particles, so-called paint overspray, which are not adhering to the vehicle bodies but are hitting the surface that is not to be painted will not adhere permanently to this surface but will be cleanable therefrom in a simple manner.

As an alternative or in addition thereto, provision may be made for the layer-forming medium to comprise a substance which incorporates at least one chemically reactive group which can react with the paint, and in particular with the paint overspray.

It is expedient, if the at least one chemically reactive group is an amine group.

It is particularly expedient, if the layer-forming medium comprises at least one bi-functional amine.

In particular in the case where a bonding agent of the paint is at least bi-functional, there is an advantageous reaction between the layer-forming medium and the paint, for example by the formation of a network.

For example, one or more of the following reactions may occur:

a) reaction of an isocyanate with an amine

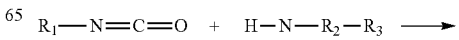

-continued

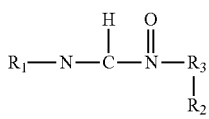

b) reaction of an amine with an epoxide

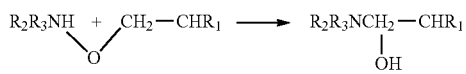

c) reaction of an amine with a carbonic acid

It is particularly expedient, if the layer-forming substance changes from a gel-like state into a film-like and in particular a solid film-like state by reaction with the paint.

As material for surface protection purposes, an auxiliary material or a precoat material which forms a protective layer on the surface to which it is applicable by means of the painting device is particularly suitable.

Furthermore, provision may be made for surfaces that are to be protected, and in particular those of robots, transporting axles, gratings, etc., to be coated once only or at regular intervals with fat, Vaseline, peel-off paint, a nano-coating and/or a non-stick coating by means of the application unit.

As an alternative or in addition thereto, provision may be made for nano-lacquers which use the lotus effect for example to be applicable to surfaces that are to be protected by means of the application unit for the purposes of simplifying or avoiding the cleaning process.

Furthermore, provision may be made for a drying medium, for example a gas or a gas mixture, for drying a previously painted workpiece or a surface that has been previously cleaned with an e.g. aqueous cleaning medium to be deliverable to the workpiece or the cleaned surface by means of the application unit.

It is expedient, if the painting device comprises a moving device for the motorised conveyance of the application unit.

It is particularly expedient, if the moving device for the motorised conveyance of the application unit is in the form of a robot.

Advantageously, the painting device comprises control equipment for controlling the moving device. In particular, it is thereby possible to automate the operation of the painting device.

The painting device described is suitable in particular for use in a paint shop which comprises a paint booth.

The paint shop described may exhibit the features and advantages that have been described hereinabove in connection with the painting device described.

In particular, in combination with a dry washing process for cleaning an air flow contaminated with paint overspray, provision may be made for the application unit of the painting device to take on further functions over and above that of painting.

Thus, the painting device is preferably suitable for applying a protective layer to a wall surface of a paint booth, a conveying device and/or a flow chamber.

A simplified cleaning process is obtained especially when using a combination of different media, and in particular from an atomizer, which are applied to different areas of the paint booth, for example, the windows, walls, gratings, transporting axles, floor areas, robot components, the conveying device, areas under the plane of the grating and/or the painting device itself.

Preferably, the paint booth can be provided with a complete or at least with a partial coating of a peel-off foil and/or Vaseline by means of the painting device.

In one embodiment of the paint shop, a filter for cleaning air laden with paint overspray is provided underneath the paint booth, the filter elements of said filter being provided with a layer of an auxiliary material or a pre-coat material and said filter comprising a funnel for collecting the auxiliary material or pre-coat material cleaned off the filter elements. In order to prevent coarse impurities resulting from a process of cleaning the paint shop from entering the filter and to prevent the auxiliary material or the pre-coat material in the filter from being excessively contaminated, provision is preferably made for an air-permeable filter mat to be arranged at an inlet of the filter which, for example, forms a bottleneck for an air flow, whereby said filter mat closes the inlet of the filter.

Furthermore, the features and advantages specified hereinafter may preferably form a component part of the present invention:

a reduced expenditure on personnel is ensured by automated operation of the painting device;

a lesser expenditure on cleaning and thus more economical operation of the paint shop arises as a result of a simplified cleaning process and/or reduced contamination of the paint shop;

disposal costs can be saved due to the prevention of heavy contamination of the auxiliary material or precoat material.

Furthermore, provision may be made for the device for separating fluid paint overspray from the stream of crude gas containing overspray particles to comprise at least one filter device for separating fluid paint overspray from the stream of crude gas containing overspray particles, which comprises at least one filter element for separating the overspray from the stream of crude gas and at least one auxiliary material reservoir for accommodating an auxiliary material which is supplied to the stream of crude gas loaded with fluid paint overspray before the stream of crude gas has passed at least one filter element for separating the overspray from the stream of crude gas, wherein the auxiliary material reservoir is provided with a balance.

Such a construction of the auxiliary material reservoir makes it possible to monitor the current operational state of the auxiliary material reservoir in a simple manner in order, in particular, to enable the process of emptying-out a mixture of auxiliary material and fluid paint overspray from the auxiliary material reservoir to be controlled in a purposeful manner.

Furthermore, provision may be made for the device for separating fluid paint overspray from the stream of crude gas containing overspray particles to comprise at least one filter device for separating fluid paint overspray from the stream of crude gas containing overspray particles, which comprises at least one filter element for separating the overspray from the stream of crude gas and at least one auxiliary material reservoir for accommodating an auxiliary material, wherein the filter device comprises at least one inlet opening through which the stream of crude gas enters the filter device and wherein the inlet opening is bounded upwardly by an upper guidance element which incorporates at least one passage opening.

This offers the advantage that auxiliary material from the filter device can reach a lower guidance element through at least one passage opening in the upper guidance element, the inlet opening of the filter device being bounded in the downward direction by said lower guidance element upon which paint drops may fall in operation of the filter device, whereby said drops separate from the lower guidance element (from a lower intake slope for example) and fall into the auxiliary material reservoir and could settle therein on sinter plates provided for the fluidisation of the material in the auxiliary material reservoir.

However, due to the auxiliary material reaching the lower guidance element of the inlet opening from the filter device through the at least one passage opening in the upper guidance element, the paint particles which could deposit on the lower guidance element are de-bonded and coated with the auxiliary material and thus made harmless.

The auxiliary material can, in particular, reach the lower guidance element through the at least one passage opening in the upper guidance element when the filter element is being cleaned and the blown-off mixture consisting of auxiliary material and fluid paint overspray (filter cake) falls from the cleansed filter element through the at least one passage opening in the upper guidance element onto the lower guidance element.

Furthermore, the present invention relates to an auxiliary material reservoir for use in particular in a paint shop in accordance with the invention, said reservoir accommodating an auxiliary material which is supplied to a stream of crude gas loaded with fluid paint overspray before the stream of crude gas has passed at least one filter element for separating the overspray from the stream of crude gas, wherein the auxiliary material reservoir is provided with a balance.

This embodiment of the auxiliary material reservoir makes it possible for the current operational state of the auxiliary material reservoir to be monitored in a simple way in order, in particular, to enable the process of emptying-out a mixture consisting of auxiliary material and fluid paint overspray from the auxiliary material reservoir to be controlled in a purposeful manner.

In order to enable the weight of the mixture of auxiliary material and fluid paint overspray that is contained in the auxiliary material reservoir to be determined as precisely as possible, it is expedient for the auxiliary material reservoir to comprise a lower section which is mechanically decoupled from an upper section of the auxiliary material reservoir.

This mechanical decoupling can be obtained for example, by the provision of a compensator between the lower section and the upper section of the auxiliary material reservoir.

In particular, such a compensator may be formed from a flexible material, for example, from a flexible plastic material.

Furthermore, it is expedient if the weight of the lower section of the auxiliary material reservoir and of the material contained therein is determinable by means of the balance.

Furthermore, the present invention relates to a filter device for separating fluid paint overspray from a stream of crude gas containing overspray particles particularly for use in a paint shop in accordance with the invention, wherein the filter device comprises
at least one filter element for separating the overspray from the stream of crude gas and
at least one auxiliary material reservoir for accommodating an auxiliary material,
wherein the filter device comprises at least one inlet opening through which the stream of crude gas enters the filter device, and wherein the inlet opening is bounded upwardly by an upper guidance element which incorporates at least one passage opening.

It is particularly expedient, if the inlet opening is bounded downwardly by a lower guidance element and if auxiliary material from the filter device can reach the lower guidance element through at least one passage opening in the upper guidance element. In this way auxiliary material and especially auxiliary material that has been cleaned off a filter element of the filter device can reach the lower guidance element of the inlet opening of the filter device in a simple manner, whereby the paint particles settling on said guidance element are de-bonded and/or can be coated with the auxiliary material so that these paint particles can no longer fall into the auxiliary material reservoir and then settle on the sinter plates for the fluidisation process.

It is particularly advantageous, if the upper guidance element incorporates a plurality of passage openings through which auxiliary material from the filter device can reach the lower guidance element.

In particular, provision may be made for the upper guidance element to comprise a passage region in which the passage openings are arranged, wherein the passage openings cover at least 25% of the surface area of the passage region.

The passage openings may, in particular, be arranged in the passage region of the upper guidance element in a regular pattern, for example, in a rectangle or a square lattice.

Furthermore, the present invention relates to a method of operating a paint shop, in particular for the operation of a paint shop in accordance with the invention, which comprises the following method steps:
  applying fluid paint to workpieces and in particular to vehicle bodies that are to be painted, by means of at least one application unit of at least one painting device;
  introducing a stream of crude gas containing overspray particles into a filter device, and in particular into a filter device in accordance with the invention; and
  separating the overspray from the stream of crude gas by means of at least one filter element that is arranged in the filter device.

Such a method makes it possible to remove fluid paint overspray that results from the application of fluid paint to the workpieces that are to be painted and has been picked up by an air flow passing through the application area from this air flow and then feed the cleansed air flow back to the application area in an air re-circulating system or else expel it to the environment of the paint shop.

In a special embodiment of such a method, provision may be made for the stream of crude gas to be fed into the filter device through at least one inlet opening in such a way that the stream of crude gas enters the filter device so as to be directed into an auxiliary material reservoir for accommodating an auxiliary material. Hereby, the at least one filter element can be subjected to auxiliary material in a simple and efficient manner, without such auxiliary material entering the application area of the paint shop.

It is particularly expedient, if the stream of crude gas is diverted in an interior space of the auxiliary material reservoir.

Preferably, the average rate of flow of the stream of crude gas when passing the narrowest part of the inlet opening amounts to at least approximately 2 m/s.

Furthermore, provision is preferably made for the stream of crude gas to be introduced into the filter device in such a way that the stream of crude gas does not break-away in the vicinity of the inlet opening.

The stream of crude gas emerging from the inlet opening is preferably diverted in the auxiliary material reservoir towards the at least one filter element.

Furthermore, provision may be made for the auxiliary material present in the auxiliary material reservoir to be whirled up by means of at least one fluidising device.

Preferably, the stream of crude gas flows through a flow chamber from an application area for applying the fluid paint to the objects that are to be painted up to the at least one inlet opening of the at least one filter device.

Hereby, provision may be made for the rate of flow of the stream of crude gas to increase continuously when flowing through the flow chamber.

Furthermore, provision may be made in the case of the method described for an auxiliary material to be supplied to the stream of crude gas loaded with fluid paint overspray, wherein the auxiliary material is disposed at least partially in an auxiliary material reservoir and the level of the auxiliary material in the auxiliary material reservoir is determined by means of a level sensor. In such a method, the operational state of an auxiliary material reservoir which receives the auxiliary material cleaned off the at least one filter element is monitored individually in order to enable, in particular, the time point for the emptying of the auxiliary material reservoir to be matched as precisely as possible to the operational state of the auxiliary material reservoir.

Hereby, provision may be made, in particular, for the level sensor to produce a signal which corresponds to a value from a multiplicity of discrete height levels or from a continuum of height levels.

In particular, provision may be made for the level sensor to produce an analogue signal.

In particular, a capacitive sensor may be used as the level sensor.

In a preferred embodiment of the method, provision is made for the auxiliary material in the auxiliary material reservoir to be fluidised by supplying a gaseous medium to an interior space of the auxiliary material reservoir.

Furthermore provision may be made for the auxiliary material in the auxiliary material reservoir to be whirled up by means of a fluidising device.

It is particularly expedient, if the level sensor and the fluidising device are removed together from an interior space of the auxiliary material reservoir.

Furthermore, provision may be made for a median cone of gaseous medium that has been produced by means of the fluidising device to sweep over substantially the entire extent of a base surface of the auxiliary material reservoir.

Preferably, the material present in the auxiliary material reservoir is thoroughly mixed.

Furthermore, provision may be made in the case of the method of operating a paint shop for an auxiliary material to be introduced into the flow path of a stream of crude gas loaded with fluid paint overspray before the stream of crude gas passes at least one filter element for separating the overspray from the stream of crude gas, and furthermore, for the method to comprise the following method steps:
  determining as to whether there is an adequate flow of crude gas through the at least one filter element; and
  blocking the introduction of auxiliary material into the flow path of the stream of crude gas if it is established that the flow of crude gas is inadequate.

Consequently, introduction of auxiliary material into the application area of the paint shop is reliably prevented even when the system is not functioning correctly.

If the process of introducing auxiliary material into the flow path of the stream of crude gas is effected by whirling up the auxiliary material present in an auxiliary material reservoir by means of a fluidising device, then the functioning of the fluidising device is preferably blocked in the absence of an adequate flow of crude gas.

If the process of introducing auxiliary material into the flow path of the stream of crude gas is effected by cleansing auxiliary material from at least one filter element, then the process of cleaning the at least one filter element is preferably blocked in the absence of an adequate flow of crude gas.

If the process of introducing auxiliary material into the flow path of the stream of crude gas is effected by supplying it by means of a nozzle assembly, then the functioning of the nozzle assembly is preferably blocked in the absence of an adequate flow of crude gas.

For the purposes of establishing the absence of an adequate flow of crude gas, there are many possibilities.

Thus for example, provision may be made for the absence of an adequate flow of crude gas to be determined on the basis of the drop in pressure across the at least one filter element. If the measured pressure drop is too small, then an adequate flow of crude gas is not present.

As an alternative or in addition thereto, the absence of an adequate flow of crude gas can be determined on the basis of the operational state of a fan arranged downstream of the at least one filter element.

To this end for example, the operational state of the fan may be monitored by means of a current monitoring process, by means of a frequency converter and/or by means of a measurement of the decrease of pressure across the fan.

As an alternative or in addition thereto, the absence of an adequate flow of crude gas can also be determined by means of a volumetric flow meter which may, in particular, be arranged downstream of the at least one filter element.

The method described extends the processing stability of the system in the event of malfunctions and serves to protect sensitive components in the equipment when operational breakdowns occur.

The method described is suitable for use in a dry fluid paint overspray precipitation system for paint booths in the automobile industry and in more general industrial paint shop areas in order to maintain the painting process and prevent or at least reduce damage.

Furthermore, provision may be made for the method of operating a paint shop to comprise the following method steps:

- dividing the stream of crude gas into at least two partial streams of crude gas which enter at least two different filter devices through different inlet openings, wherein each filter device comprises at least one filter element for separating the overspray from the respective partial stream of crude gas;
- separating the overspray from the partial streams of crude gas by means of the filter elements;
- cleaning material off the filter elements of a plurality of different filter devices;
- catching the cleansed material from the plurality of different filter devices in the same reservoir;
- mechanically mixing the material cleansed from the plurality of different filter devices in the reservoir by means of a mixing device.

It is thereby possible to maintain adequate fluidity of the mixture consisting of auxiliary material and fluid paint overspray cleaned off the filter elements in the reservoir in a simple and efficient manner.

Thereby, the storage tank is preferably arranged directly vertically below the filter devices from which the reservoir receives the cleansed material.

Furthermore, provision may be made for the partial streams of crude gas to be fed at least partly through the reservoir in order to thereby pick up auxiliary material from the reservoir.

Furthermore, provision may be made for the method of operating a paint shop to comprise the following method step:
delivering a medium forming a layer that differs from the paint for painting the workpieces for the purposes of applying a layer to a surface by means of the application unit.

Consequently, there is provided a method for the operation of a painting device which is employable in a flexible manner and is capable of being carried out in a small area using as small a number of components as possible, since both paint and a medium forming a layer differing from the paint are delivered by means of the application unit.

In a special embodiment of this method, provision is made for a surface that is located outside the painting device itself to be coated by means of the medium.

It is expedient, if a chemical reaction takes place between the layer-forming medium and the paint, and in particular between the layer-forming medium and the paint overspray.

It is particularly expedient, if the layer-forming substance changes from a gel-like state into a film-like state.

The chemical reaction may take place, in particular, between a substance of the layer-forming medium comprising an amine group and the paint.

Furthermore, provision may be made in the method of operating a paint shop for an auxiliary material to be supplied to the stream of crude gas loaded with fluid paint overspray, wherein a mixture of auxiliary material and fluid paint overspray is disposed in an auxiliary material reservoir and the weight or the mass of the mixture in the auxiliary material reservoir is determined by means of a balance.

Hereby in particular, the balance may be coupled to a lower section of the auxiliary material reservoir which is mechanically decoupled from an upper section of the auxiliary material reservoir.

Furthermore, the weight or the mass of the lower section of the auxiliary material reservoir and of the material contained therein is preferably determined by means of the balance.

In order to be able to judge the continued usefulness of the material contained in the auxiliary material reservoir for the purposes of coating the at least one filter element with a protective layer, provision may be made for the material to be whirled up from the auxiliary material reservoir in at least one whirling-up phase and for the cleaning capacity or effectiveness of the material contained in the auxiliary material reservoir to be determined by a comparison of the weight or the mass of the material contained in the auxiliary material reservoir before the whirling-up phase and after the whirling-up phase.

The "effectiveness" is a measure for the ability of the material to adhere to the filter element and bind to fluid paint overspray.

Such an effectiveness can be determined, in particular, as the quotient of the reduction of the weight or the mass of the material contained in the auxiliary material reservoir due to the fluidising or whirling-up process and the net fluidising time.

For the purposes of determining the effectiveness with greater precision, provision may be made for a whirling-up cycle to be effected with a plurality of whirling-up phases that are separated from each other by whirling-up pauses and for the weight or the mass of the material contained in the auxiliary material reservoir before the first whirling-up phase of the whirling-up cycle and after the last whirling-up phase of the whirling-up cycle to be compared for the purposes of determining the effectiveness.

The larger the value for this effectiveness, the more suitable the material from the auxiliary material reservoir is for forming a protective layer on the at least one filter element.

Consequently, it is expedient for material to be extracted from the auxiliary material reservoir if the determined effectiveness and/or the determined weight or mass difference falls below a given minimum value.

The extracted material, a mixture consisting of auxiliary material and fluid paint overspray, is replaced in this case by fresh auxiliary material.

Furthermore, when cleaning at least one filter element of the at least one filter device, provision may be made in the case of the method of operating a paint shop for auxiliary material to pass from the filter element concerned through at least one passage opening in an upper guidance element which bounds an inlet opening of the filter device in the upward direction to a lower guidance element which bounds the inlet opening of the filter device in the downward direction.

Furthermore, the present invention relates to a method for manufacturing a device for separating fluid paint overspray from a stream of crude gas containing overspray particles, which comprises the following method steps:
a) pre-assembling at least one unit for use in a device for separating fluid paint overspray from a stream of crude gas containing overspray particles at a point of manufacture, wherein the unit comprises the following:
a filter element accommodating chamber for accommodating at least one filter element for separating the overspray from the stream of crude gas;
at least one auxiliary material reservoir for accommodating an auxiliary material which is supplied to the stream of crude gas before the stream of crude gas passes the at least one filter element;
at least one partition wall for separating the filter element accommodating chamber from a flow chamber of the device for separating fluid paint overspray through which the stream of crude gas flows before entering the unit; and
at least one inlet opening through which the stream of crude gas enters the unit from the flow chamber;
b) transporting the at least one pre-assembled unit from the point of manufacture to an assembly point;
c) arranging the at least one pre-assembled unit in a working position at the assembly point.

A method of manufacturing a device for separating fluid paint overspray from a stream of crude gas containing overspray particles which is feasible in a particularly simple and rapid manner is thereby provided.

In accordance with the method described, the device for separating fluid paint overspray may be built up in a simple manner from a number of pre-assembled units which corresponds to the desired capacity.

In particular, provision may be made for the at least two pre-assembled units to be manufactured at a point of manufacture, transported to the assembly point, arranged in a working position and connected to one another or to a partition wall that is arranged therebetween.

As a supplement thereto, the pre-assembled units may be connected to a support structure of the application area of a paint shop.

The point of manufacture of the pre-assembled unit is preferably located outside the building in which the device for separating fluid paint overspray from a stream of crude gas is finally installed, and in particular outside the factory site on which this device is installed. Preferably, the unit is pre-assembled at the factory site of a manufacturer and then transported via public traffic routes to the factory site of the operator of the device for separating fluid paint overspray from a stream of crude gas and there, it is built into this device.

Furthermore, the present invention relates to a method for the conversion of an existing device for separating fluid paint overspray from a stream of crude gas containing overspray particles which comprises a support structure for an application area, wherein the method comprises the following method steps:

a) pre-assembling at least one unit for use in a device for separating fluid paint overspray from a stream of crude gas containing overspray particles at a point of manufacture, wherein the unit comprises the following:
   a filter element accommodating chamber for accommodating at least one filter element for separating the overspray from the stream of crude gas;
   at least one auxiliary material reservoir for accommodating an auxiliary material which is supplied to the stream of crude gas before the stream of crude gas passes the at least one filter element;
   at least one partition wall for separating the filter element accommodating chamber from a flow chamber of the device for separating fluid paint overspray through which the stream of crude gas flows before entering the unit; and
   at least one inlet opening through which the stream of crude gas enters the unit from the flow chamber;
b) dismantling a part of the existing device so that the area occupied by a pre-assembled unit in the working position thereof is freed up;
c) arranging a pre-assembled unit in the freed up working position;
d) connecting the pre-assembled unit to the support structure for the application area;
e) repeating the steps b), c) and d) until all the pre-assembled units are arranged in their working position and connected to the support structure for the application area.

In this way, an existing device for separating fluid paint overspray can be replaced by the modularly constructed device for a dry process of precipitating fluid paint overspray described above, without there being any necessity to dismantle the application area of the paint shop for painting workpieces, and in particular painting vehicle bodies, or the need to erect a new steel structure for the application area.

Due to the variability in the height of the pre-assembled units and due to the ability to set up two units that are mutually spaced in the transverse direction of the device for precipitating fluid paint overspray at an arbitrary distance from each other, a device manufactured in such a manner for separating fluid paint overspray can be adapted to an application area of arbitrary dimensions in the longitudinal direction and in the transverse direction.

In particular, it is possible to replace an existing device for a wet process of separating fluid paint overspray by means of a washing process by the modularly constructed device for a dry process of separating fluid paint overspray that has been described hereinabove.

Further features and advantages of the invention form the subject matter of the following description and the graphical illustration of exemplary embodiments.

BRIEF DESCRIPTION OF THE DRAWINGS

Similar or functionally equivalent elements are designated by the same reference symbols in each of the Figures.

DETAILED DESCRIPTION OF THE DRAWINGS

Figure 1:
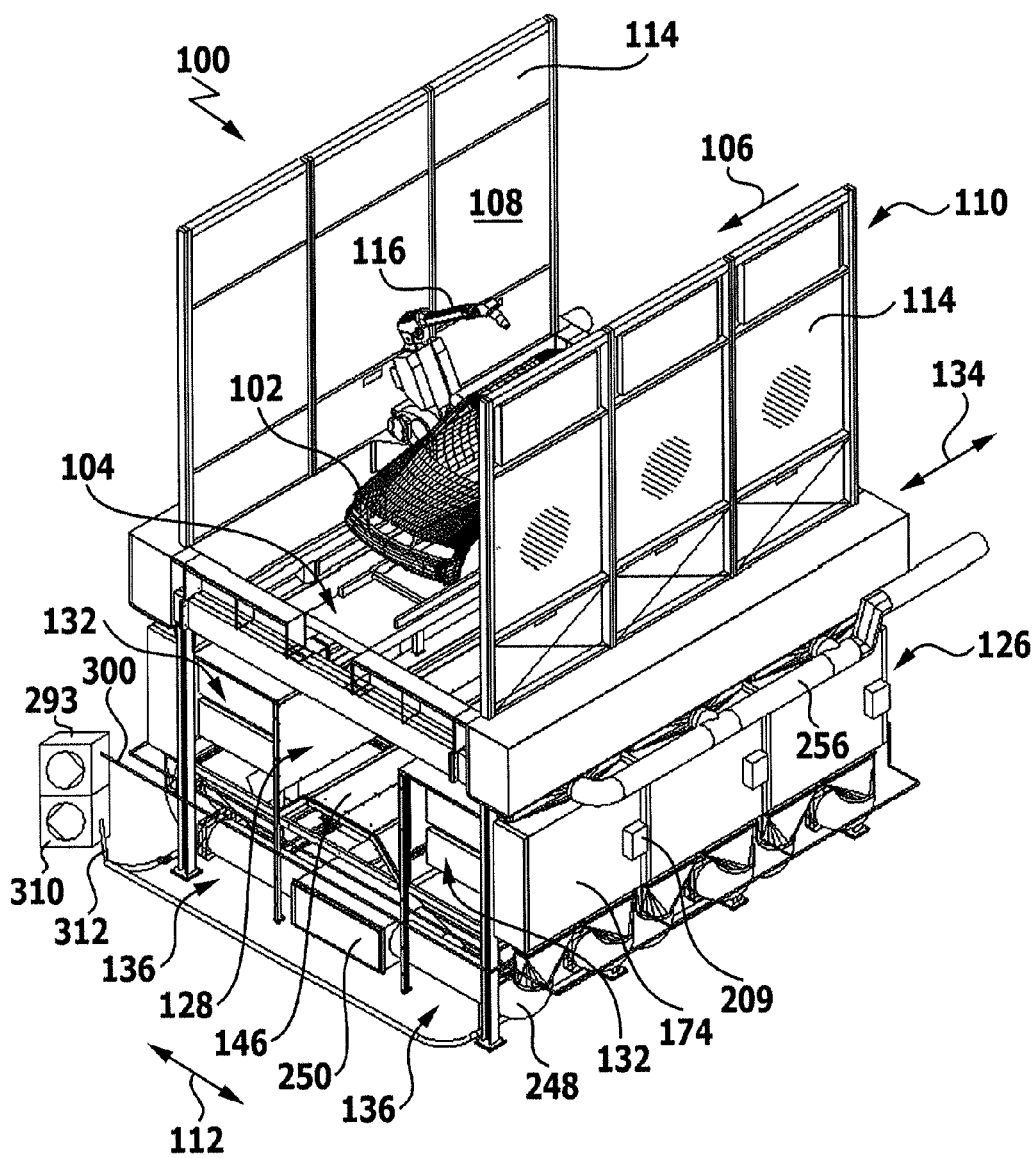
FIG. 1 shows a schematic perspective illustration of a paint booth with a device for separating fluid paint overspray from a stream of crude gas containing overspray particles which is arranged underneath it and which comprises a flow chamber that is arranged below the paint booth and three filter modules that are located on each side of the flow chamber.

A plant for spray-painting vehicle bodies 102 which bears the general reference 100 and is illustrated in FIGS. 1 to 19 comprises a purely schematically illustrated conveyor device 104 by means of which the vehicle bodies 102 can be moved along a direction of conveyance 106 through an application area 108 of a paint booth bearing the general reference 110.

The application area 108 is the interior space of the paint booth 110 which is bounded, in a horizontal transverse direction 112 running perpendicularly to the direction of conveyance 106 which corresponds to the longitudinal direction of the paint booth 110, on both sides of the conveyor device 104 by a respective booth wall 114.

Spraying mechanisms 116 in the form of painting robots for example, are located in the paint booth 110 on both sides of the conveyor device 104.

Figure 3:
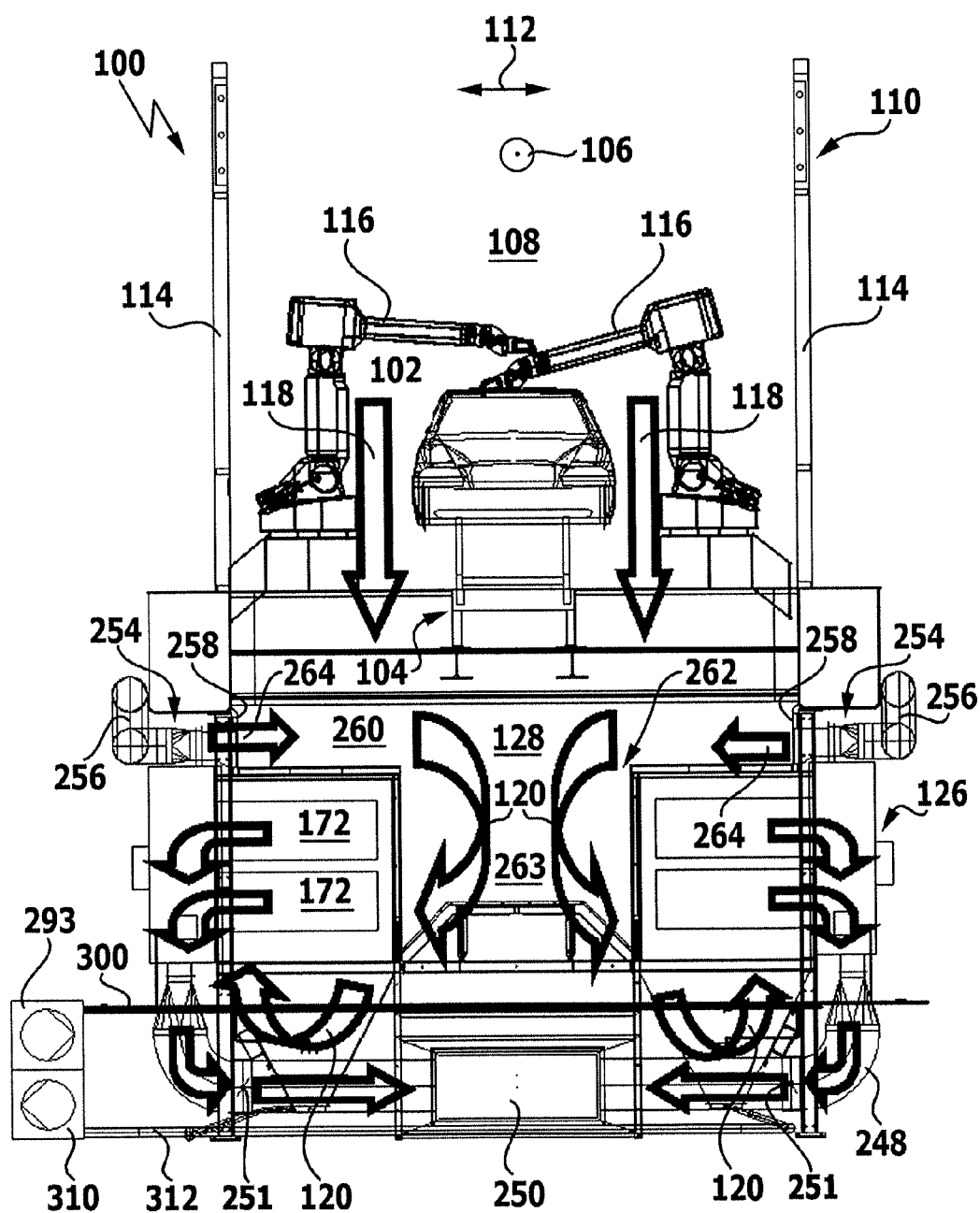
FIG. 3 a schematic vertical cross section corresponding to FIG. 2 through the plant depicted in FIG. 1 wherein additionally, the respective directions of flow of the crude gas, the exhaust air emerging from the filter modules and the supply air being fed into the flow chamber for the production of transverse air curtains are indicated by arrows.
Figure 4:
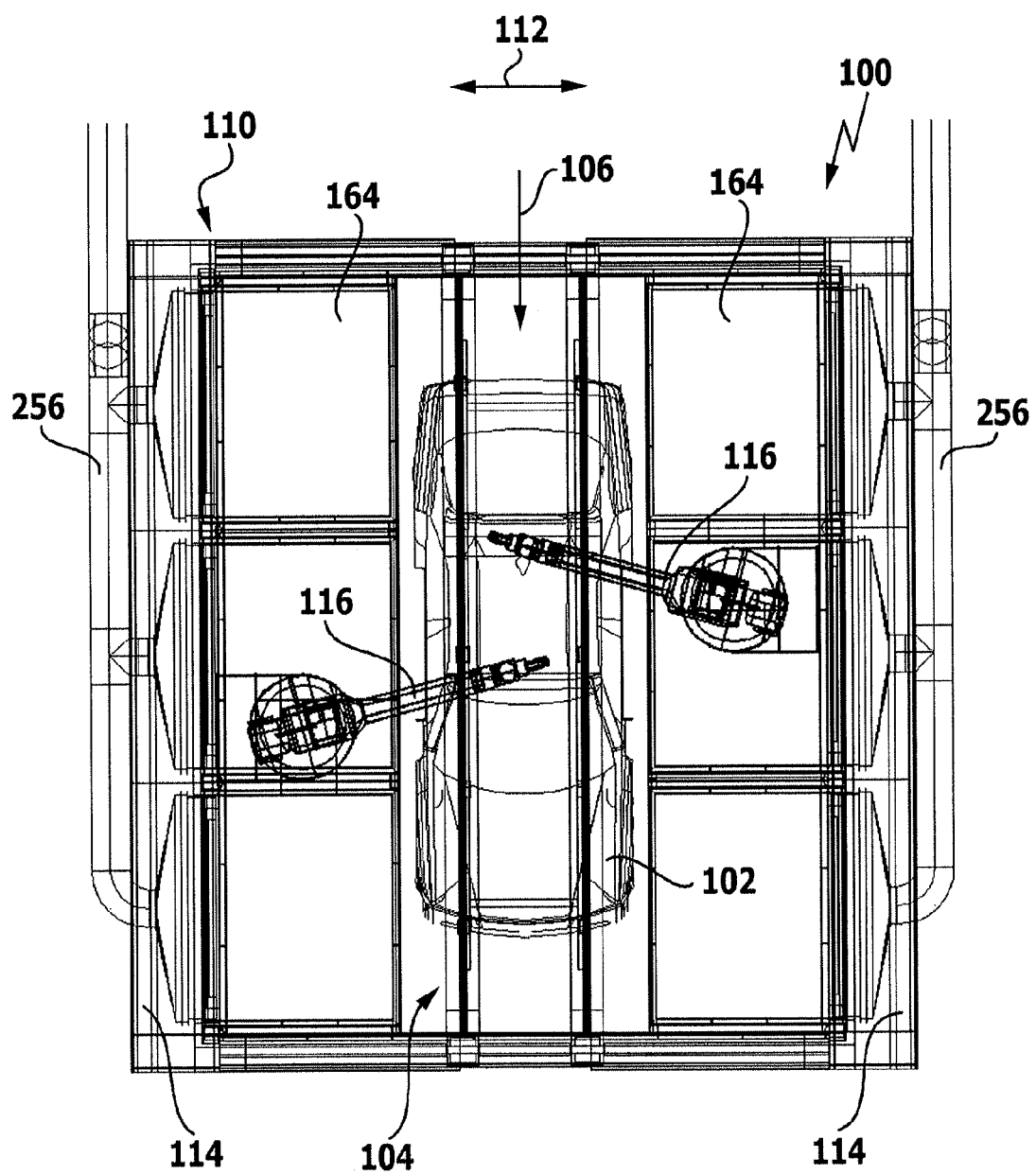
FIG. 4 a schematic plan view from above of the plant depicted in FIGS. 1 to 3.
Figure 5:
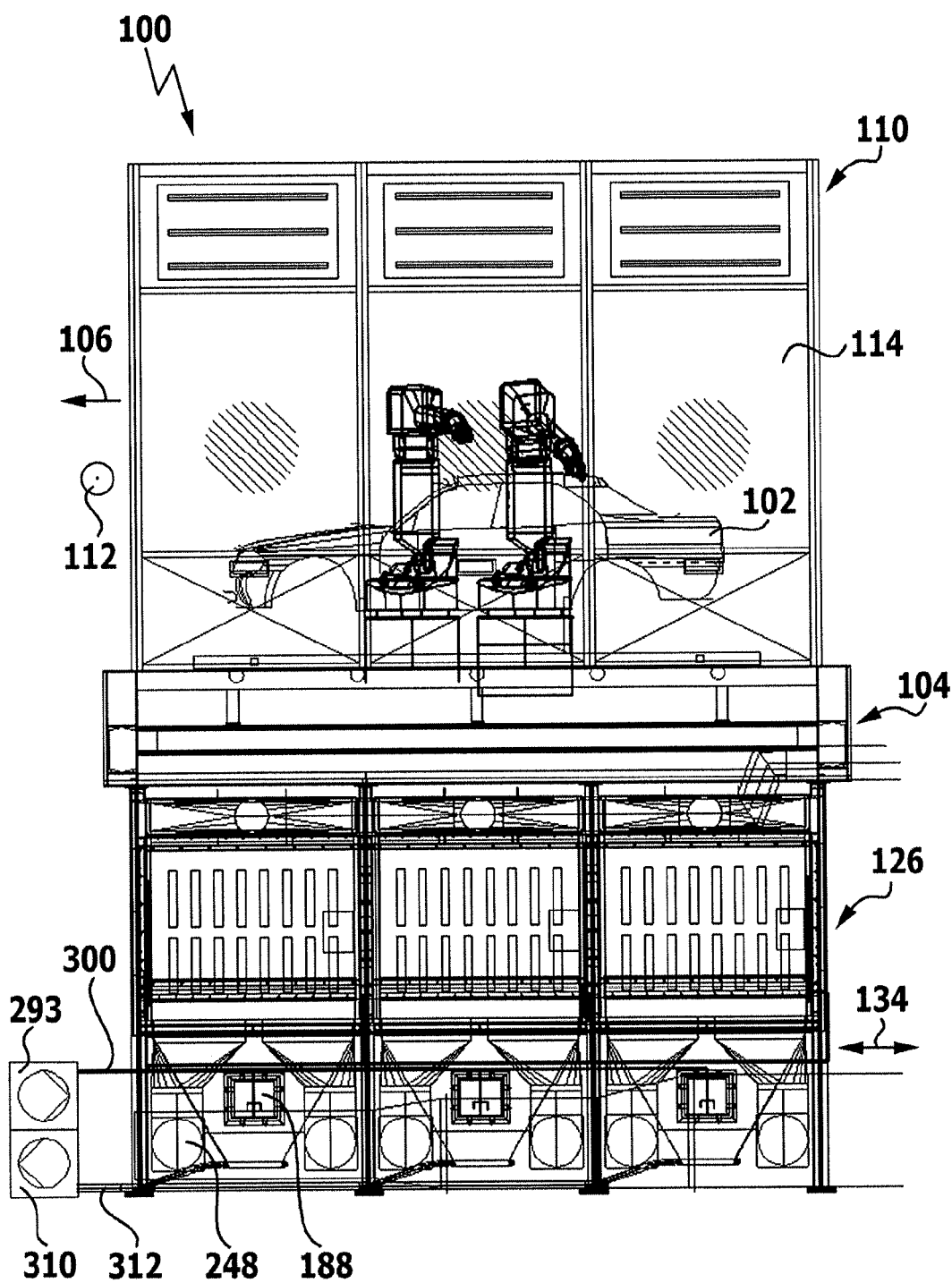
FIG. 5 a schematic side view of the plant depicted in FIGS. 1 to 4.

An air flow which passes substantially vertically downwardly through the application area 108 from above as is indicated in FIG. 3 by the arrows 118 is produced by means of an (only sectionally illustrated) air re-circulating system.

This air flow picks up paint overspray in the form of overspray particles in the application area 108. Here, the term "particle" encompasses both solid and liquid particles, and in particular droplets.

When using fluid paint, the fluid paint overspray consists of paint droplets. Most of the overspray particles have a largest dimension falling within a range of approximately 1 μm to approximately 100 μm.

Figure 10:
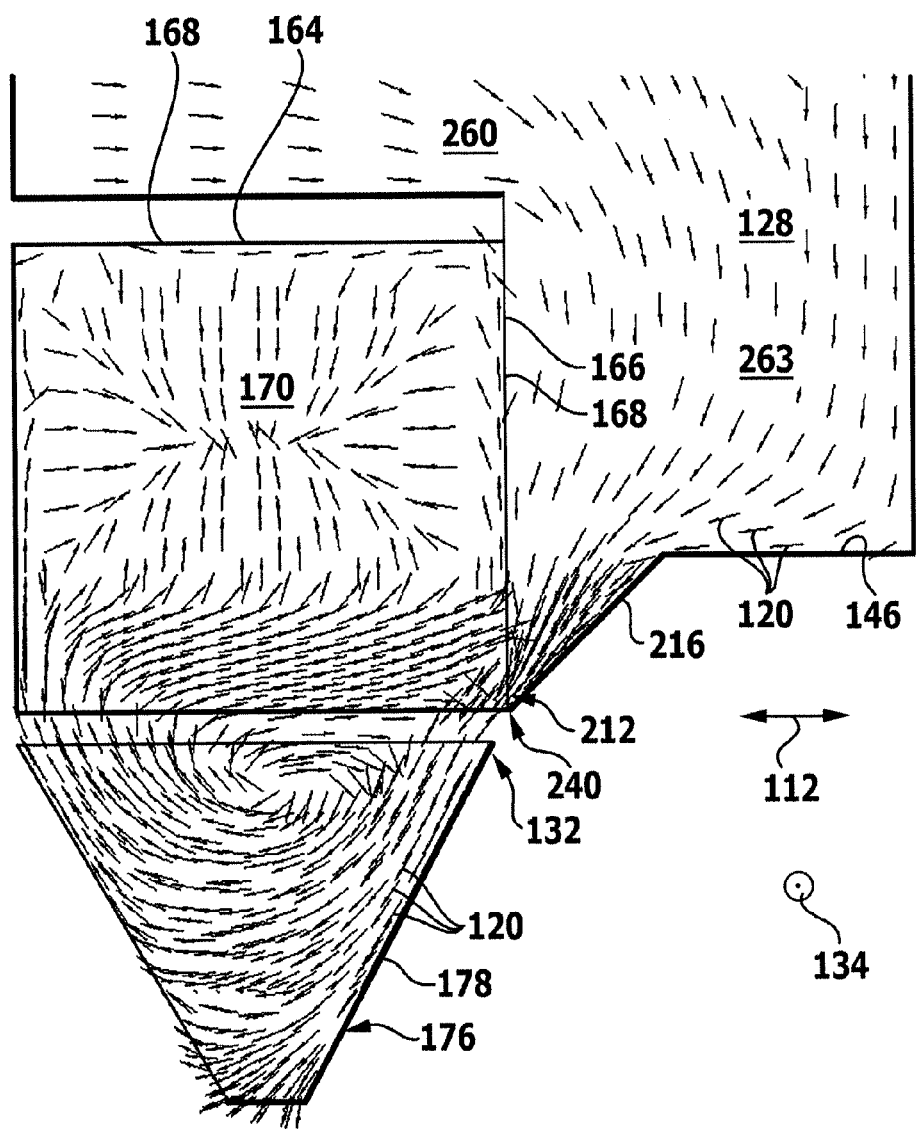
FIG. 10 a schematic vertical cross section through a filter module and the adjoining region of the flow chamber within which the respective local direction of flow of the stream of crude gas is indicated by arrows.
Figure 11:
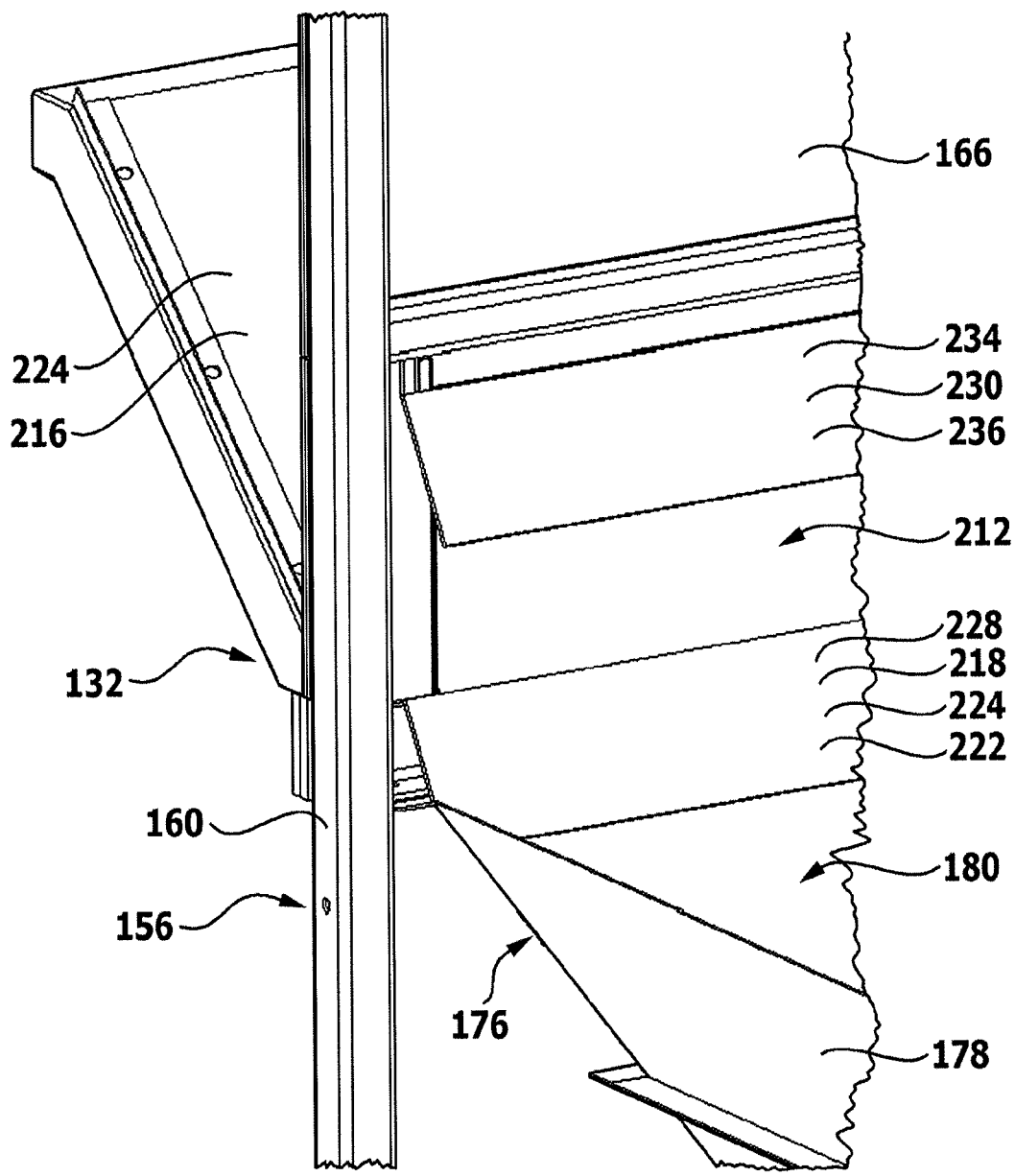
FIG. 11 a schematic perspective illustration of an edge region of an inlet opening of a filter module.

The exhaust air stream loaded with the overspray particles from the application area 108 is referred to in the following as a stream of crude gas. The direction of flow of the stream of crude gas is represented in FIGS. 3 and 10 by arrows 120.

The stream of crude gas leaves the paint booth 110 downwardly and enters a device for separating fluid paint overspray from the stream of crude gas which bears the general reference 126 and is arranged beneath the application area 108.

The device 126 comprises a substantially parallelepipedal flow chamber 128 which extends over the whole length of the paint booth 110 in the direction of conveyance 106 and is bounded in the transverse direction 112 by vertical side walls 130 which are in substantial alignment with the lateral booth walls 114 of the paint booth 110 so that the flow chamber 128 has substantially the same horizontal cross-sectional area as the paint booth 110 and is arranged substantially completely within the vertical projection of the surface area of the paint booth 110.

As can best be seen in FIG. 6, a plurality of e.g. three filter modules 132 (also referred to as filter devices in the description hereinabove) are arranged in each case on both sides of the flow chamber 128 and form two rows of modules 136 that extend in the longitudinal direction 134 (which coincides with the direction of conveyance 106) of the device 126 for separating fluid paint overspray.

Each of the rows of modules 136 comprises two corner modules 138 which form a respective end of a module row 136, and at least one central module 140 which is arranged between two neighbouring filter modules 132.

For the purposes of preventing longitudinal currents of the stream of crude gas in the longitudinal direction 134 of the flow chamber 128 and for preventing the crude gas from flowing between the individual filter modules 132, provision may be made for transverse partition walls 142 which extend vertically in the transverse direction 112 and are each arranged between two successive filter modules 132 in the longitudinal direction 134 and which subdivide the flow chamber 128 into flow chamber sections 144 that follow each other in the longitudinal direction 134.

Due to these transverse partition walls 142, it is possible to obtain a defined setting of the stream of crude gas for each individual filter module 132 independently of the stream of crude gas through the other filter modules 132.

Moreover, regions having different quantities of overspray or different types of paint (for a purely type-separation process) can be separated by the transverse partition walls 142.

Figure 2:
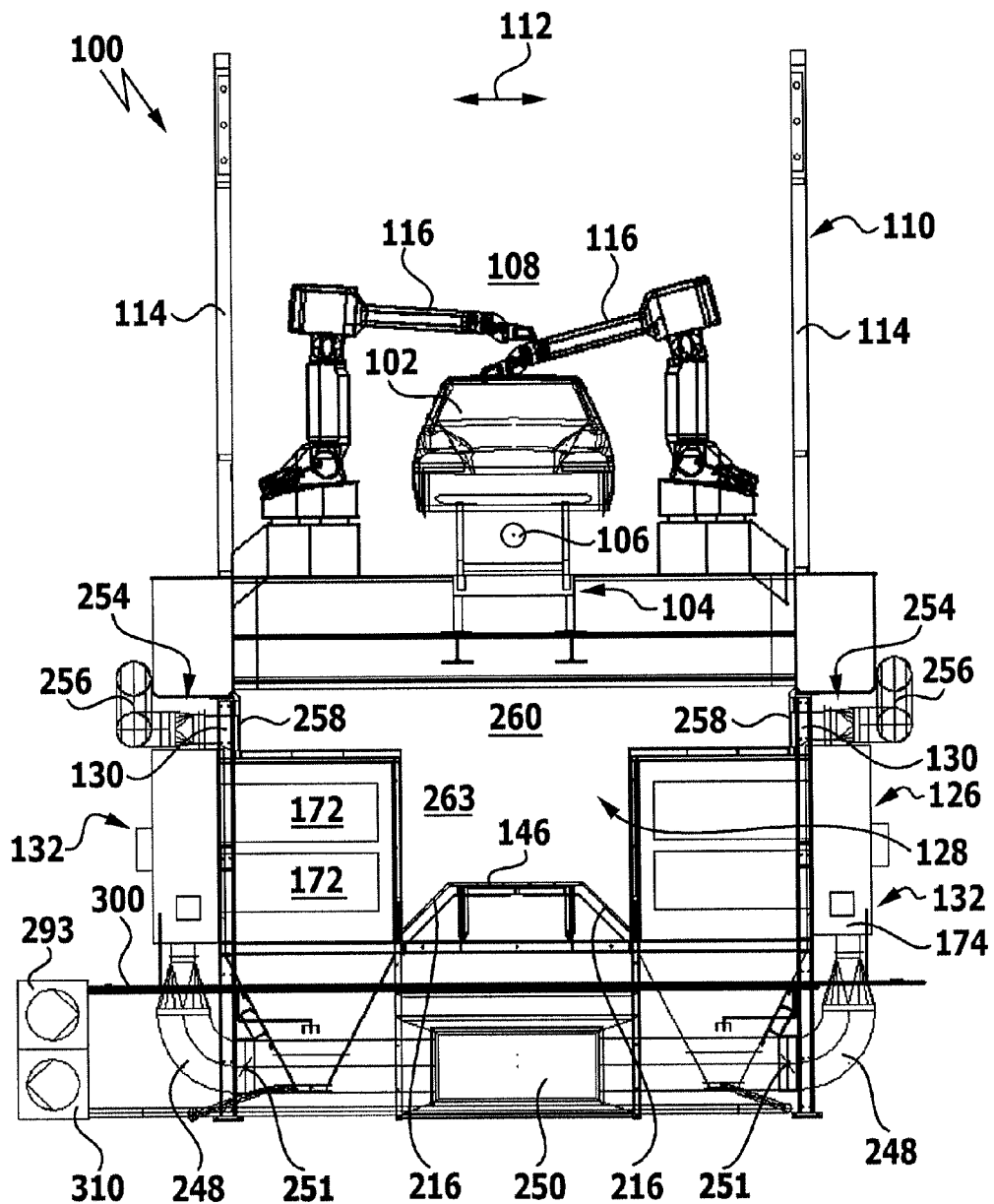
FIG. 2 a schematic vertical cross section through the plant depicted in FIG. 1.

As can best be seen in FIG. 2, a gangway 146 that is accessible to an operator is provided between the two rows of modules 136.

Figure 6:
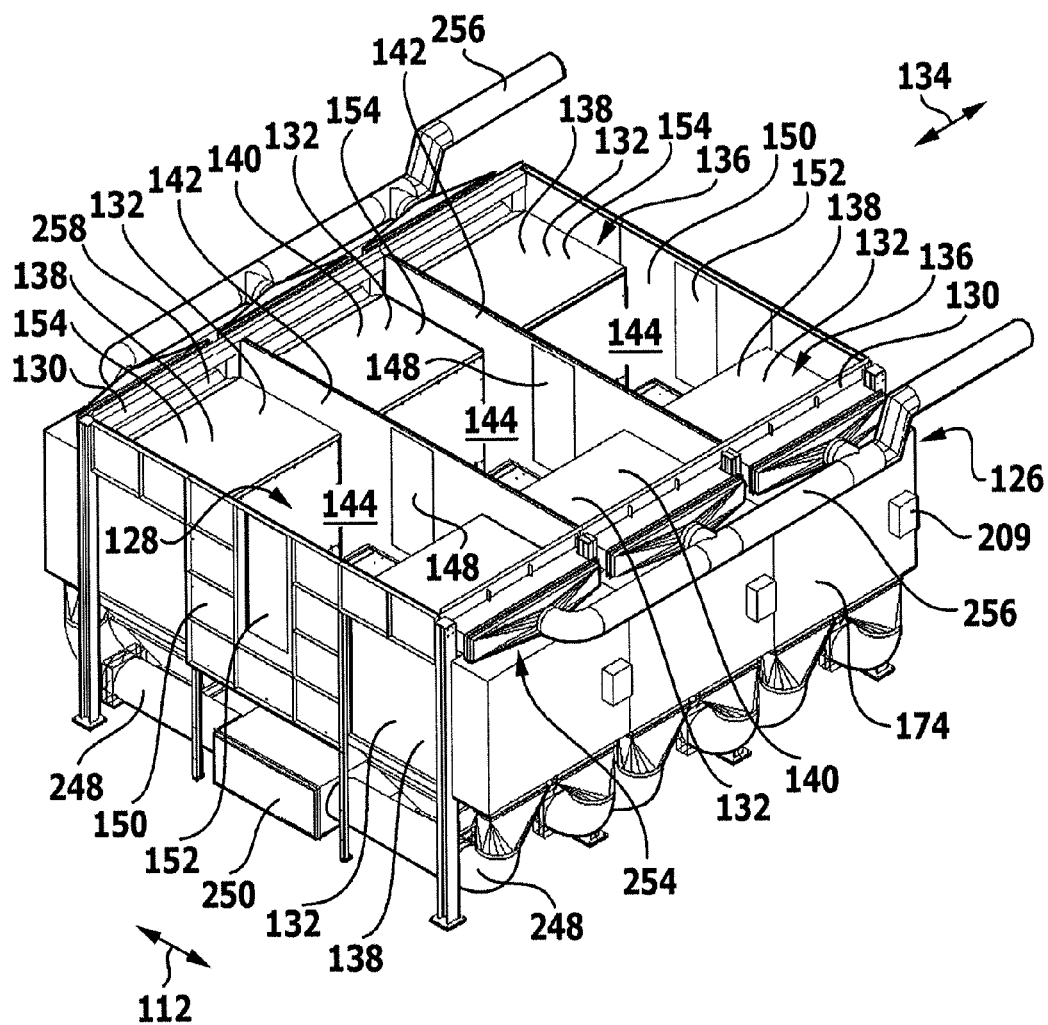
FIG. 6 a schematic perspective illustration of the device for separating fluid paint overspray from a stream of crude gas containing overspray particles which is arranged underneath the paint booth of the plant depicted in FIGS. 1 to 5 and which comprises transverse partition walls that divide the flow chamber into sections which follow each other in the longitudinal direction of the flow chamber.

In order to allow continuous access to the sections of the gangway 146 that are arranged in the successive flow chamber sections 144, passage doors 148 are provided in the transverse partition walls 142 (FIG. 6).

The end face walls 150 of the flow chamber 128 which close the flow chamber 128 at the front end and the rear end thereof are provided with entrance doors 152 through which an operator can enter the flow chamber 128 from the outside.

Each of the filter modules 132 is in the form of a pre-assembled unit 154 which is manufactured at a place that is located at a distance from the assembly point of the paint shop and transported as a unit to the assembly point of the paint shop. At the assembly point, the pre-assembled unit 154 is arranged in the intended working position and connected to one or more neighbouring pre-assembled units 154 or to the transverse partition walls 142 arranged therebetween as well as to a support structure of the application area 108.

Figure 7:
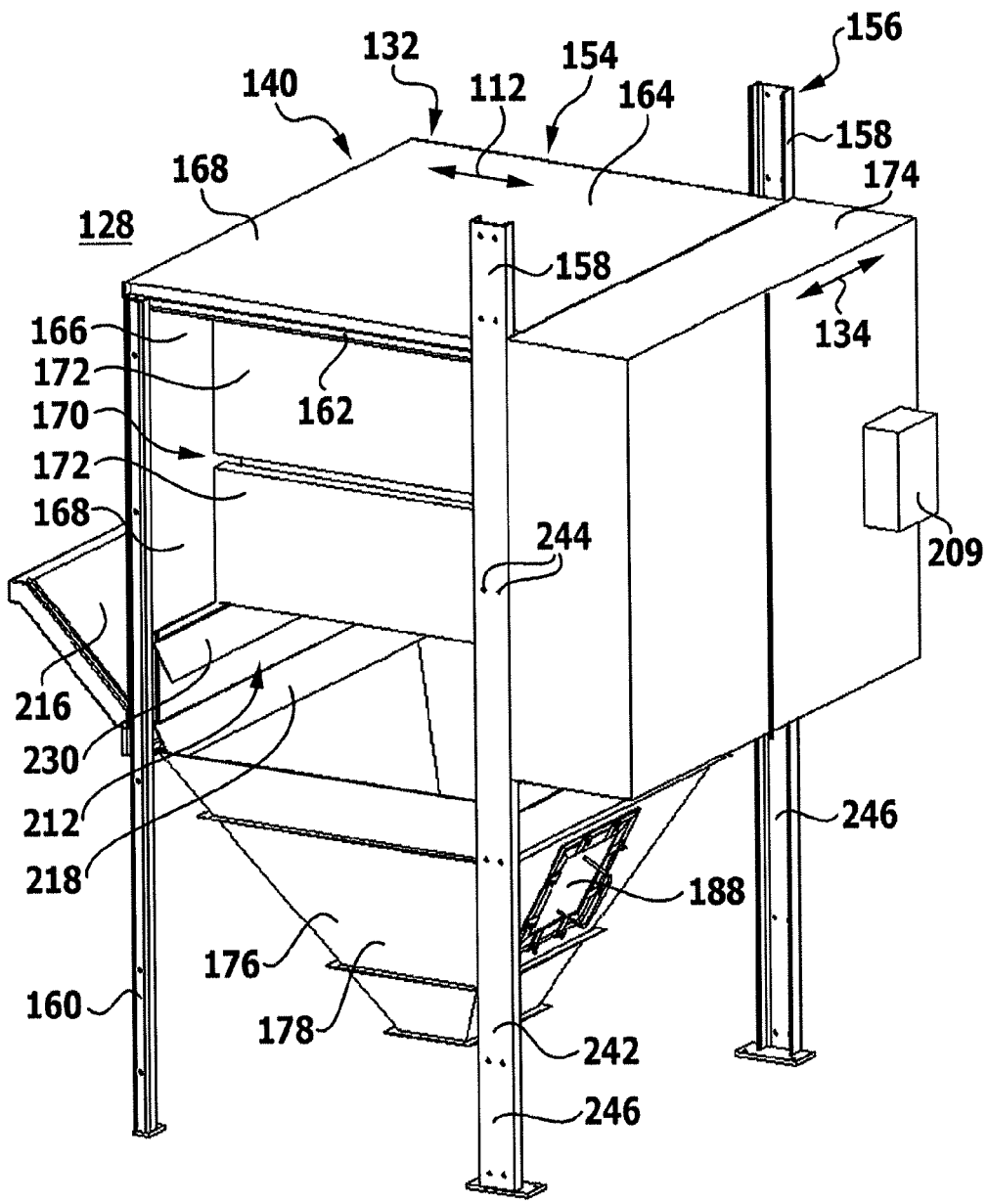
FIG. 7 a schematic perspective illustration of an individual filter module which is intended to be arranged between two neighbouring further filter modules (central module)

The construction of a filter module 132 is described hereinafter with reference to FIGS. 7 and 9 to 16 using the example of a central module 140:

The module comprises a support structure 156 consisting of two vertical rear supports 158 and two vertical front supports 160 which are each connected at their upper ends by horizontal tie bars 162 to one of the rear supports 158 (FIG. 7).

Furthermore, the front supports 160 are connected together at their upper ends by means of a further (not illustrated) tie bar.

The rear supports 158 are also connected together by means of (not illustrated) tie bars or by means of a (not illustrated) connecting framework.

The tie bars at the upper end of the support structure 156 carry a horizontal covering wall 164.

A vertical front wall 166 of the filter module 132 is held on the front faces of the front supports 160.

The covering wall 164 and the front wall 166 form partition walls 168 of the filter module 132 which separate a filter element accommodating chamber 170 arranged within the filter module 132 from the region of the flow chamber 128 located outside the filter module 132.

In the filter element accommodating chamber 170 of the filter module 132, there are a plurality of, ten for example, filter elements 172 which are arranged in two rows above one another and project in the horizontal direction from a common base body 174 which is held on the rear faces of the rear supports 158.

The filter elements 172 may, for example, be constructed from plates of sintered polyethylene which are provided on their outer surface with a membrane of polytetrafluorethylene (PTFE).

The coating of PTFE serves to increase the filter class of the filter elements 172 (i.e. to reduce their permeability) and furthermore prevents permanent adherence of the fluid paint overspray that has been separated from the stream of crude gas.

Furthermore, the coating of the filter elements 172 contains an electrically conductive component such as graphite for example, in order to tap-off electrostatic charges from the filter elements 172 and ensure antistatic properties for the filter elements 172.

Both the base material of the filter elements 172 and the PTFE coating thereof exhibit porosity so that the crude gas can enter through the pores into the interior space of the respective filter element 172.

Furthermore, in order to prevent the filter surfaces from sticking together, they are provided with a barrier layer consisting of the auxiliary material that is being introduced into the stream of crude gas. This preferably particle-like auxiliary material is also usually referred to as a "precoat" material.

In operation of the device 126, the barrier layer is formed by deposition of the auxiliary material that has been introduced into the stream of crude gas 120 onto the filter surfaces, and it prevents the filter surfaces from sticking together due to the adhering fluid paint overspray.

Auxiliary material from the stream of crude gas 120 also settles on the interior surfaces of the covering wall 164 and the front wall 166 of the filter module 132 where it likewise prevents adherence of fluid paint overspray.

In principle, any medium can be used as the auxiliary material so long as it is capable of absorbing the liquid portion of the fluid paint overspray and depositing itself on overspray particles and thus taking the stickiness thereof.

In particular for example, chalk, stone dust, aluminium silicates, aluminium oxides, silicon oxides, powder coating or the like come into consideration as auxiliary materials.

As an alternative or in addition thereto, particles having a cavity-like structure and an internal surface area that is large relative to the external dimensions thereof, such as zeolites or other hollow e.g. spherical bodies of polymers, glass or aluminium silicate and/or natural or synthetically produced fibres for example could also be used as an auxiliary material for receiving and/or binding the overspray.

As an alternative or in addition thereto, particles which react chemically with the overspray such as chemically reactive particles of amine-, epoxide-, carboxyl-, hydroxyl or isocyanate groups, chemically reactive particles of aluminium oxide treated with octyl silane or solid or liquid mono-, oligo or polymers, silanes, silanole or siloxane could also be used as an auxiliary material for receiving and/or binding the overspray.

A waste product from a production process such as a waste product from the processing of powder coatings or fine wood shavings or metal filings resulting from a wood- or metal-working process for example could also be used as an auxiliary material.

The auxiliary material preferably consists of a multiplicity of auxiliary material particles which have an average diameter falling within the range of approximately 10 μm to approximately 100 μm for example.

Figure 13:
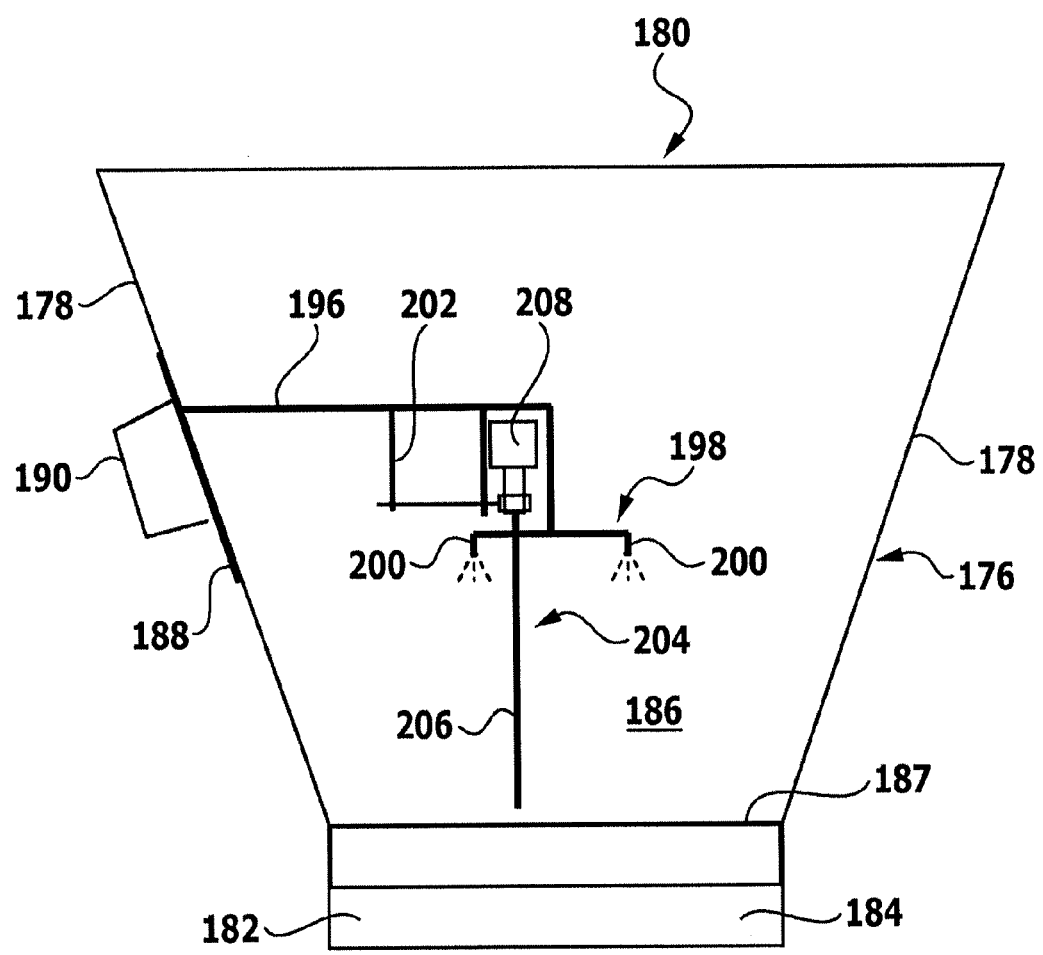
FIG. 13 a schematic vertical section through an auxiliary material reservoir having a level sensor and a fluidising device arranged in the interior of the container.

In order to enable the auxiliary material to be added to the stream of crude gas without the danger arising that the auxiliary material enters the application area 108 of the paint shop 100, each filter module 132 is provided with an auxiliary material reservoir 176 which is held on the support structure 156 and has a funnel-like appearance in the shape of an inverted frustum of a pyramid for example (FIG. 13).

The four trapezoidal side walls 178 of the auxiliary material reservoir 176 are inclined to the vertical at an angle of at least approximately 60°.

The height of the auxiliary material reservoir 176 amounts to approximately 1.1 m for example.

The upper edges of the side walls 178 enclose an entrance opening 180 of the auxiliary material reservoir 176 through which the stream of crude gas loaded with overspray 120 can enter the auxiliary material reservoir 176 and escape therefrom again.

The substantially horizontally oriented base 182 is in the form of a porous fluid base 184 which is flushable with a gaseous medium and in particular with compressed air in order to fluidise the auxiliary material disposed in the interior space 186 of the auxiliary material reservoir 176 and locally equalize the different height levels of the auxiliary material within the auxiliary material reservoir 176.

When the plant 100 is operating, the fluid base is actuated intermittently, for example, three times per minute for approximately two seconds on each occasion.

Figure 16:
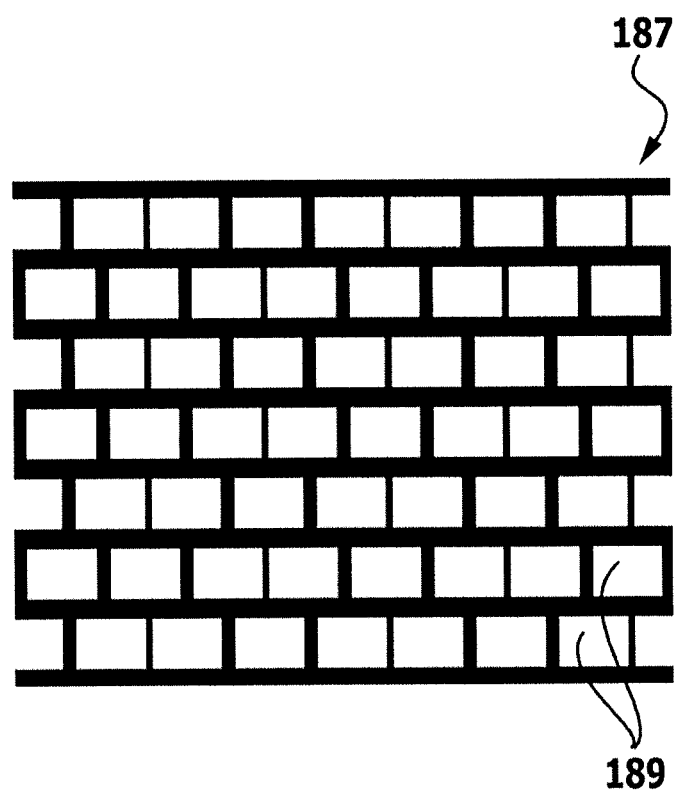
FIG. 16 a schematic plan view from above of a collector grid that is arranged in the auxiliary material reservoir depicted in FIG. 13.

In order to prevent the fluid base 184 from being damaged by falling larger objects, a collector grid or a retaining grid 187 is arranged at a distance of 20 cm for example above the fluid base 184, said grid extending in the horizontal direction over the entire cross section of the interior space 186 of the auxiliary material reservoir 176 and comprising a plurality of rows of honeycomb or rectangular passage openings 189 for the passage of auxiliary material through the retaining grid 187. The passage openings are arranged such as to be mutually displaced from row to row and have a size of approximately 30 mm×30 mm for example (FIG. 16).

Figure 14:
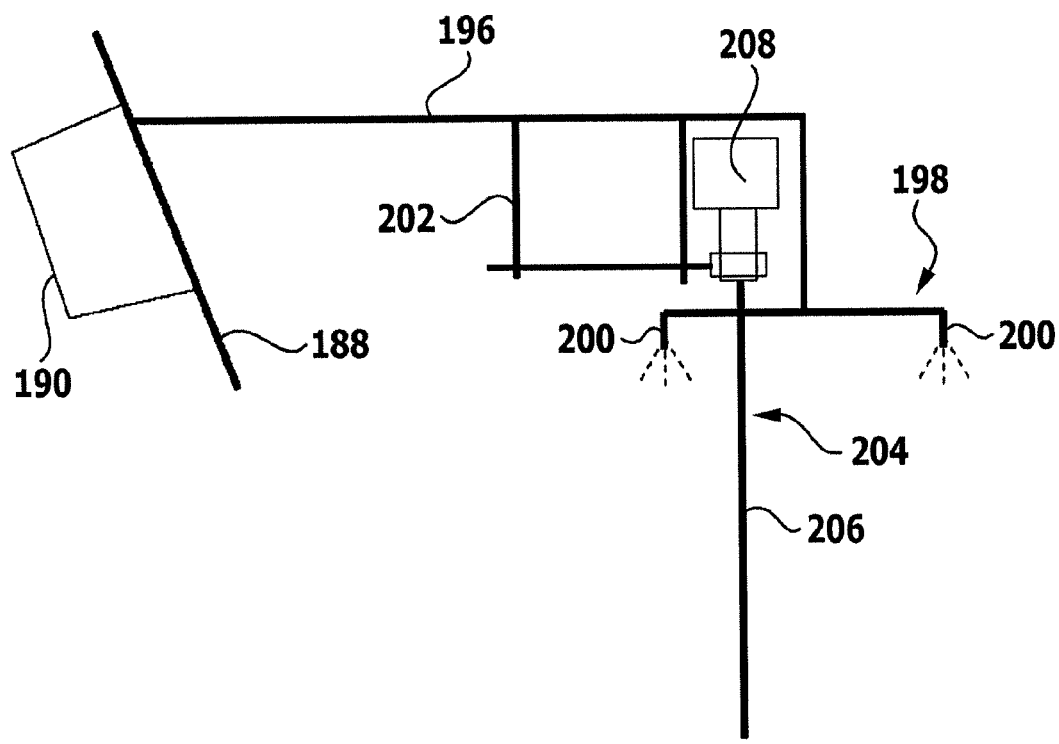
FIG. 14 a schematic side view of an inspection door of the auxiliary material reservoir depicted in FIG. 13, together with a level sensor and a fluidising device that are held on the inspection door.
Figure 15:
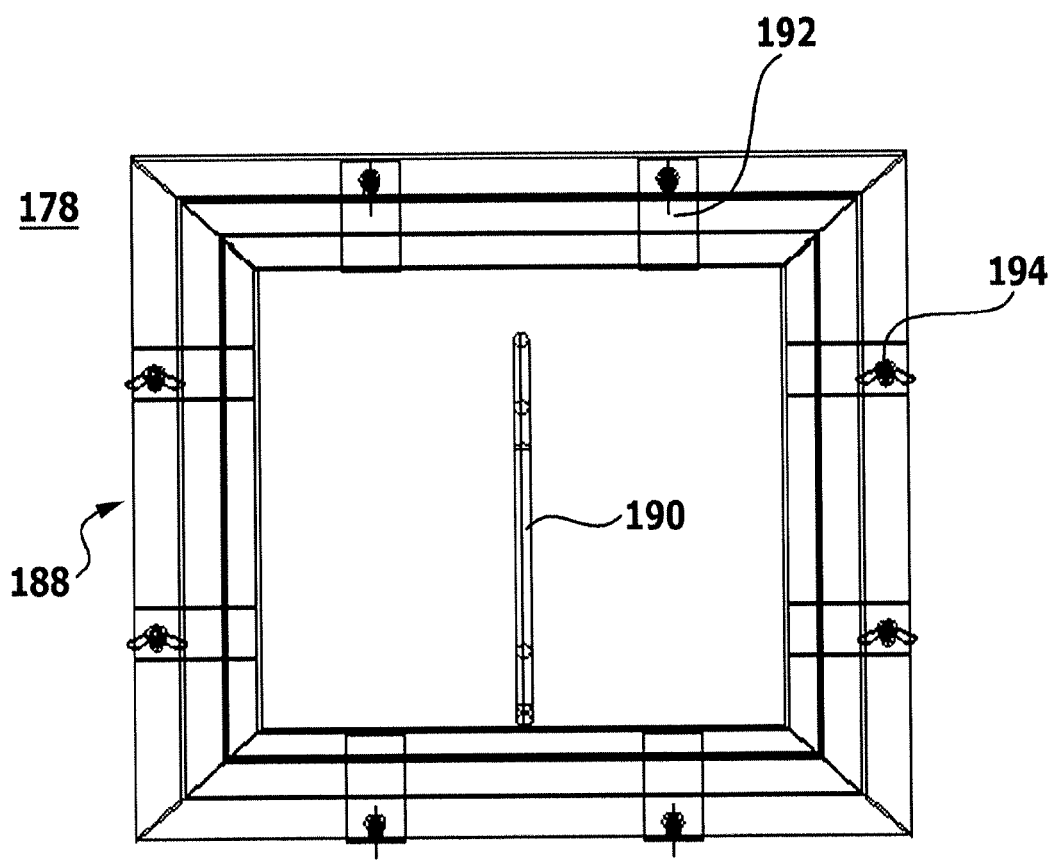
FIG. 15 a schematic plan view of the exterior of the inspection door depicted in FIG. 14.

In order to allow access to the interior space 186 of the auxiliary material reservoir 176 for maintenance purposes, one of the side walls 178 is provided with an inspection opening which is closed during the operation of the filter module 132 by an inspection door 188 having a handle 190 (see FIGS. 13 to 15).

As can be seen in FIG. 15, the inspection door 188 is held in releasable manner on the associated side wall 178 of the auxiliary material reservoir 176 by means of clamps 192 with wing nuts 194.

A compressed air pipeline 196, which leads to a fluidising device 198, is held on the inspection door 188 (FIG. 14).

The fluidising device 198 serves to deliver blasts of compressed air into the auxiliary material located below in order to whirl up this auxiliary material and thereby introduce it into the flow of crude gas that is being passed through the auxiliary material reservoir 176.

Moreover, due to the whirling up of the auxiliary material by means of the fluidising device 198, the mixture consisting of auxiliary material and the overspray that is bound thereto which is present in the auxiliary material reservoir 176 is homogenised.

When the paint shop 100 is operating, the fluidising device 198 is activated intermittently, for example, four times per minute for approximately 5 seconds on each occasion.

The fluidising device 198 comprises a plurality of, two for example, outlet nozzles 200 for compressed air which are in the form of conical jets and can each produce a cone of compressed air which widens out downwardly towards the base 182 of the auxiliary material reservoir 176.

Preferably, the outlet nozzles 200 are constructed and arranged in such a way that the compressed air cones produced by the outlet nozzles 200 together sweep over the entire extent of the base surface of the auxiliary material reservoir 176.

Furthermore, a mounting plate 202 for a level sensor 204 is arranged on the compressed air pipeline 196, said sensor comprising a rod-shaped sensor element 206 and a sensor housing 208 having the sensor electronics accommodated therein (FIG. 14).

The level sensor 204 is in the form of an analogue and in particular capacitive sensor and it serves to produce a signal which corresponds in each case to a value from a multiplicity of discrete height levels or from a continuum of height levels in order to enable the level of the auxiliary material in the auxiliary material reservoir 176 to be determined in as precise a manner as possible.

The rod-shaped sensor element 206 of the level sensor 204 is oriented substantially vertically and is arranged as far as possible from the side walls 178 of the auxiliary material reservoir 176 in the proximity of the centre of the interior space 186 of the auxiliary material reservoir 176 in order that the result of the measurement by the level sensor 204 will be impaired as little as possible by edge effects (FIG. 13).

The rod-shaped sensor element 206 of the level sensor 204 is oriented substantially vertically relative to the horizontal base 182 of the auxiliary material reservoir 176.

Figure 19:
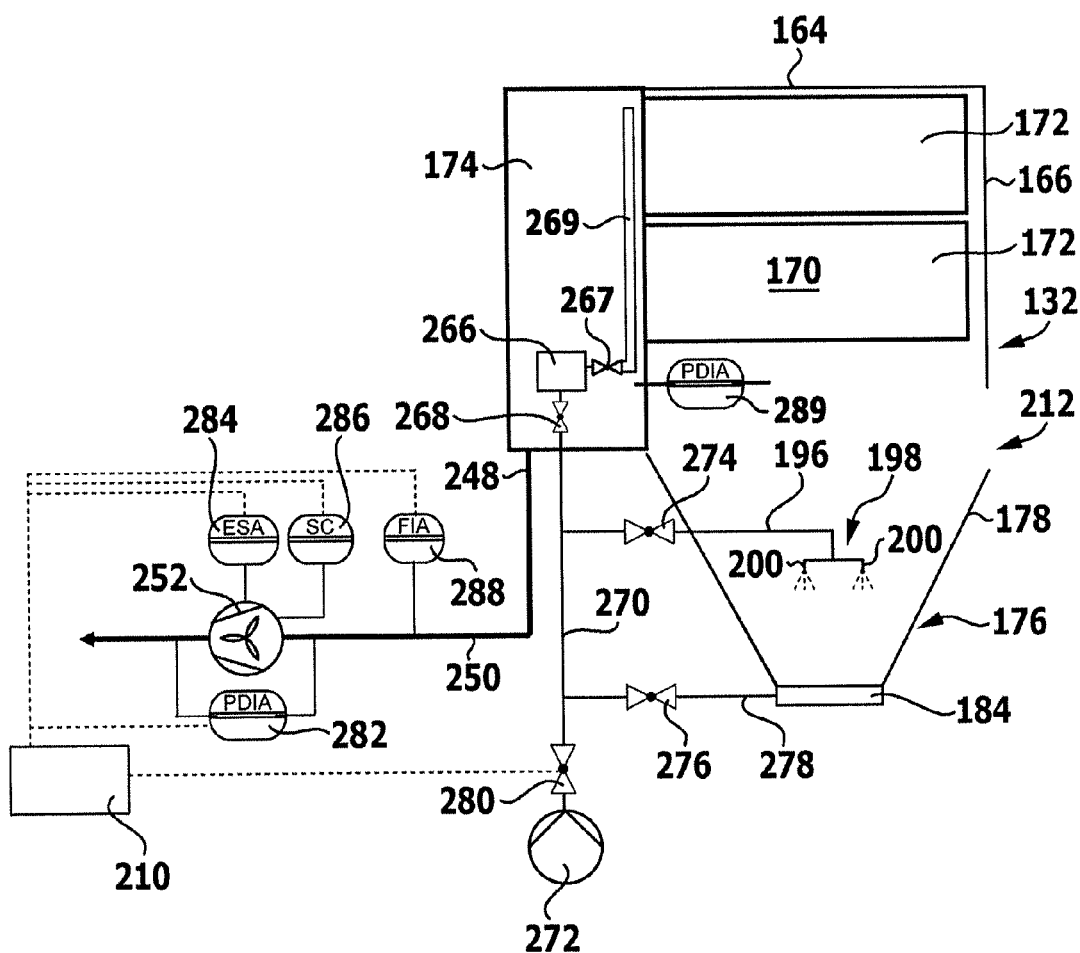
FIG. 19 a schematic illustration of a filter module and of an exhaust air duct with a fan which are arranged downstream of the filter module as well as various devices for monitoring the operational state of the fan and a device for supplying compressed air to the filter elements, to a fluidising unit and to a fluid base of the filter module.

The signal that is produced by the level sensor 204 is transmitted over a (not illustrated) signal line to an electrical connection box 209 of the filter module 132 which is arranged on the base body 174 of the filter elements 172 (see FIG. 7), and from there, it is conveyed to a control device of the paint shop 100 which is schematically illustrated in FIG. 19 and bears the reference 210.

Figure 26:
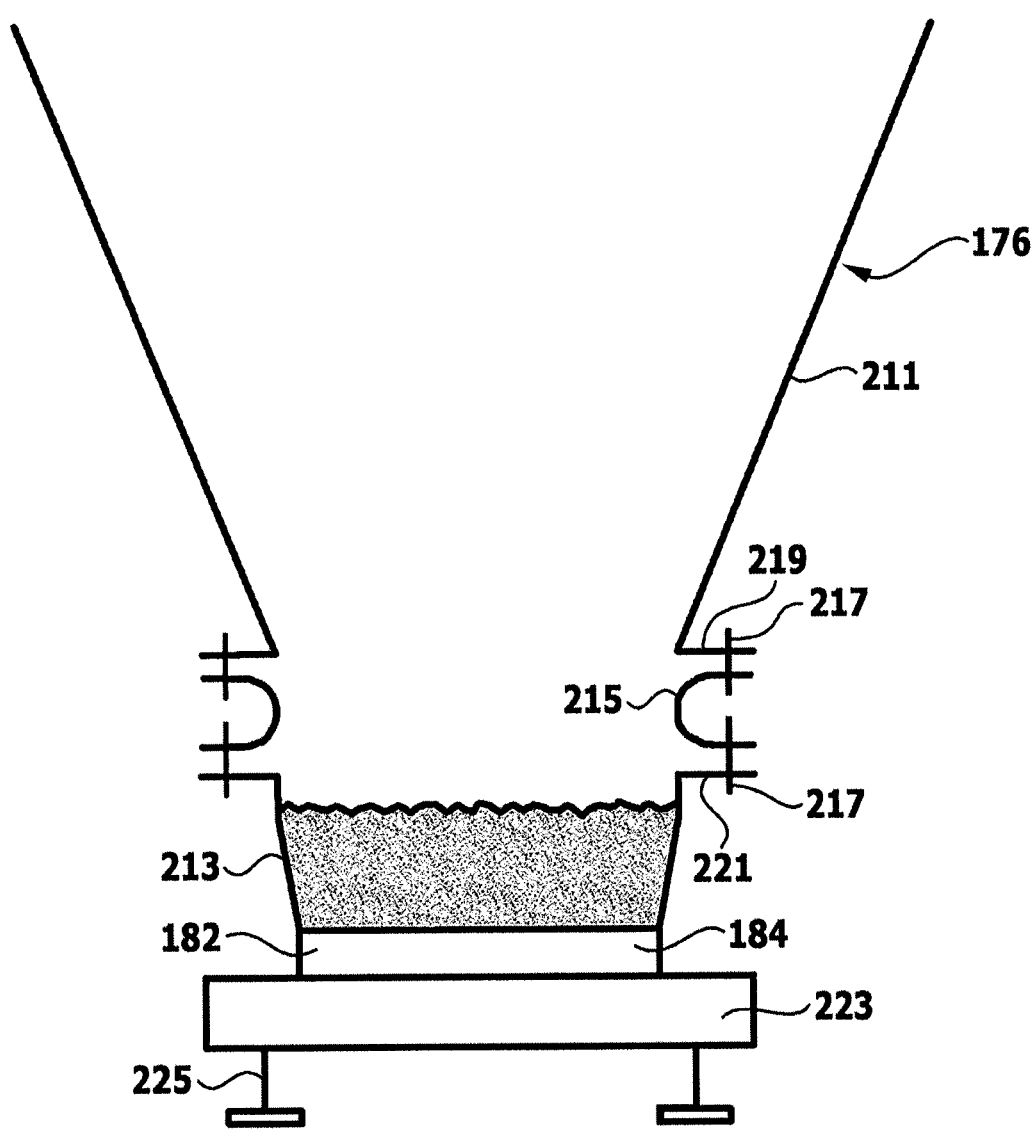
FIG. 26 a schematic vertical section corresponding to FIG. 13 through an alternative embodiment of an auxiliary material reservoir which comprises a lower section and an upper section that are mechanically decoupled by a compensator arranged therebetween, and is provided with a container balance.

In an alternative embodiment of an auxiliary material reservoir 176 which is illustrated in FIG. 26, the quantity of the material that is accommodated in the auxiliary material reservoir 176 is not determined by a measurement of the liquid level, but rather, by a measurement of the weight.

To this end, the auxiliary material reservoir 176 is subdivided into an upper section 211 and a lower section 213, wherein the two sections are connected together by a compensator 215 which is in the form of a ring-like, closed, collar-like, flexible element which is connected on the one hand to a mounting flange 219 at the lower end of the upper section 211 and on the other hand to a mounting flange 221 at an upper end of the lower section 213 of the auxiliary material reservoir 176 by suitable fixing means 217.

The compensator 215 may be formed from a flexible plastic material for example.

The base 182 of the lower section 213 of the auxiliary material reservoir 176 is in the form of a porous fluid base 184 as is the case for the embodiment illustrated in FIG. 13.

The base 182 rests on a container balance 223 which is supported on a foundation by feet 225.

The material accommodated in the auxiliary material reservoir 176 (a mixture of auxiliary material and fluid paint overspray that has been cleaned off the filter elements 172) is located entirely in the lower section 213 of the auxiliary material reservoir 176 which is mechanically decoupled by the compensator 215 from the upper section 211 and thus from the other components of the filter module 132

Consequently, the sum of the weights of the lower section 213 and that of the material accommodated therein or—after an appropriate calibration process—just the weight of the material accommodated in the lower section 213 of the auxiliary material reservoir 176 is measurable by means of the container balance 223.

The container balance 223 produces an electrical measuring signal which is transmitted over a (not illustrated) signal line to the electrical connection box 209 of the filter module 132 which is arranged on the base body 174 of the filter elements 172 (see FIG. 7), and from there, to a control device of the plant 100 which is schematically illustrated in FIG. 19 and bears the reference 210 therein.

Due to the presence of the container balance 223 in this embodiment of the auxiliary material reservoir 176, one can dispense with the level sensor 204.

Furthermore, the fluidising device 198 may be held on the upper section 211 of the auxiliary material reservoir 176 or on another component of the filter module 132 instead of on the inspection door 188.

Figure 27:
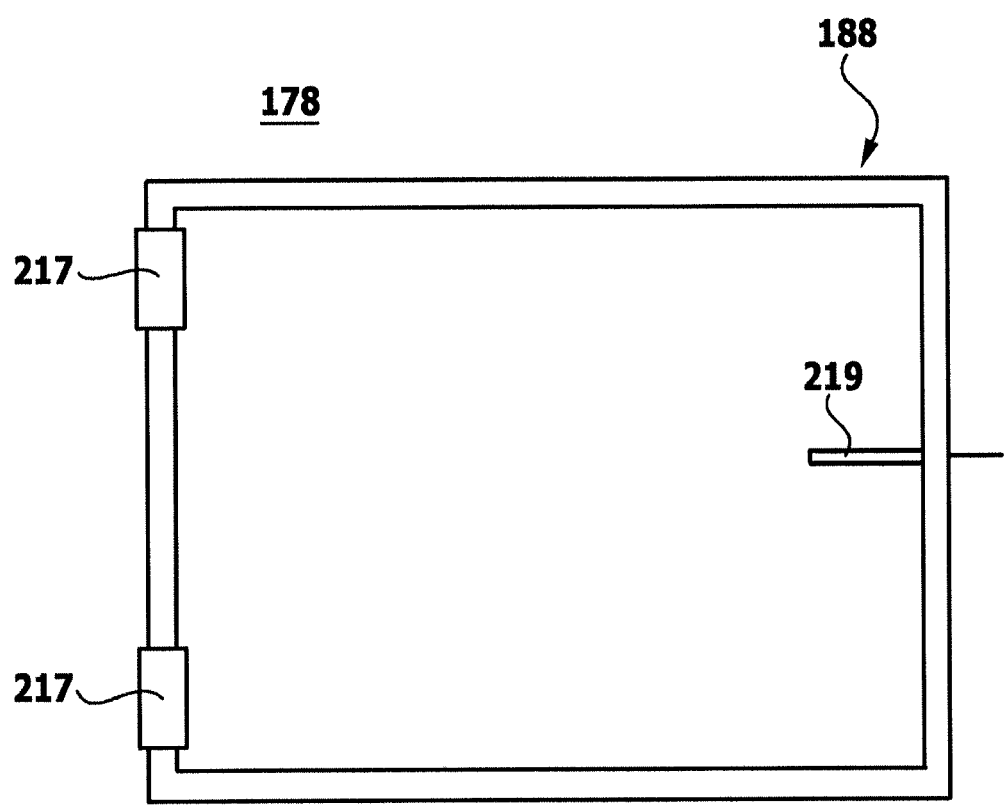
FIG. 27 a schematic plan view corresponding to FIG. 15 of the exterior of an alternative embodiment of an inspection door of the auxiliary material reservoir.

Instead of the inspection door 188 illustrated in FIG. 15 which is held in releasable manner on the associated side wall 178 of the auxiliary material reservoir 176 by means of clamps 192 and wing nuts 194, an inspection door 188 of the type illustrated in FIG. 27 may therefore be used as an alternative, this door being held in pivotal manner on the associated side wall 178 of the auxiliary material reservoir 176 by means of hinges 217 and being lockable in a closed position relative to the side wall 178 of the auxiliary material reservoir 176 by means of a lever 219 which is mounted in pivotal manner on the inspection door 188.

In both the case of the embodiment of an inspection door 188 illustrated in FIG. 15 and of that in FIG. 27, provision may be made for a (not illustrated) collecting pan for catching any dust that falls out of the auxiliary material reservoir 176 when the inspection door 188 is opened, said pan being located in front of the inspection opening that is closed by the respective inspection door 188 on the outer side of the auxiliary material reservoir 176.

Figure 9:
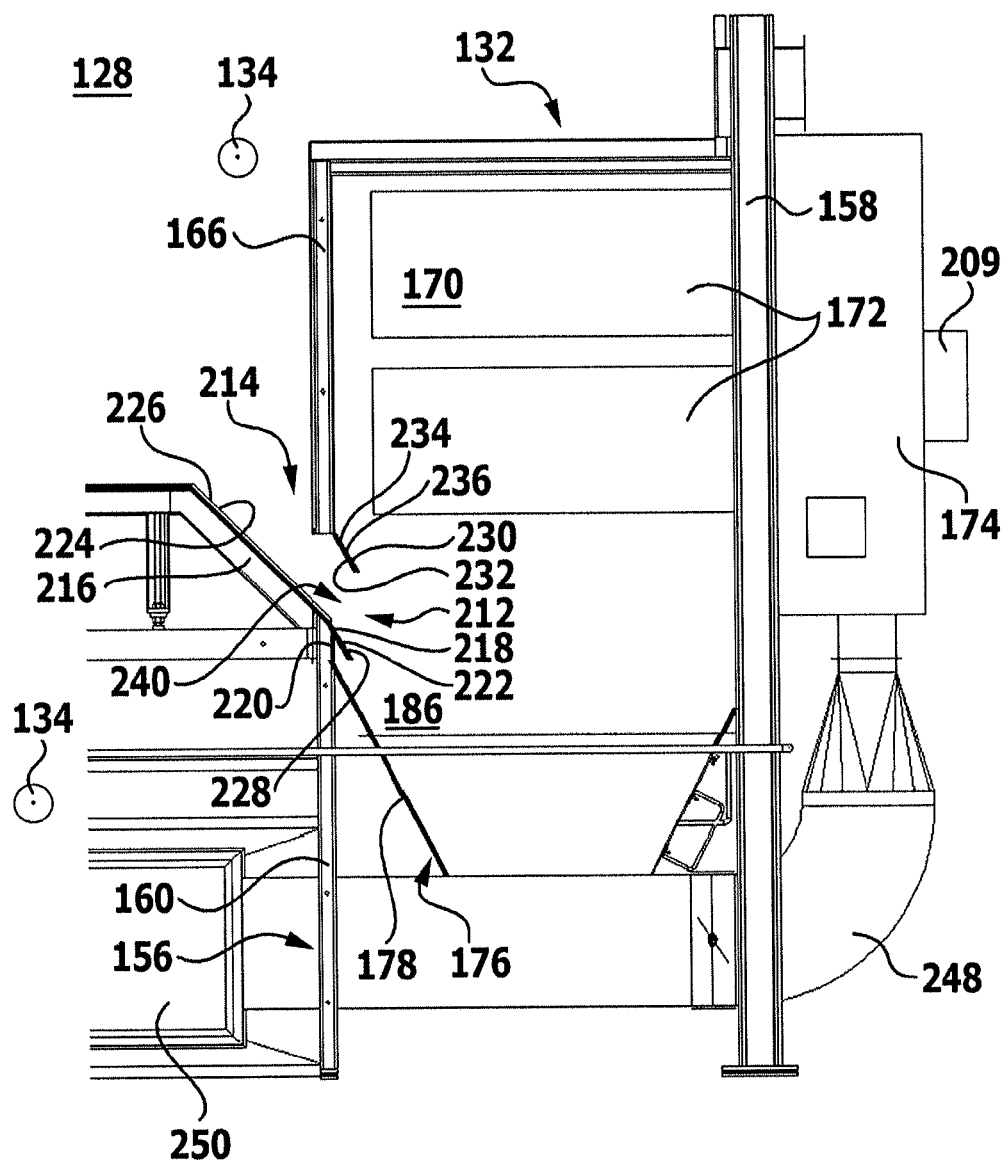
FIG. 9 a schematic vertical cross section through a filter module.

Furthermore, in order to specifically direct the stream of crude gas entering the filter module 132 into the interior space 186 of the auxiliary material reservoir 176 and yet prevent direct access of the stream of crude gas from the flow chamber 128 to the filter elements 172, each filter module 132 is provided with a slot-like inlet opening 212 which is in the form of an inlet channel 214 and for example, as can be seen particularly in FIG. 9, it has a through-flow cross section that narrows in the direction of flow of the stream of crude gas up to a narrow section 240.

As an alternative or in addition thereto, provision may also be made for the inlet channel 214 to have a through-flow cross section which widens out in the direction of flow of the stream of crude gas from the narrow section 240.

The inlet channel 214 is bounded in the downward direction by an intake slope 216 which extends upwardly at an angle from the front supports 160 of the support structure 156 and is inclined at an angle of e.g. approximately 40° to approximately 65° to the horizontal, and also by a lower guide plate 218 which adjoins the lower end of the intake slope 216, said lower guide plate being inclined to the horizontal to a greater extent than the intake slope 216, for example, at an angle of approximately 55° to approximately 70° and it protrudes above an upper substantially vertically oriented section 220 of a side wall 178 of the auxiliary material reservoir 176 and projects into the interior space 186 of the auxiliary material reservoir 176.

In this way, the lower guide plate 218 acts as a restraining element 222 which keeps auxiliary material from the auxiliary material reservoir 176 away from the inlet opening 212 and prevents whirled up auxiliary material from leaving the auxiliary material reservoir 176 along the side wall 178 at the side of the inlet opening 212.

Moreover, the lower guide plate 218 prevents the stream of crude gas from breaking-away after passing the intake slope 216 and ensures a directed flow of the crude gas into the auxiliary material reservoir 176.

The depth of the lower guide plate 218 (i.e. the extent thereof in the direction of flow of the stream of crude gas) is approximately 100 mm for example.

The intake slope 216 and the lower guide plate 218 extend in the longitudinal direction 134 of the flow chamber 128 over substantially the entire length of the inlet opening 212 of approximately 1 m to approximately 2 m for example, which almost corresponds to the extent of the entire filter module 132 in the longitudinal direction 134.

The upper surface of the intake slope 216 and the upper surface of the lower guide plate 218 together form a lower guidance surface 224 for the inlet opening 212 which bounds the inlet opening 212 downwardly, and in the upper section 226 thereof which is formed by the intake slope 216 it has an inclination of approximately 40° to approximately 65° to the horizontal whereas in the lower section 228 thereof which is formed by the lower guide plate 218 it has a greater inclination to the horizontal of approximately 55° to approximately 70°.

In the upward direction, the inlet opening 212 is bounded by the lower edge of the front wall 166 and by an upper guide plate 230 which is inclined downwardly from the lower edge of the front wall 166 and protrudes into the interior space of the filter module 132.

In like manner to the lower guide plate 218, the upper guide plate 230 is inclined to the horizontal at an angle of approximately 55° to approximately 70° for example and it extends in the longitudinal direction 134 over substantially the entire width of the inlet opening 212 of 1 m or 2 m for example.

The depth of the upper guide plate 230 (i.e. the extent thereof along the direction of flow of the stream of crude gas) is approximately 150 mm for example.

The lower side of the upper guide plate 230 forms an upper guidance surface 232 which bounds the inlet opening 212 in the upward direction and is inclined to the horizontal at an angle of approximately 55° to approximately 70° for example.

Due to this upper guidance surface 232 for the stream of crude gas, the effect is achieved that the stream of crude gas does not break-away at the front wall 166 of the filter module 132, but rather, it is guided directly into the auxiliary material reservoir 176.

Furthermore, the upper guide plate 230 serves as a filter shielding element 234 since it is configured and located at the inlet opening 212 in such a way that it prevents the crude gas entering the filter module 132 from flowing directly to the filter elements 172.

Furthermore, the upper guide plate 230 serves as a deflector element 236 which keeps the material cleaned off the filter elements 170, this material containing auxiliary material and overspray particles bound to the auxiliary material, away from the inlet opening 212.

Rathermore, material falling down from the filter elements 172 onto the upper surface of the upper guide plate 230 is guided into the auxiliary material reservoir 176 by the sloping arrangement of the upper guide plate 230.

In operation of the filter module 132, both the upper guidance surface 232 and the upper surface of the upper guide plate 230 are provided with a coating of the auxiliary material so that these surfaces of the upper guide plate 230 are easily cleaned and overspray does not stick directly to the upper guide plate 230.

Figure 25:
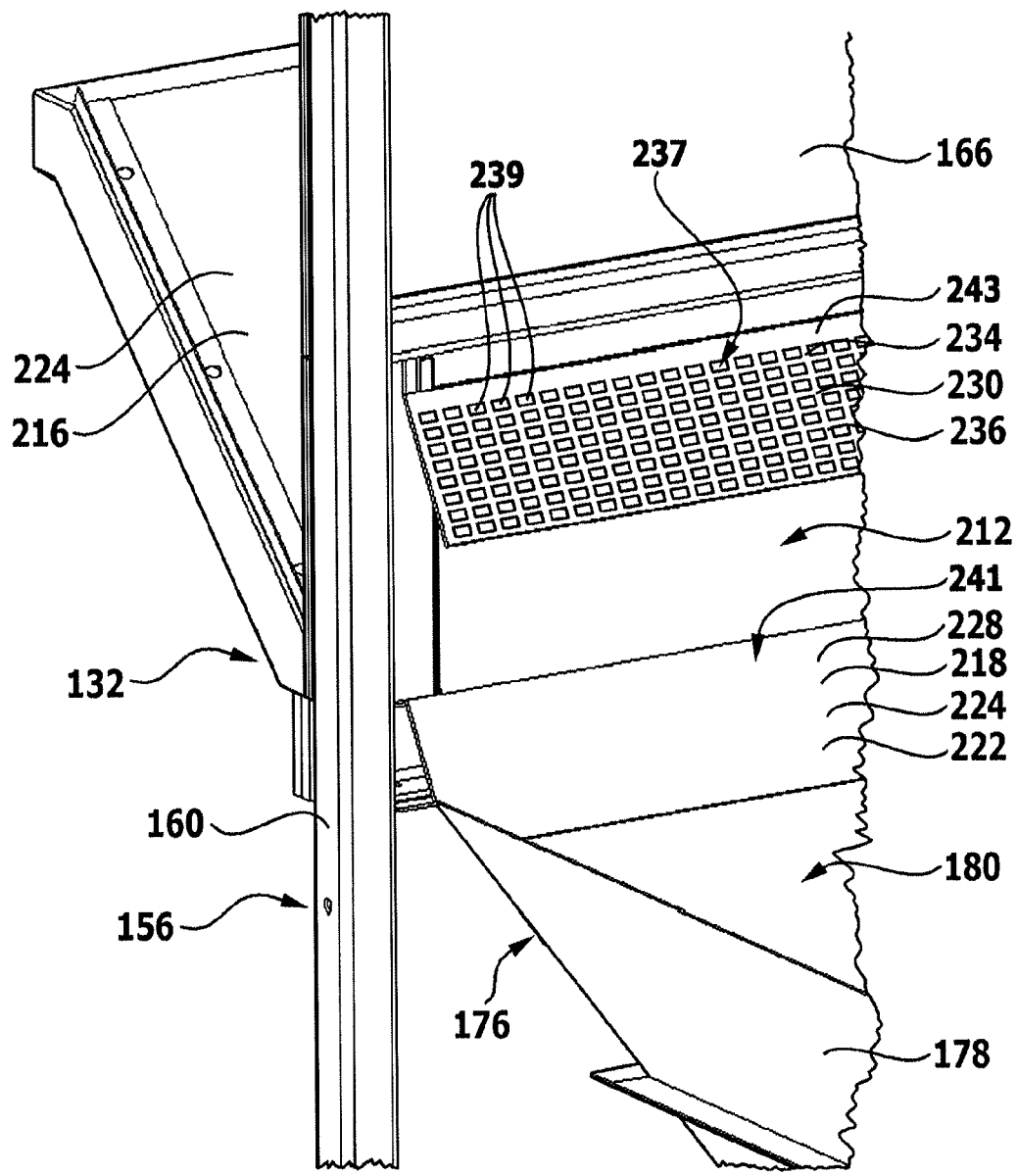
FIG. 25 a schematic perspective illustration corresponding to FIG. 11 of an edge region of an inlet opening in an alternative embodiment of a filter module in which the upper guide plate that bounds the inlet opening in the upward direction is provided with a plurality of passage openings.

As an alternative to a closed upper guide plate 230 however, an upper guide plate 230 such as is illustrated in FIG. 25 can be used, this having a plurality of passage openings 239 in a lower passage region 237 which make it possible for the auxiliary material that has been cleaned off the filter elements 172 to pass through these passage openings 239 to the upper surface of the lower guide plate 218 and/or to the upper surface of the intake slope 216.

The intake slope 216 and the lower guide plate 218 form a lower guidance element 241 which bounds the inlet opening 212 of the filter module 132 downwardly, whilst the upper guide plate 230 forms an upper guidance element 243 which bounds the inlet opening 212 of the filter module 132 in the upward direction.

The auxiliary material falling on the lower guidance element 241 de-adheres paint particles which could deposit there, and it combines with these paint particles so that they can no longer clog sinter plates of the fluid base 184 of the auxiliary material reservoir 176 if they fall into the auxiliary material reservoir 176.

Preferably, the passage openings 239 in the upper guidance element 243 cover at least 25% of the surface area of the passage region 237 of the upper guidance element 243.

The passage openings 239 may, for example, be rectangular or substantially square.

Furthermore, the passage openings 239 may be arranged in a regular pattern, for example, in a rectangular or a square lattice in the passage region 237.

Figure 12:
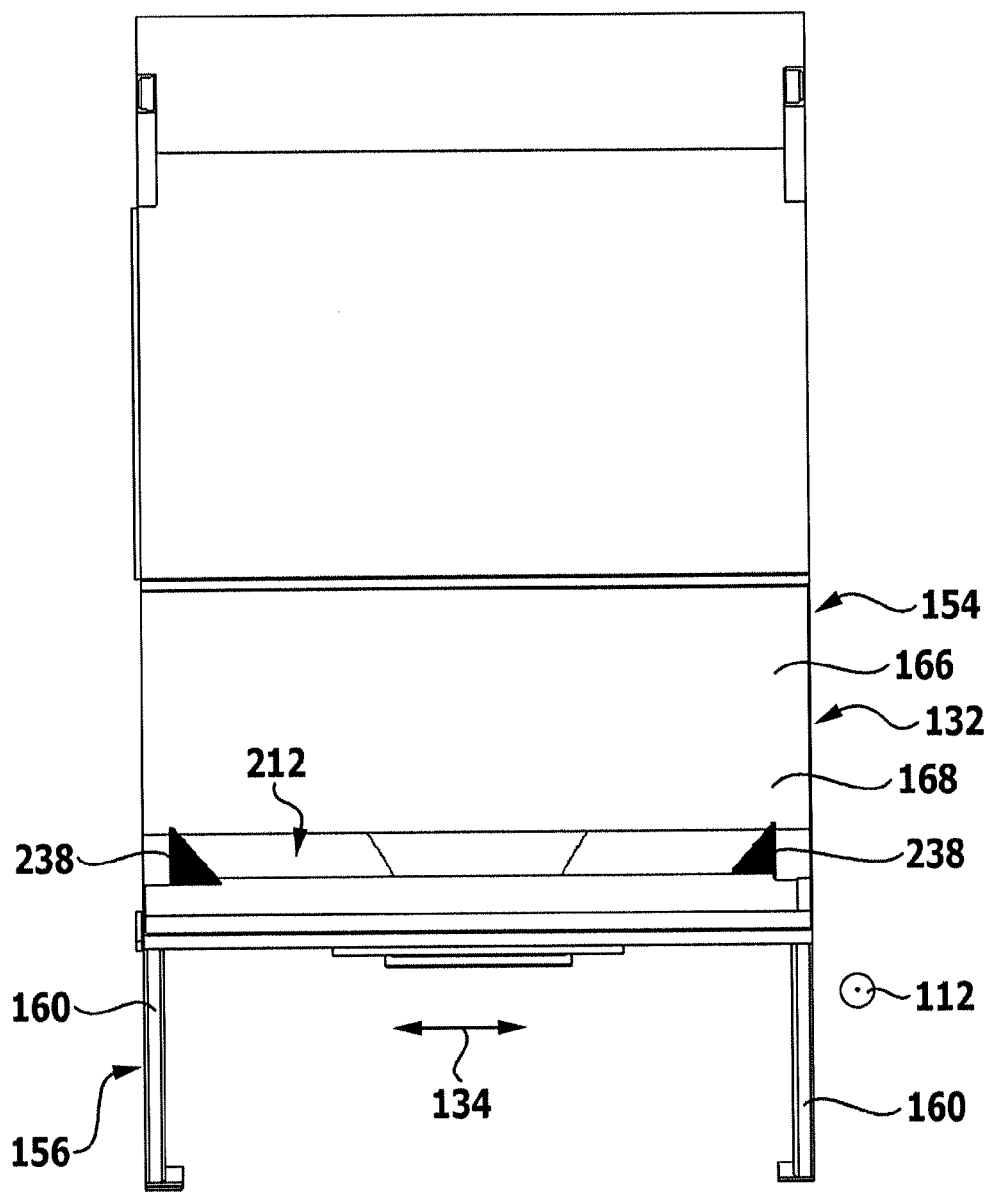
FIG. 12 a schematic front view of a filter module.

Furthermore, as can best be seen from FIG. 12, the filter module 132 comprises two covering elements 238 in the form of approximately triangular cover plates which cover the left and the right lower corner area of the inlet opening 212 in such a way that auxiliary material and overspray from the stream of crude gas are kept away from these corner areas of the inlet opening 212 and deposition of auxiliary material and of overspray particles in these corner areas and outside the filter module 132 on the intake slope 216 is prevented.

The upper surfaces of the covering elements 238 are oriented at an angle to the vertical and at an angle to the horizontal and each has a surface-normal which is oriented upwardly into the outer area of the filter module 132.

Due to the form of geometry of the inlet opening 212 described above, the effect is achieved that the inlet opening 212 has a narrow section 240 at which the through-flow cross section of the inlet opening 212 is at its smallest and the speed of the crude gas is therefore at its greatest.

Preferably, the speed of the crude gas in the narrow section amounts to approximately 2 m/s to approximately 8 m/s, and in particular, to approximately 3 m/s to approximately 5 m/s.

Auxiliary material from the interior of the filter module 132, which forms a closed box, is effectively prevented from entering the flow chamber 128 and from there, entering the application area 108 in this way. The process of whirling up the auxiliary material in the auxiliary material reservoir 176 and the process of cleaning the filter elements 172 can therefore take place at any time, without one having to interrupt the supply of crude gas to the filter module 132 or even having to interrupt the operation of the paint spraying devices 116 in the application area 108.

Furthermore, due to the fact that the stream of crude gas emerges from the inlet opening 212 directed into the auxiliary material reservoir 176, it is ensured that a deflection of the stream of crude gas will take place in the interior space 186 of the auxiliary material reservoir 176. Consequently, an adequate quantity of auxiliary material, which is produced by whirling up the contents of the auxiliary material reservoir 176, is carried along by the stream of crude gas. Furthermore, auxiliary material whirled up in the interior space 186 of the auxiliary material reservoir 176 by means of the fluidising device 198 is carried out by the stream of crude gas 120 from the auxiliary material reservoir 176 to the filter elements 172.

The stream of crude gas from the flow chamber 128 through the inlet opening 212 into the interior space of the filter module 132 is illustrated in FIG. 10 as the result of a flow simulation process. From this, it is readily apparent that a rotary-drum-like flow, in which the horizontally extending axis lies somewhat lower than the upper edge of the auxiliary material reservoir 176, is formed in the interior space of the filter module 132.

At the side of the auxiliary material reservoir 176 opposite the inlet opening 212, the stream of crude gas, which is loaded with auxiliary material, flows back out of the auxiliary material reservoir 176 and is then distributed through the entire depth of the filter element accommodating chamber 170 so that turbulence occurs around the filter elements 172 and, due to the high dynamics imparted to the stream of crude gas in the narrow section 240, a homogeneous distribution of the auxiliary material on the individual filter elements 172 is ensured.

Since there are hardly any components of the filter module 132 in the flow path of the incoming stream of crude gas, contamination of such components due to the stickiness of the paint is prevented but nevertheless there is a flow through the filter elements 172 which is advantageous to the filtration process.

Due to the fact that the average direction of flow of the stream of crude gas entering the filter module 132 through the narrow section 240 is inclined to the horizontal at an angle of more than 40°, an air lock, which would lead to material that has been cleaned off the filter elements 172 being immediately sent back again to these filter elements 172 and which could also lead to the formation of mutually opposed air vortices within the filter module 132, is prevented from forming in the lower region of the filter element accommodating chamber 170.

In order to enable two filter modules 132 that are arranged next to each other in a row of modules 136 to be connected together in a simple and stable manner or to enable a filter module 132 to be connected to an adjacent transverse partition wall 142, the support structure 156 of each filter module 132 includes at least one rear support 158 which comprises a vertical, substantially flat contact surface 242 that is oriented in the transverse direction 112 and can be placed on a corresponding contact surface 242 of a neighbouring filter module 132 or on a neighbouring transverse partition wall 142 (FIG. 7).

Furthermore, passage openings 244 are provided in the contact surface 242 for the passage of fixing means with the aid of which the rear support 158 serving as a connecting element 246 is connectable to a connecting element 246 of a neighbouring filter module 132 or to a neighbouring transverse partition wall 142.

The rear support 158 serving as a connecting element 246 preferably has an approximately U-shaped profile.

As can be perceived from FIG. 7, each central module 140 comprises two rear supports 158 having U-shaped profiles which serve as connecting elements 246 and the open sides thereof face each other so that the central module 140 is connectable on both sides to an adjacent further filter module 132 or to a transverse partition wall 142.

Figure 8:
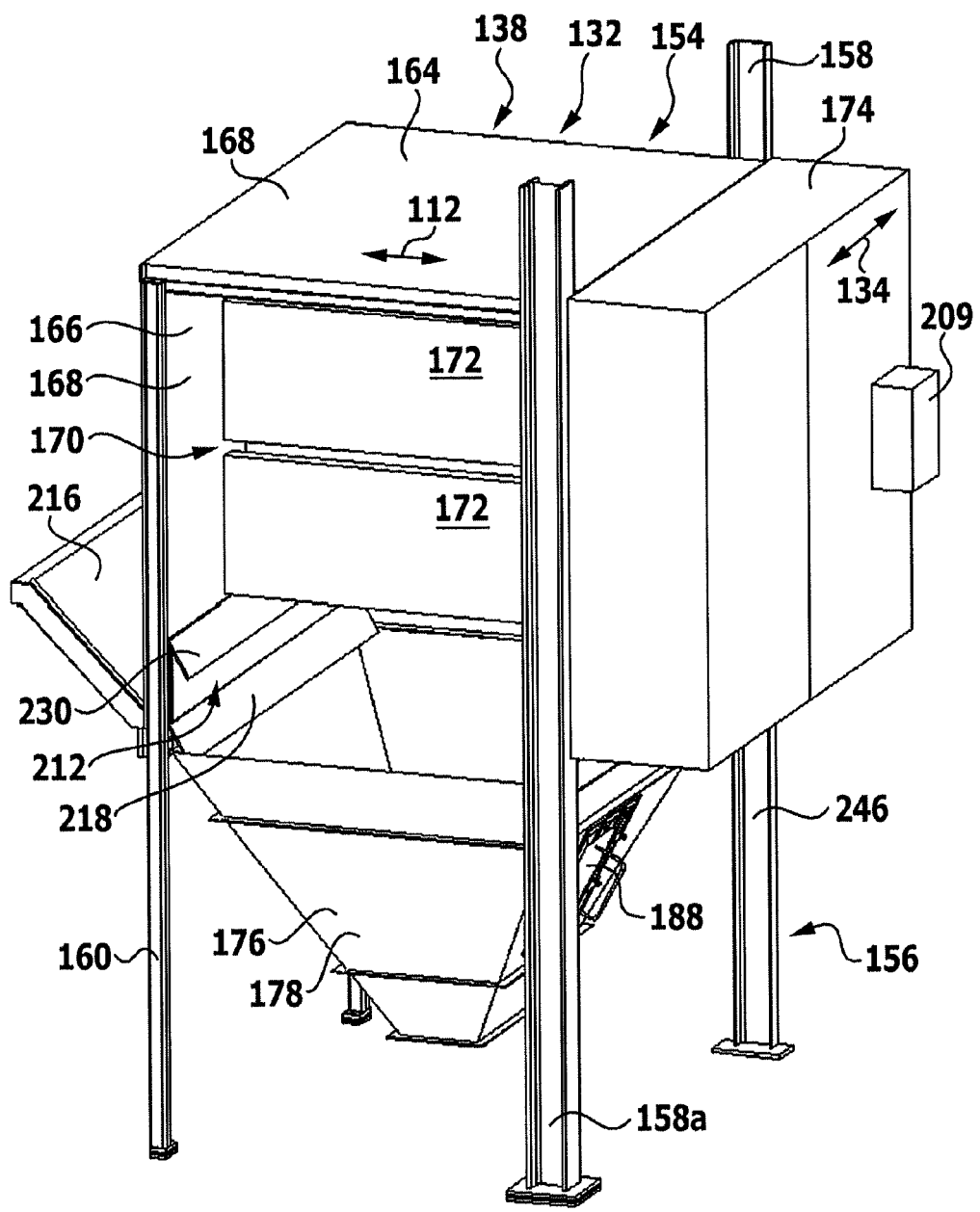
FIG. 8 a schematic perspective illustration of an individual filter module which is intended to be arranged near a further filter module and which forms an end of a filter module row on the opposite side (corner module)

As can be perceived from FIG. 8, each corner module 138 comprises only one rear support 158 having a U-shaped profile which is in the form of a connecting element 246; the opposite rear support 158a, which is to be connected to neither a neighbouring filter module 132 nor to a neighbouring transverse partition wall 142, can, for example, have a T-shaped profile instead of a U-shaped profile for the purposes of increasing its mechanical rigidity.

In all other respects, the corner module 138 corresponds in regard to the construction and functioning thereof with the central modules 140 that have been described in detail hereinabove.

In the operative state of each filter module 132, the stream of crude gas 120 sweeps over the filter surfaces of the filter elements 172, whereby both the auxiliary material and the fluid paint overspray that are both being carried along thereby are deposited on the filter surfaces, and the filtered crude gas enters the interior spaces of the filter elements 172 through the porous filter surfaces in the form of a stream of exhaust air, these interior spaces being connected to a cavity within the base body 174 from which the filter elements 172 project. From this cavity, the stream of cleansed exhaust air enters a respective exhaust air pipe 248 which leads from the base body 174 of the filter elements 172 of each filter module 132 to an exhaust air duct 250 that is arranged approximately centrally under the flow chamber 128 and runs parallel to the longitudinal direction 134 of the flow chamber 128 (see in particular, FIGS. 2 and 3).

A flap 251, by means of which the volumetric air flow is adjustable by the relevant filter module 132, is arranged in each exhaust air pipe 248

As can be perceived from the schematic illustration of FIG. 19, the exhaust air that has been cleansed of fluid paint overspray passes from the exhaust air duct 250 to an exhaust air fan 252, and from there, the cleansed exhaust air is supplied via a (not illustrated) cooling stack and a (not illustrated) supply line to a (not illustrated) air chamber, the so-called plenum, which is arranged above the application area 108.

From this air chamber, the cleansed exhaust air re-enters the application area 108 via a filter cover.

A (not illustrated) exhaust air line, through which a portion of the cleansed exhaust air stream is conveyed to the environment (through a chimney for example), branches off from the supply line.

That part of the exhaust air stream that has been conveyed away to the environment is replaced by fresh air which is fed into the flow chamber 128 via two air curtain producing devices 254 that are connected via a respective air supply line 256 to a (not illustrated) air supply system (FIGS. 1 to 3).

Each of the air curtain producing devices 254 comprises a respective air supply chamber which extends in the longitudinal direction 134 of the flow chamber 128 and is fed with a supply of air via the supply line 256, said chamber opening out through a gap 258, which extends in the longitudinal direction 134 whilst the extent thereof in the vertical direction lies in a range of approximately 15 cm to approximately 50 cm for example, into an upper section 260 of the flow chamber 128 which is bounded in the upward direction by the application area 108 and by the covering walls 164 of the filter modules 132 in the downward direction.

The gap 258 of each air supply chamber is arranged just above the covering walls 164 of the filter modules 132 so that an air curtain will be formed on the upper surface of the filter modules 132 by the inflow of air, which is being supplied from the air supply chambers, into the flow chamber 128 in a substantially horizontal direction along the upper surfaces of the covering walls 164 of the filter modules 132, said air curtain being directed from the respectively associated air curtain producing arrangement 254 towards a narrow section 262 between the upper edges of the mutually opposed rows of modules 136 and this thereby preventing the stream of crude gas 120, which is loaded with fluid paint overspray and is coming from the application area 108, from reaching the upper surface of the filter modules 132 and hence preventing the fluid paint overspray from settling out of the stream of crude gas 120 onto the upper surface of the filter modules 132.

The horizontal cross section of the flow chamber 128 through which the stream of crude gas is arranged to flow decreases suddenly in the narrow section 262 of the flow chamber 128 so that the flow rate of the stream of crude gas is significantly higher in the lower section 263 of the flow chamber 128 located underneath the narrow section 262 than it is in the upper section 260 of the flow chamber 128 located above the narrow section 262.

The average direction of flow of the air in the transverse air curtains on the upper surface of the filter modules 132 which are produced by the air curtain producing devices 254 is illustrated in FIG. 3 by means of the arrows 264.

The greater part of the air being passed through the application area 108 is thus re-circulated in an air re-circulating system which comprises the application area 108, the flow chamber 128, the filter modules 132, the exhaust air pipes 248, the exhaust air duct 250, the exhaust air fan 252 as well as the supply line and the air chamber above the application area 108, this thereby preventing the air that is being fed through the air re-circulating system from being constantly heated by the influx of fresh air via the air curtain producing devices 254.

As an alternative or in addition thereto, the process of admitting fresh air could also be effected at other points in the air re-circulating system, for example, directly into the supply line.

Since the separation of the fluid paint overspray from the stream of crude gas 120 by means of the filter elements 172 is effected by means of a dry process, i.e. it is not washed out with the aid of a cleaning fluid, the air being fed through the air re-circulating system is not moistened during the process of separating out the fluid paint overspray so that no devices whatsoever are required for dehumidifying the air being fed through the air re-circulating system.

Furthermore, devices for the separation of fluid paint overspray from a washing and cleaning fluid are also not necessary.

Thanks to the presence of the filter modules 132 and due to the fact that the horizontal cross section of the flow chamber 128 through which the stream of crude gas is arranged to flow is significantly smaller in the lower section 263 of the flow chamber 128 lying below the narrow section 262 than it is in the upper section 260 of the flow chamber 128 (for example, in the lower section 263, it amounts to only approximately 35% to approximately 50% of the horizontal cross-sectional area of the flow chamber 128 in the upper section 260 thereof), the flow rate of the stream of crude gas is continuously increased on its way from the application area 108 through the flow chamber 128 up to the inlet openings 212 of the filter modules 132 thereby resulting in the stream of crude gas having a rising speed profile.

This rising speed profile has the consequence that particles emerging from the filter modules 132 cannot reach the application area 108.

Hereby, the speed of the stream of crude gas within the application area 108 and in the upper section 260 of the flow chamber 128 amounts to up to approximately 0.6 m/s for example, whereas in the lower section 263 of the flow chamber for example it lies within a range of approximately 0.6 m/s to approximately 3 m/s and rises up to a maximum value within a range of approximately 3 m/s to approximately 5 m/s in the inlet openings 212 of the filter modules 132.

Due to the fact that the filter elements 172 are housed entirely within the filter modules 132, it is possible for the filter elements 172 to be activated by the application of the auxiliary material and for the filter elements 172 to be cleansed at any time during the current painting process in the application area 108.

If the width of the paint booth 110, i.e. its extent in the transverse direction 112, changes, then equally large filter modules 132 are used nonetheless; the device 126 for removing fluid paint overspray is in this case adapted by merely increasing the spacing of the two rows of modules 136 from each other and by widening the accessible gangway 146.

The speed profile of the stream of crude gas in the event of such a widening of the paint booth 110 thus changes only in the area up to the accessible gangway 146; from there, i.e. when passing the inlet openings 212 of the filter modules 132 in particular, the speed profile of the stream of crude gas is only dependent on the quantity of crude gas passing through per unit of time, but not however, on the geometry of the flow chamber 128.

The spacing of the (accessible) covering walls 164 of the filter modules 132 from the lower edge of the vehicle bodies 102 being conveyed through the paint booth 110 amounts to at least approximately 1.5 m for reasons of maintenance.

The filter elements 172 are cleansed by blasts of compressed air at certain time intervals when their loading with fluid paint overspray and auxiliary material has reached a given value.

This cleansing process can take place (in dependence on the increase in pressure loss at the filter elements 172) once to six times per 8-hour working shift, i.e. approximately every 1 to 8 hours for example.

The requisite blasts of compressed air are produced by means of a blast-emitting unit 266 which is arranged on the base body 174 of the filter elements 172 of each filter module 132, whereby the blast-emitting unit 266 is capable of delivering blasts of compressed air via a blast valve 267 to compressed air tubes or compressed air lances 269 which run within the respective base body 174 and lead from the blast-emitting unit 266 into the interior spaces of the filter elements 172 (FIG. 19).

The blast-emitting unit 266 comprises a compressed air tank which is abruptly emptied by the opening of the blast valve 267.

From the interiors of the filter elements 172, the blasts of compressed air pass through the porous filter surfaces into the filter element accommodating chamber 170, whereby the barrier layer of auxiliary material and the fluid paint overspray deposited thereon which is formed on the filter surfaces is detached from the filter surfaces so that these filter surfaces revert to their cleansed original state.

The compressed air lances 269 are not seated closely on the filter elements 172 so that the compressed air flows laterally between the respective compressed air lance 269 and the filter element 172, if the filter cake is not passable.

The blast-emitting unit 266 comprises a refilling valve 268 via which compressed air is suppliable from a compressed air supply line 270 to the blast-emitting unit 266 for the purposes of filling up the compressed air tank of the blast-emitting unit 266, said air supply line being fed by a compressor 272 (see FIG. 19).

The compressed air pipeline 196, which leads to the outlet nozzles 200 of the fluidising arrangement 198, is also attached via a compressed air valve 274 to this compressed air supply line 270.

Furthermore, the fluid base 184 of each auxiliary material reservoir 176 is also attached via an air supply line 278 provided with a compressed air valve 276 to the compressed air supply line 270.

By opening the burst valve 268, the compressed air valve 274 or the compressed air valve 276 in either alternating manner or at the same time, a cleansing process for the filter elements 172, whirling-up of the auxiliary material in the auxiliary material reservoir 176 i.e. fluidisation of the auxiliary material in the auxiliary material reservoir 176 by means of the fluid base 184 can thus be initiated.

A non-return valve 280, which is controllable by the control device 210 in the control position, is arranged in the compressed air supply line 270 between the abovementioned compressed air valves and the compressor 272.

The control device 210 blocks the supply of compressed air from the compressor 272 to the abovementioned compressed air consuming units of a filter module 132 or of all the filter modules 132 by closing the non-return valve 280 if it determines that there is an inadequate flow of crude gas through the filter elements 172.

In order to determine whether there is an adequate flow of crude gas through the filter elements 172, provision may be made for the control device 210 to monitor the operative state of the exhaust air fan 252 for example.

This process of monitoring the operative state of the exhaust air fan 252 can be effected by means of a differential pressure gauge (PDIA) 282 which measures the drop in pressure between the pressure side and the suction side of the exhaust air fan 252 for example.

As an alternative or in addition thereto, the operative state of the exhaust air fan 252 can also be monitored by the control device 210 by means of a current monitoring instrument (ESA) 284 and/or by means of a frequency converter (SC) 286.

Furthermore, provision may be made for the lack of an adequate flow of crude gas through the filter elements 172 to be determined by means of a volumetric flow meter (FIA) 288 which measures the flow of gas through the exhaust air duct 250 or through one or more of the exhaust air pipes 248.

Furthermore, it is possible to determine whether there is a lack of an adequate flow of crude gas through the filter elements 172 by measuring the drop in pressure across the filter elements 172 in one filter module 132 or in all of the filter modules 132 by means of a differential pressure gauge (PDIA) 289 which measures the drop in pressure between the interior space of the respective filter module 132 on the one hand and the interior space of the base body 174 on the other.

If, due to the signals transmitted thereto by the differential pressure gauge 282, the current monitoring instrument 284, the frequency converter 286 and/or the volumetric flow meter 288, the control device 210 determines that the flow of crude gas through the filter elements 172 lies below a given threshold value, then the supply of compressed air to at least one of the filter modules 132 is blocked by the closure of the non-return valve 280.

It is in this way that auxiliary material is prevented from entering the flow path of the crude gas and, in particular, is prevented from entering the flow chamber 128 through the inlet opening 212 of a filter module 132 and from said chamber reaching the application area 108 as a result of a whirling up process effected by means of the fluidising unit 198, or due to cleansing of the filter elements 172 or due to the fluidising of the auxiliary material stored in the auxiliary material reservoir 176.

This blockage of the compressed air supply can be effected for all of the filter modules 132 together or separately for each of the individual filter modules 132. In the latter case, the process of determining lack of an adequate flow of crude gas through the filter elements 172 is effected separately for each of the filter modules 132, and either each filter module 132 is provided with its own compressor 272 or the compressed air supply lines 270 to the individual filter modules 132 are arranged to be blocked or opened individually by means of non-return valves 280 which are controllable independently of one another.

In the case of the previously described device 126 for separating fluid paint overspray, the auxiliary material is introduced into the stream of crude gas exclusively within the filter modules 132 by the process of whirling up the auxiliary material in the respective auxiliary material reservoir 176.

Figure 17:
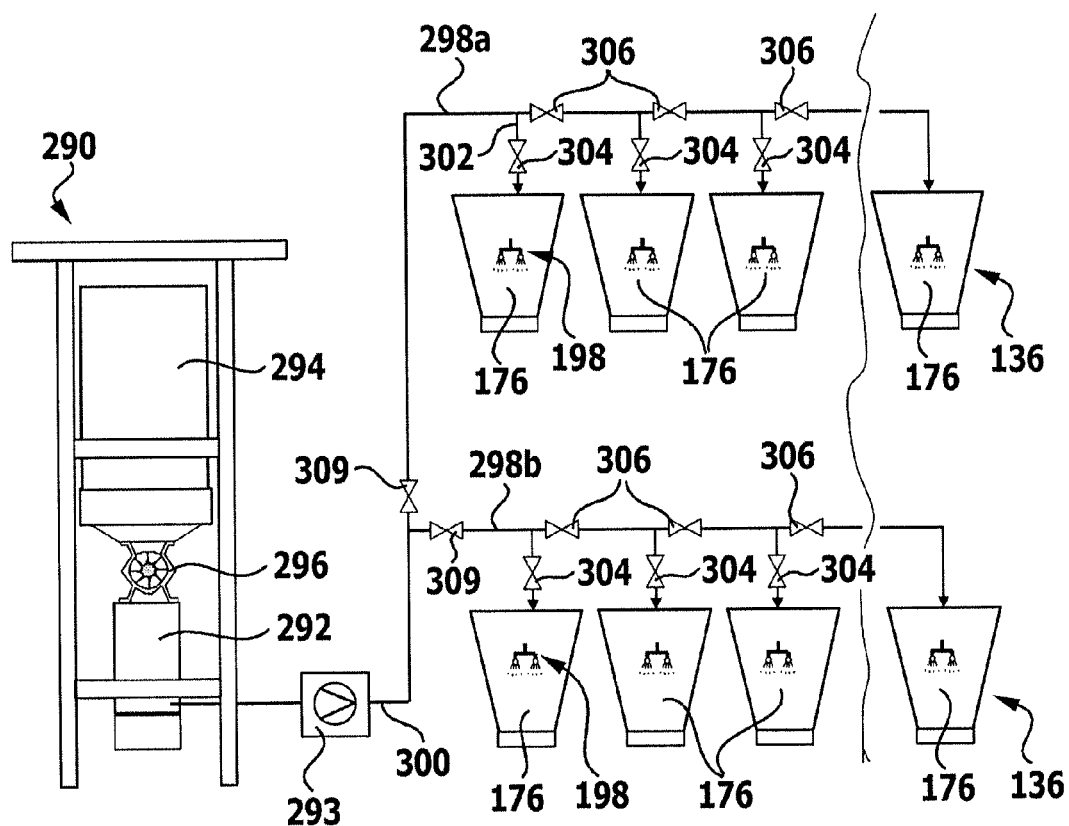
FIG. 17 a schematic illustration of a device for supplying fresh auxiliary material from a storage tank to auxiliary material reservoirs of the type illustrated in FIG. 13 that are in their working position.

In order to be able to supply fresh auxiliary material to the auxiliary material reservoirs 176 that are rigidly mounted in their working positions within the filter modules 132, the device 126 for removing fluid paint overspray comprises an auxiliary material supply device 290 which is schematically illustrated in FIG. 17 and which comprises a storage tank 292 that may be constructed in the form of a blowpot or a simple fluidisation tank.

Blowpots themselves are known from JP 02123025 A or JP 06278868 A for example and until now they were used in coating plants for conveying powder coating to the application tanks located in the proximity of the atomizers. They are relatively small closable containers having an air-permeable base through which air is passed to the tank for the purposes of fluidising the powder and transportation thereof.

Whilst a blowpot can be emptied by the pressure of the fluidising air, a powder dosing pump 293 such as the so-called DDF pump described in WO 03/024612 A1 for example is otherwise connected to the outlet side of the fluidisation tank for the purposes of conveying the material (see FIG. 1), or else use is made of some other form of dosing pump which produces a conveying action in accord with the dense-phase flow principle using alternating suction/pressure such as is known from EP 1 427 536 B1, WO 2004/087331 A1 or the one depicted in FIG. 3 of DE 101 30 173 A1 for example.

For the purposes of filling the storage tank 292, there is arranged above it a larger storage vessel (a packing drum or "big bag") 294 for the fresh auxiliary material from which, in the simplest case, the material can trickle into the storage tank (silo) 292 through an opening which is closable by a flap. However, in order to continuously refill the storage tank 292 even during the process of conveying the material and to avoid time delays in operation, a mechanical conveyer system 296 such as a cellular rotary feeder or a conveyer worm for example, is preferably arranged between the storage vessel 294 and the storage tank 292. When employing such a conveyer system, it can also be advantageous to specify a desirable amount for each charge, in the case of a cellular rotary feeder, the previously determined amount by which each cell is filled.

The storage tank 292 is connected to each of the auxiliary material reservoirs 176 by a main line 300 which branches out into two branches 298a, 298b from which stub lines 302 extend to a respective one of the auxiliary material reservoirs 176. Hereby, each of the branches 298a, 298b of the main line 300 leads to the auxiliary material reservoirs 176 of a respective row of modules 136.

The main line 300 preferably consists of flexible hoses. Hoses having an internal diameter of up to approximately 14 mm and in particular, from approximately 6 mm to approximately 12 mm can be used for this purpose.

The stub lines 302 can be tubular and are each provided with a mechanical pinch valve 304, whereby, in each case, a second pinch valve 306 is arranged, in the direction of flow of the auxiliary material, beyond the point where the respective stub line 302 branches off.

Further pinch valves 309 are arranged at the junction between the two branches 298a, 298b and the main line 300 in order to enable these two branches 298a, 298b to be opened or closed as required.

In operation of the auxiliary material feeding device 290, the main line 300 and each one of the stub lines 302 are initially empty. If a certain auxiliary material reservoir 176 is to be charged with fresh auxiliary material, the main line beyond the branching-point of the associated stub line 302 is blocked by closing the respectively associated pinch valve 306, the pertinent stub line 302 is opened by opening the associated pinch valve 304 and the auxiliary material is subsequently conveyed from the storage tank 292 to the pertinent auxiliary material reservoir 176.

Subsequently, the previously described transportation path to the pertinent auxiliary material reservoir 176 is emptied and flushed. This has the advantage that the size of the charge is always precisely determined and is capable of being metered, and in addition, the transportation path cannot be blocked since a process of flushing it into the charged auxiliary material reservoir 176 is always effected.

Each of the stub lines 302 opens out into one of the side walls 178 of the respectively associated auxiliary material reservoir 176, preferably, at a point near the upper edge of the auxiliary material reservoir 176 so that as large a quantity of the auxiliary material as possible can be supplied through the stub line 302.

That stub line 302 which leads to the last auxiliary material reservoir 176 of a row of modules 136 does not require a pinch valve arrangement merely because all of the pinch valves 306 and 309 arranged in the main line 300 upstream of this auxiliary material reservoir 176 must be opened for the purposes of charging this last auxiliary material reservoir 176.

Instead of the previously described pinch valve devices, mechanical pinch distributors or other forms of powder distributors known from the state of the art can also be provided at the junctions of the auxiliary material line system.

Figure 28:
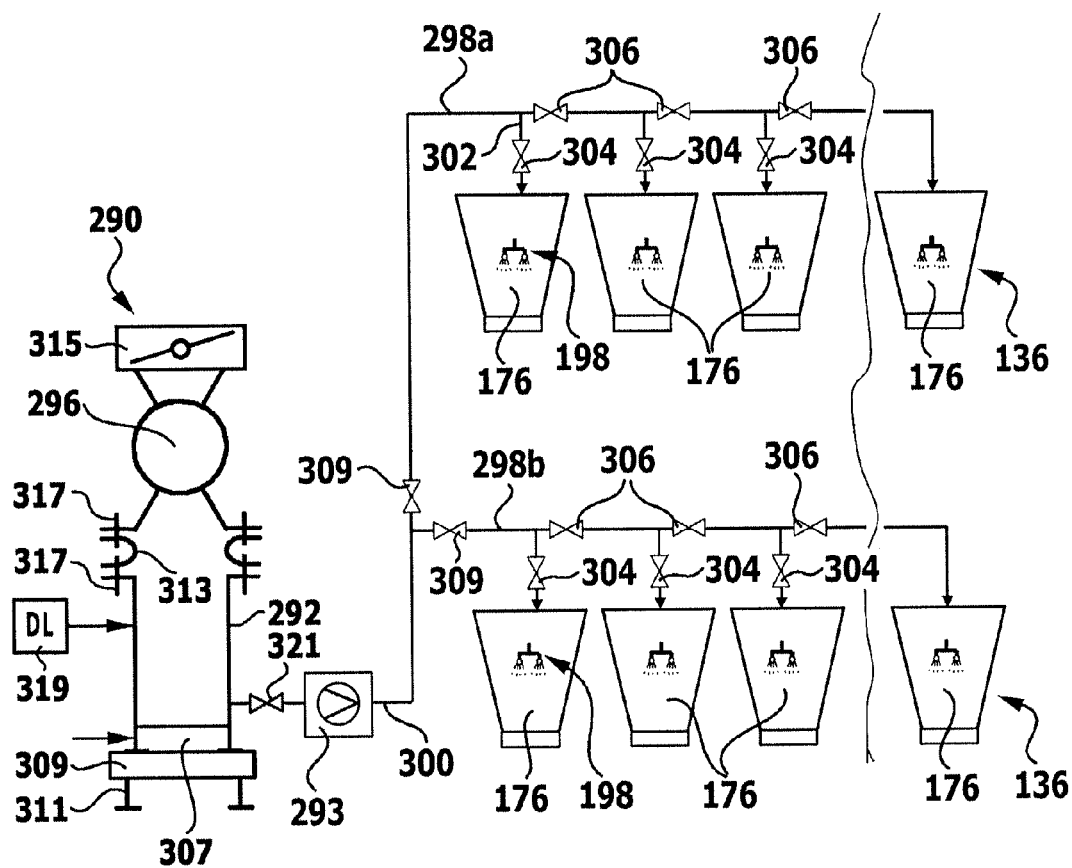
FIG. 28 a schematic illustration corresponding to FIG. 17 of an alternative device for supplying fresh auxiliary material from a storage tank to auxiliary material reservoirs located in their working position, wherein a storage tank of the device is mechanically decoupled from a cellular rotary feeder of the device by means of a compensator and is provided with a balance.

In an alternative embodiment of an auxiliary material feeding device 290 which is illustrated in FIG. 28, the amount to which the storage tank 292 is filled is not determined by the quantity delivered by the cellular rotary feeder 296, but rather, it is determined from the weight of the auxiliary material present in the storage tank 292.

To this end, a base 307 of the storage tank 292, which may be in the form of a fluid base, rests on a balance 309 which is supported on a foundation by the feet 311.

The storage tank 292 is connected by a ring-like flexible compensator 313 to the cellular rotary feeder 296 which is fillable with fresh auxiliary material from a (not illustrated in FIG. 28) packing drum or "Big Bag" via a flap 315.

The compensator 313 is connected by suitable fixing means 317 to a mounting flange of the cellular rotary feeder 296 on the one hand and to a mounting flange of the storage tank 292 on the other.

Due to the compensator 313, the storage tank 292 is mechanically decoupled from the cellular rotary feeder 296 so that the weight of the storage tank 292 and of the auxiliary material contained therein or—after suitable calibration— just the weight of the fresh auxiliary material present in the storage tank 292 is measured precisely by means of the balance 309.

The compensator 313 may be formed of a flexible plastic material for example.

Other than was the case for the embodiment of an auxiliary material feeding device 290 that is illustrated in FIG. 17, the fresh auxiliary material in the embodiment illustrated in FIG. 28 is not conveyed from the storage tank 292 to the main line 300 by means of a powder dosing pump 293, but rather, by subjecting the interior space of the storage tank 292 to compressed air from a source of compressed air 319 when a non-return valve 321 that is arranged in the main line 300 is opened.

In principle however, it is also possible to combine a storage tank 292 incorporating a balance 309 with a powder dosing pump 293, and conveyance of the fresh auxiliary material by means of compressed air introduced into the storage tank 292 may also be combined with a process of determining the amount by which the storage tank 292 is filled from the quantity delivered by the cellular rotary feeder 296.

In all other respects, the embodiment of an auxiliary material feeding device 290 that is illustrated in FIG. 28 corresponds in regard to the construction and functioning thereof with the embodiment of such an auxiliary material feeding device 290 that is illustrated in FIG. 17, and to this extent, reference is made to the previous description thereof.

Figure 18:
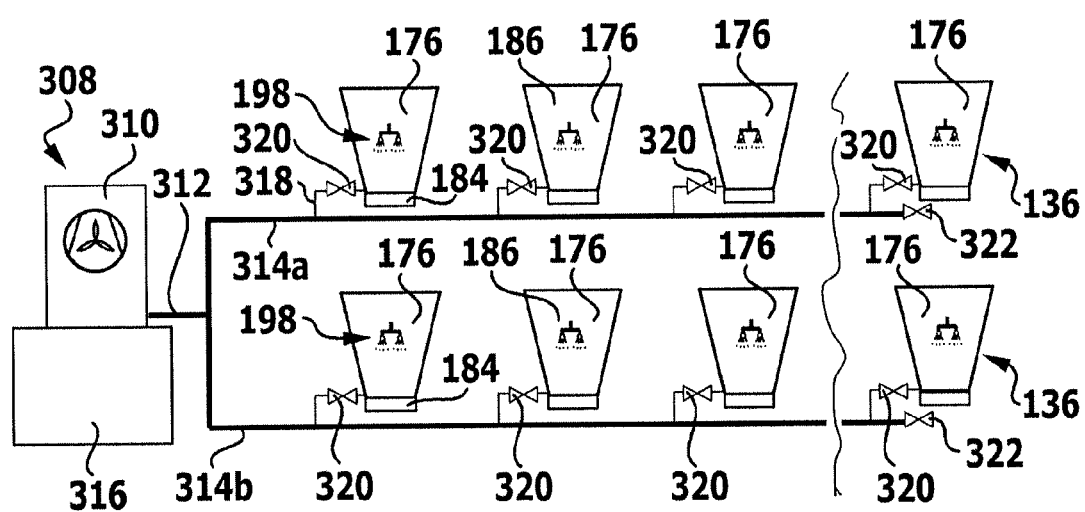
FIG. 18 a schematic illustration of a removal device for removing auxiliary material mixed with overspray from the auxiliary material reservoirs to a collecting tank.

Furthermore, in order to enable the auxiliary material mixed with overspray that has accumulated in an auxiliary material reservoir 176 to be extracted and disposed of or re-processed before supplying fresh auxiliary material thereto, the device 126 for separating fluid paint overspray comprises an auxiliary material removal device 308 which is illustrated schematically in FIG. 18.

For its part, the auxiliary material removal device 308 comprises an extractor fan 310, a vacuum cleaner fan for example, which forces spent auxiliary material out of a main line 312 that branches out into two branches 314*a*, 314*b*, and into a collection tank 316 which is arranged below the extractor fan 310.

Each one of the branches 314*a*, 314*b* of the main line 312 leads to the auxiliary material reservoirs 176 of a row of modules 136 and is attached to each of the auxiliary material reservoirs 176 of the pertinent row of modules 136 via a respective stub line 318 which is closable by means of a pinch valve 320.

At the end of each branch 314*a*, 314*b* of the main line 312, there is a respective ball tap 322 through which, when needed, air is suppliable to the main line 312 in order to facilitate the suction of the auxiliary material from the main line 312 to the suction fan 310.

The stub lines 318 open out into the interior space 186 of the respective auxiliary material reservoir 176 just above the fluid base 184, preferably, in a corner area of the auxiliary material reservoir 176 where two of the side walls 178 meet together.

It is particularly expedient for the efficient removal of the spent auxiliary material from an auxiliary material reservoir 176 and for this removal process to be effected as completely as possible, if the stub line 318 branches out into two suction lines each of which opens into the interior space 186 of the auxiliary material reservoir 176 at a different corner area.

If a certain auxiliary material reservoir 176 is to be emptied of spent auxiliary material mixed with overspray, then, for this purpose, the pinch valve 320 of the respectively associated stub line 318 is opened and the material present in the auxiliary material reservoir 176 is sucked out through the stub line 318 and the main line 312 by means of the suction fan 310 and passed to the collection tank 316.

The suction process is terminated by the closure of the respectively associated pinch valve 320.

During the suction process, the fluid base 184 of the pertinent auxiliary material reservoir 176 is kept continually in operation, i.e. compressed air is passed through it during the whole of the suction process in order to fluidise the material and enhance its fluidity.

Furthermore, the process of sucking out the used material from the auxiliary material reservoir 176 can be assisted by operating the fluidising arrangement 198 of the pertinent auxiliary material reservoir 176 continuously or periodically (6×5 seconds per minute for example) during the suction process because the material is then decompacted and moved towards the access openings of the stub line 318 by means of a stream of compressed air, which is applied to the material requiring extraction from above, through the outlet nozzles 200 of the fluidising arrangement 198.

In the event that the process of sucking out the spent auxiliary material from one of the auxiliary material reservoirs 176 does not function in the proper manner, something which can be detected by the fact that the associated level sensor 204 is no longer indicating that the level is dropping, the operation of the device 126 for separating fluid paint overspray does not have to be interrupted. Rathermore, auxiliary material from another of the auxiliary material reservoirs 176 which is attached to the same branch 314*a* or 314*b* of the main line 312 can be sucked out instead. Thereby, the blockade on the transportation of the material from the blocked auxiliary material reservoir 176 can, in many instances, be overcome so that the material can be sucked out of the previously blocked auxiliary material reservoir 176 at a later time.

The material containing auxiliary material as well as overspray particles which is sucked out of the auxiliary material reservoir 176 can either be disposed of or at least be partly reused—if necessary after being reprocessed—in the coating plant.

Furthermore, provision may be made for the substances making up the auxiliary material to be selected in such a way that they can be exploited for purposes other than the coating of work pieces after they have been used in the coating plant. For example, the spent auxiliary material can be used as a structural material or it may be thermally treated and used, for example, in the brick industry or the cement industry or the like, whereby the fluid paint overspray bonded to the auxiliary material can likewise be used as a source of energy in a combustion process necessary to the production process.

After the spent auxiliary material has been sucked out of an auxiliary material reservoir 176, the latter is filled with fresh auxiliary material by means of the auxiliary material feeding device 290 that has already been described hereinabove, namely, for example, up to a primary fill-level of approximately 50% of the entire capacity of the auxiliary material reservoir 176.

Due to the accumulation of wet paint overspray, which has a lower density than that of the auxiliary material, in the mixture consisting of auxiliary material and overspray that is present in the auxiliary material reservoir 176, the density of this mixture continually decreases during the operative state of a filter module 132 so that the barrier layer building up on the filter elements 172 of the filter module 132 has an ever increasing volume.

In consequence, the level of the material in the auxiliary material reservoir 176 decreases continually immediately before the process of cleaning the filter elements 172.

At a given residual level which corresponds to approximately 10% of the capacity of the auxiliary material reservoir 176 for example, the auxiliary material mixed with overspray is sucked out of the auxiliary material reservoir 176 as has been previously described. Due to this suction process prior to the process of cleaning the filter elements 172, the effect is achieved that it is mainly the now unusable material which has collected in the auxiliary material reservoir 176 and has not formed the barrier layer on the filter elements 172 that is removed from the auxiliary material reservoir 176.

As an alternative to this manner of procedure, provision may also be made for the level of the material in the auxiliary material reservoir 176 to be measured in each case after the process of cleaning the filter elements 172 of the filter module 132, and for a suction process to then be initiated if a given maximum level of e.g. 90% of the maximum capacity of the auxiliary material reservoir 176 is reached.

In every case, the level of the material in the auxiliary material reservoir 176 that triggers off a suction process is determined by means of the level sensor 204 which is arranged in the respective auxiliary material reservoir 176.

As an alternative or in addition to the time point for a suction process being determined by means of the level sensor 204 which is arranged in the respective auxiliary material reservoir 176, the appropriate time point for initiating a suction process using the alternative embodiment of an auxiliary material reservoir 176 which is illustrated in FIG. 26 and is provided with a container balance 223 can be determined as follows:

material is whirled up from the auxiliary material reservoir 176;

the effectiveness of the material contained in the auxiliary material reservoir 176 is determined by a comparison of the weight of the material contained in the auxiliary material reservoir 176 before the whirling-up phase and after the whirling-up phase; and material is removed from the auxiliary material reservoir 176 if the effectiveness determined thereby falls below a given minimum value.

For this purpose for example, the material in the auxiliary material reservoir 176 is whirled up by means of the fluidising device 198 of the auxiliary material reservoir 176 concerned during a whirling-up cycle in the course of a plurality of successive whirling-up phases which are spaced from each other by whirling-up pauses, whereby the whirled-up material is carried to the filter elements 172 of the filter module concerned 132 and is deposited there at least to a partial extent.

During a whirling-up cycle for example, four whirling-up phases each of e.g. 5 seconds duration may be effected, and between the whirling-up phases, there is a respective whirling-up pause of 10 seconds for example.

The net whirling-up time of such a whirling-up cycle thus amounts to 4×5 seconds=20 seconds for example.

Between successive whirling-up cycles, there is a longer whirling-up pause of approximately 60 seconds for example.

The weight of the material in the auxiliary material reservoir 176 as measured by the container balance 223 is stored before the whirling-up cycle and after the whirling-up cycle, and the amount of material that has been carried away from the auxiliary material reservoir during the whirling-up phases of the whirling-up cycle is determined by forming the difference between these stored values.

The effectiveness is then determined by dividing the mass of the material that has been carried away from the auxiliary material reservoir 176 during the whirling-up cycle by the net whirling-up time of the whirling-up phases of the whirling-up cycle.

With an assumed mass loss of the material containing in the auxiliary material reservoir 176 of 4 kg for example and a net whirling-up time of 20 seconds, the effectiveness thus amounts to 12 kg/min for example.

The larger the thus determined effectiveness, the greater the amount of material that has been carried away from the auxiliary material reservoir to the filter elements 172 and which has settled there as a protective layer. The larger the effectiveness, the better the quality of the material contained in the auxiliary material reservoir and in particular, its ability to cling to the filter elements 172 and bind the fluid paint overspray.

Consequently, material is removed from the auxiliary material reservoir if the thus determined effectiveness falls below a—for example empirically determined—given minimum value.

The material removed by the suction process is replaced by fresh auxiliary material which is supplied to the respective auxiliary material reservoir 176 by means of the auxiliary material feeding device 290.

Figure 20:
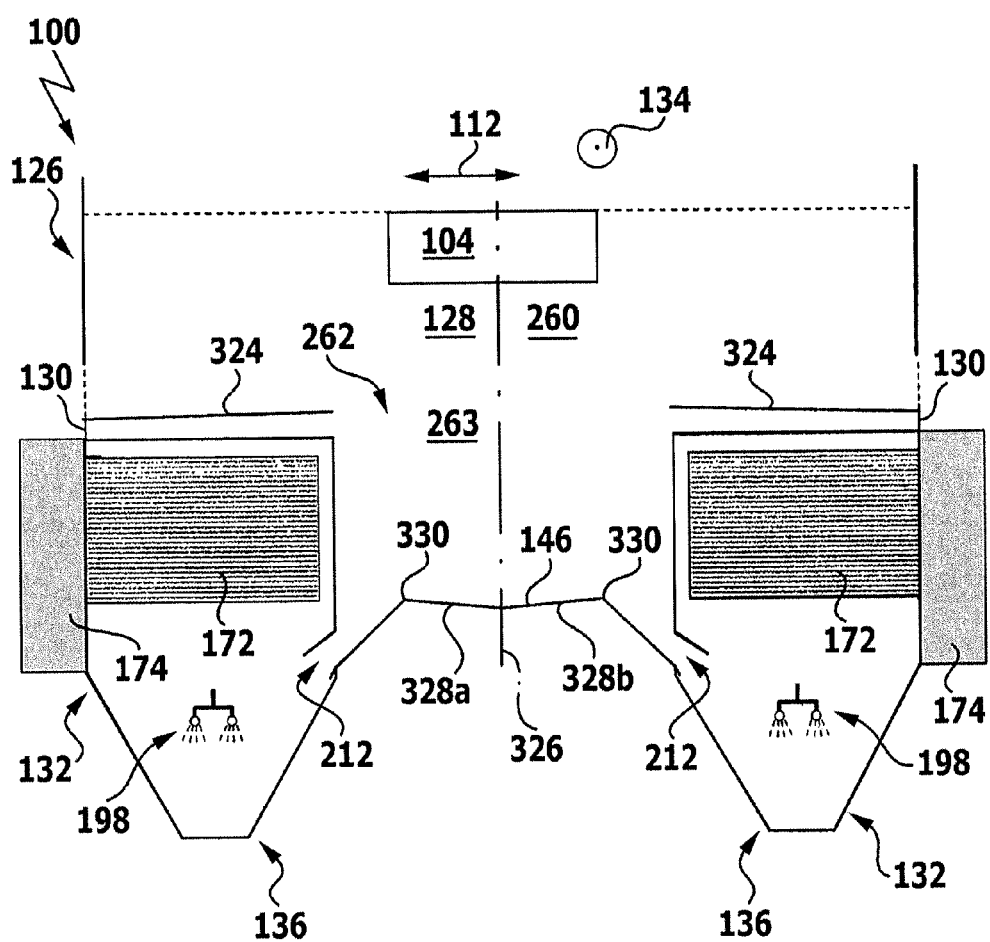
FIG. 20 a schematic vertical cross section through a second embodiment of a device for separating fluid paint overspray from an exhaust air stream containing overspray particles which comprises inclined flow guide plates for guiding a transverse air flow and an accessible gangway having an inclined upper surface between the filter modules.

A second embodiment of a plant 100 for painting vehicle bodies 102 which is illustrated in FIG. 20 in the form of a schematic cross section differs from the previously described first embodiment in that separate transverse air curtain guide plates 324, which serve to guide the air that has been supplied by the air curtain production devices 254 towards the narrow section 262 between the upper section 260 and the lower section 263 of the flow chamber 128, are arranged above the filter modules 132.

These transverse air curtain guide plates 324 are inclined relative to the respective neighbouring side wall 130 of the flow chamber 128 at an angle of e.g. approximately 1° to approximately 3° to the horizontal so that liquids landing on the transverse air curtain guide plates 324 from above will not flow off into the narrow section 262, but rather, towards the side walls 130.

It is ensured in this way for example that paint leaking out from the application area 108 due to a burst hose or water originating from a fire-extinguishing process will not enter the lower section 263 of the flow chamber 128 and from there, reach the filter modules 132, but rather it will be able to flow off to the sides of the flow chamber 128.

In this embodiment furthermore, the accessible gangway 146 between the rows of modules 136 is subdivided into two halves 328a, 328b which are formed substantially mirror-symmetrically with respect to a vertical longitudinal centre plane 326 of the flow chamber 128 and are inclined relative to the longitudinal centre plane 326 at an angle of e.g. approximately 1° to e.g. approximately 3° to the respective horizontals so that liquids landing on the accessible gangway 146 from above, such as paint or water originating from a fire-extinguishing action for example, will not spill over the lateral edges 330 of the accessible gangway 146 into the inlet openings 212 of the filter modules 132, but rather, will be retained in the centre of the accessible gangway 146.

In addition, both the accessible gangway 146 and the transverse air curtain guide plates 324 may be inclined to the horizontal in the longitudinal direction 134 of the flow chamber 128 so that the liquids present on these elements can flow off into a drainage opening due to the force of gravity.

As an alternative thereto, the gangway 146 may also comprise a substantially horizontally oriented upper surface.

In all other respects, the second embodiment of a plant 100 for painting vehicle bodies 102 that is illustrated in FIG. 20 corresponds in regard to the construction and functioning thereof with the first embodiment illustrated in FIGS. 1 to 19 so that to this extent, reference may be made to the previous description.

Figure 21:
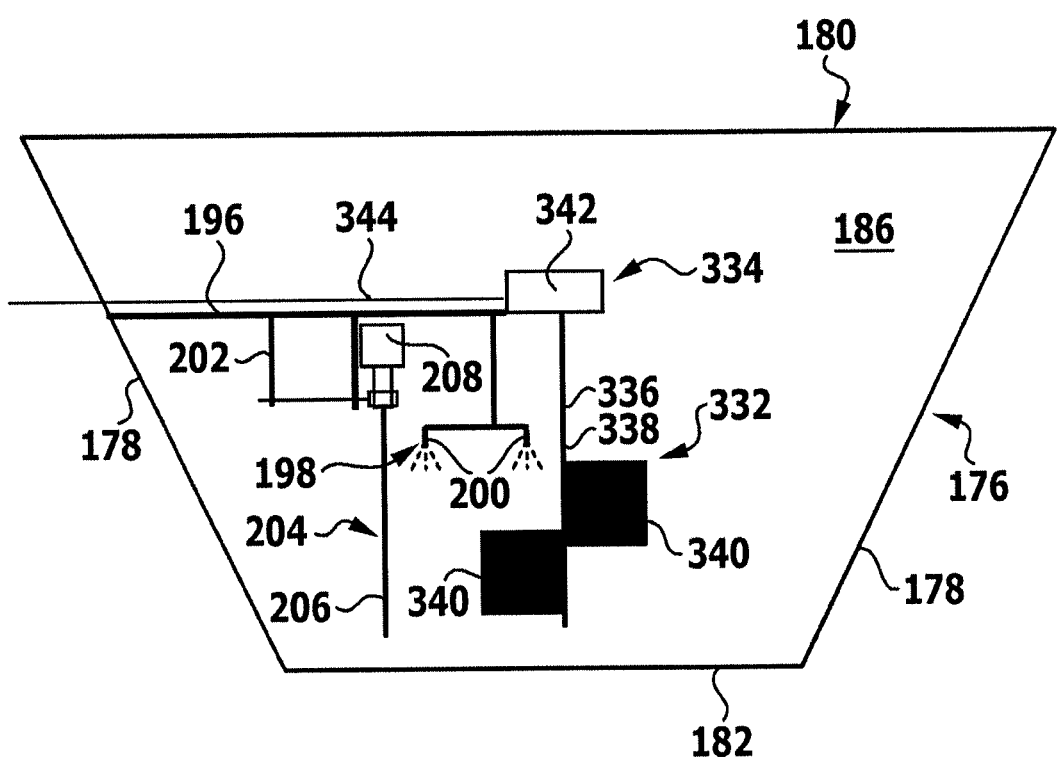
FIG. 21 a schematic vertical cross section through an alternative embodiment of an auxiliary material reservoir which is provided with a pneumatically operated agitator for mixing the material in the auxiliary material reservoir and for homogenizing the contents.
Figure 22:
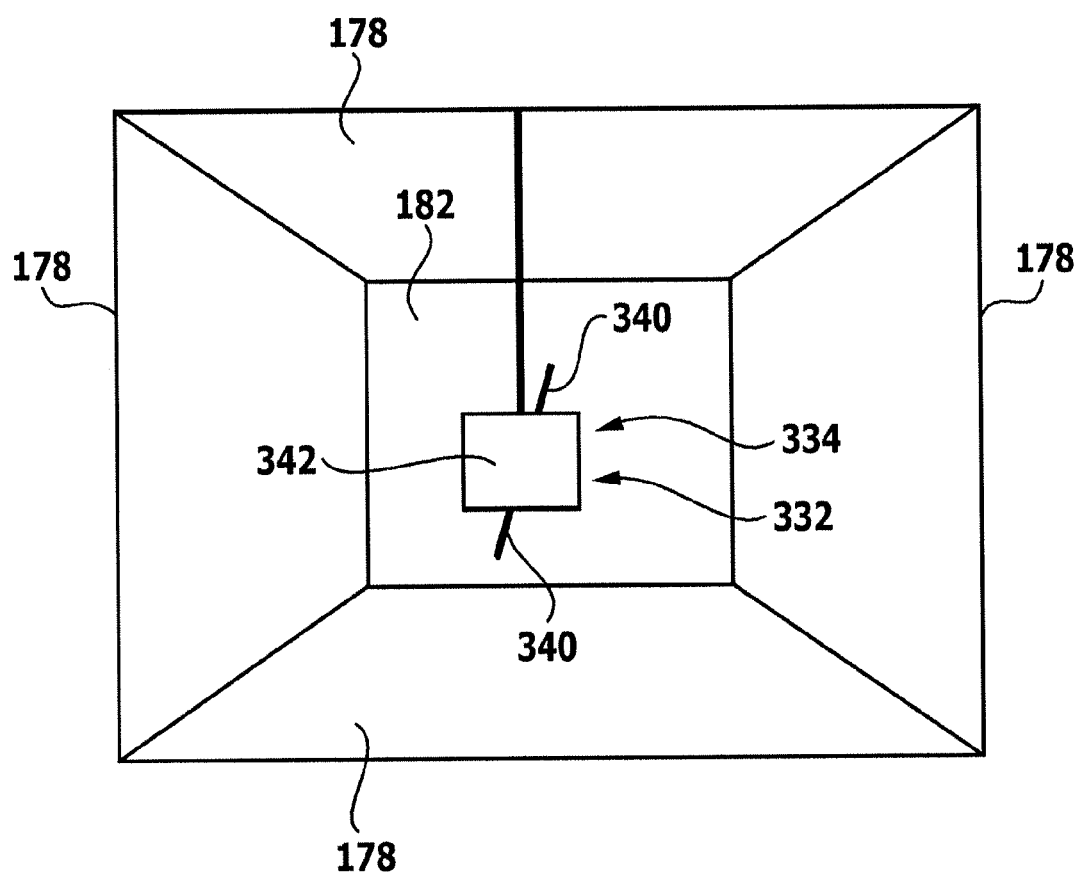
FIG. 22 a schematic plan view from above of the auxiliary material reservoir with a pneumatically operated agitator that is depicted in FIG. 21.

As an alternative or in addition to the fluid base 184 illustrated in FIG. 13, the auxiliary material reservoirs 176 of the filter modules 132 in the previously described plants 100 for painting vehicle bodies 102 could also comprise other types of device 332 for mixing the material present in the auxiliary material reservoir 176, for example, a pneumatically operated agitating device 334 which is illustrated schematically in FIGS. 21 and 22.

The pneumatically operated agitating device 334 comprises an agitator 336 having at least two agitator paddles 340 which are arranged in mutually non-rotational manner on a substantially vertically oriented agitator shaft 338 and an agitator turbine 342 which is illustrated in a purely schematic manner in FIGS. 21 and 22 and by means of which the agitator shaft 338 is settable into rotary motion about its vertical axis.

The agitator paddles 340 are arranged on the agitator shaft 338 such as to be mutually displaced in the axial direction of the agitator shaft 338 and to have an angular displacement of approximately 180° for example.

Compressed air is suppliable to the agitator turbine 342 by way of a compressed air supply line 344.

When compressed air is supplied to the agitator turbine 342 via the compressed air supply line 344, the compressed air being supplied thereto sets the agitator turbine 342 into rotary motion about its vertical axis, whereupon the agitator shaft 338 that is connected to the agitator turbine 342 in mutually non-rotational manner is likewise set in motion.

The material present in the auxiliary material reservoir 176 is thereby mixed by the rotating agitator paddles 340 and the surface of the material located in the auxiliary material reservoir 176 is smoothed. Material bridges that have been formed in the auxiliary material reservoir 176 by an undermining process are broken up.

In this way, thorough mixing of the material in the auxiliary material reservoir 176 and evening-out of the level of the material within the auxiliary material reservoir 176 is obtained.

Due to the pneumatic drive for the agitating device 334, formation of sparks within the auxiliary material reservoir 176 is prevented and adequate protection against the risk of explosion is ensured.

Figure 23:
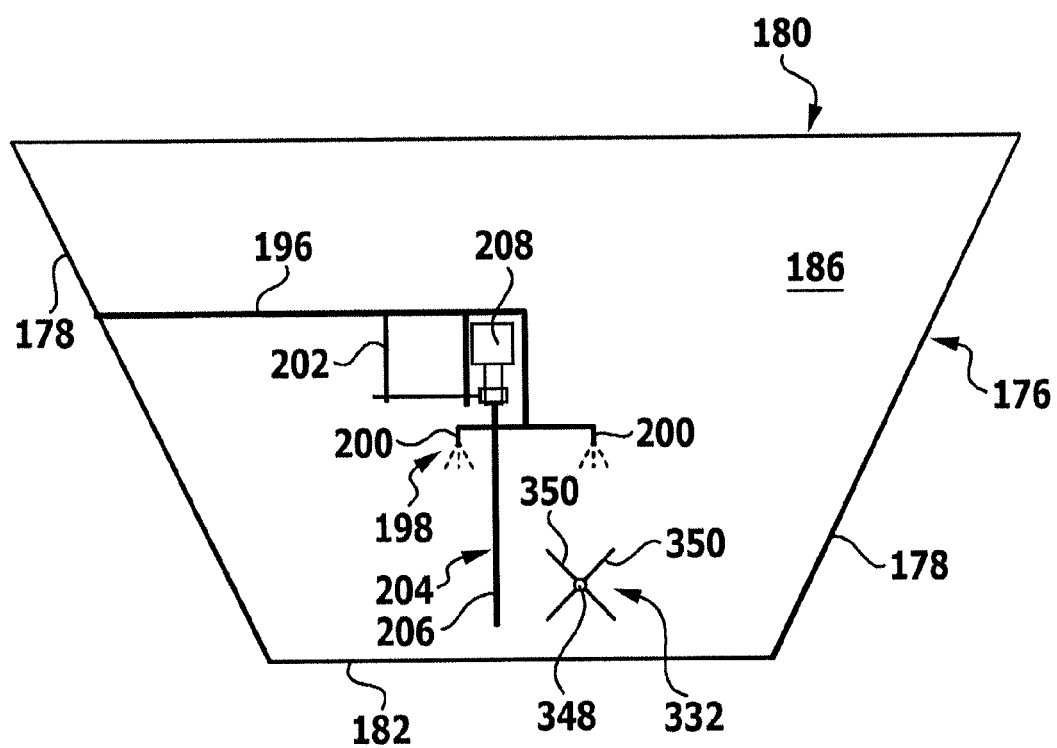
FIG. 23 a schematic vertical section through a further alternative embodiment of an auxiliary material reservoir which is provided with an electrically driven shaft and paddles for mixing the material in the auxiliary material reservoir and homogenizing the contents.
Figure 24:
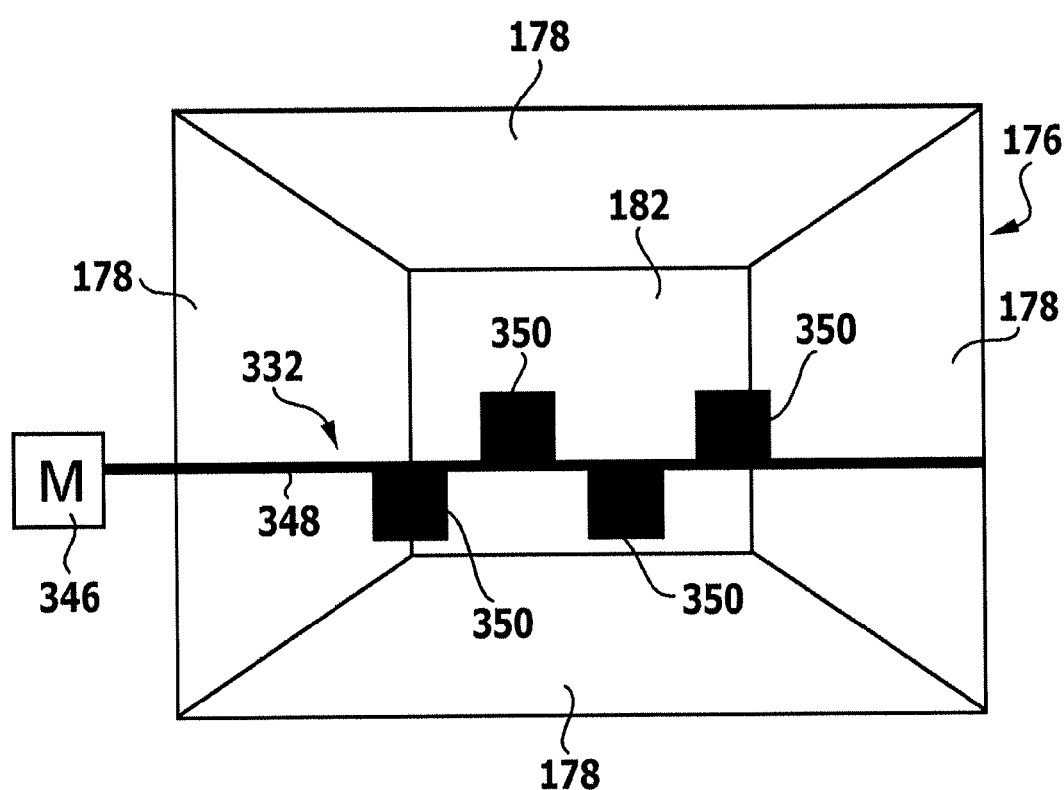
FIG. 24 a schematic plan view from above of the auxiliary material reservoir with an electrically driven shaft that is depicted in FIG. 23.

An alternative embodiment of a device 332 for mixing the material present in the auxiliary material reservoir 176 that is illustrated in FIGS. 23 and 24 comprises an electric motor 346 which is arranged laterally beside the auxiliary material reservoir 176 whilst its drive shaft 348 is passed through a side wall 178 of the auxiliary material reservoir 176 and is provided with a plurality of, four for example, paddles 350 which are fixed to the drive shaft 348 and are arranged thereon such as to be mutually displaced in the axial direction of the drive shaft 348 and to have a respective angular displacement of approximately 90° for example.

The paddles 350 are set into rotary motion about their substantially horizontally oriented axes as a result of the rotation of the drive shaft 348 by means of the electric motor 346, whereby the paddles 350 mix the material present in the auxiliary material reservoir 176 whilst smoothing its surface and breaking up material bridges that have developed in the auxiliary material reservoir 176.

The conversion of a currently existing device 126 for separating fluid paint overspray from a stream of crude gas containing overspray particles can be effected in the following manner by using the filter modules 132 of the previously described plants 100:

Firstly, part of the existing device is dismantled so that the space that is to be occupied by a filter module 132 in its working position is freed up.

Subsequently, a filter module 132 is arranged in the working position that has been freed-up in this manner and it is connected to the support structure for the application area 108 and in particular, to the booth walls 114 of the paint booth 110.

Subsequently, these steps are repeated until all of the filter modules 132 have been arranged in their working position and connected to the support structure for the application area 108.

In this way for example, an existing device for separating fluid paint overspray using a wet process can be replaced by the previously described, modularly constructed device 126 for separating fluid paint overspray using a dry process without any need to dismantle the application area 108 of the plant 100 for painting vehicle bodies 102 for this purpose.

In the case of the previously described devices 126 for separating fluid paint overspray from a stream of crude gas 120 containing overspray particles, each filter module 132 has a separate auxiliary material reservoir 176 associated therewith.

By contrast, in the case of the alternative embodiments of such a device 126 for separating fluid paint overspray that are described below with reference to FIGS. 29 to 33, a plurality of filter modules 132 are associated with the same reservoir 176 for auxiliary material which accommodates the material (auxiliary material and fluid paint overspray) that has been cleaned off the filter elements 172 of this plurality of associated filter modules 132.

In all other respects these embodiments of a device 126 for separating fluid paint overspray from a stream of crude gas containing overspray particles that are illustrated in FIGS. 29 to 33 and the paint shop 100 containing such a device 126 correspond in regard to the construction and functioning thereof with the embodiments that were described hereinabove with reference to FIGS. 1 to 28.

Figure 29:
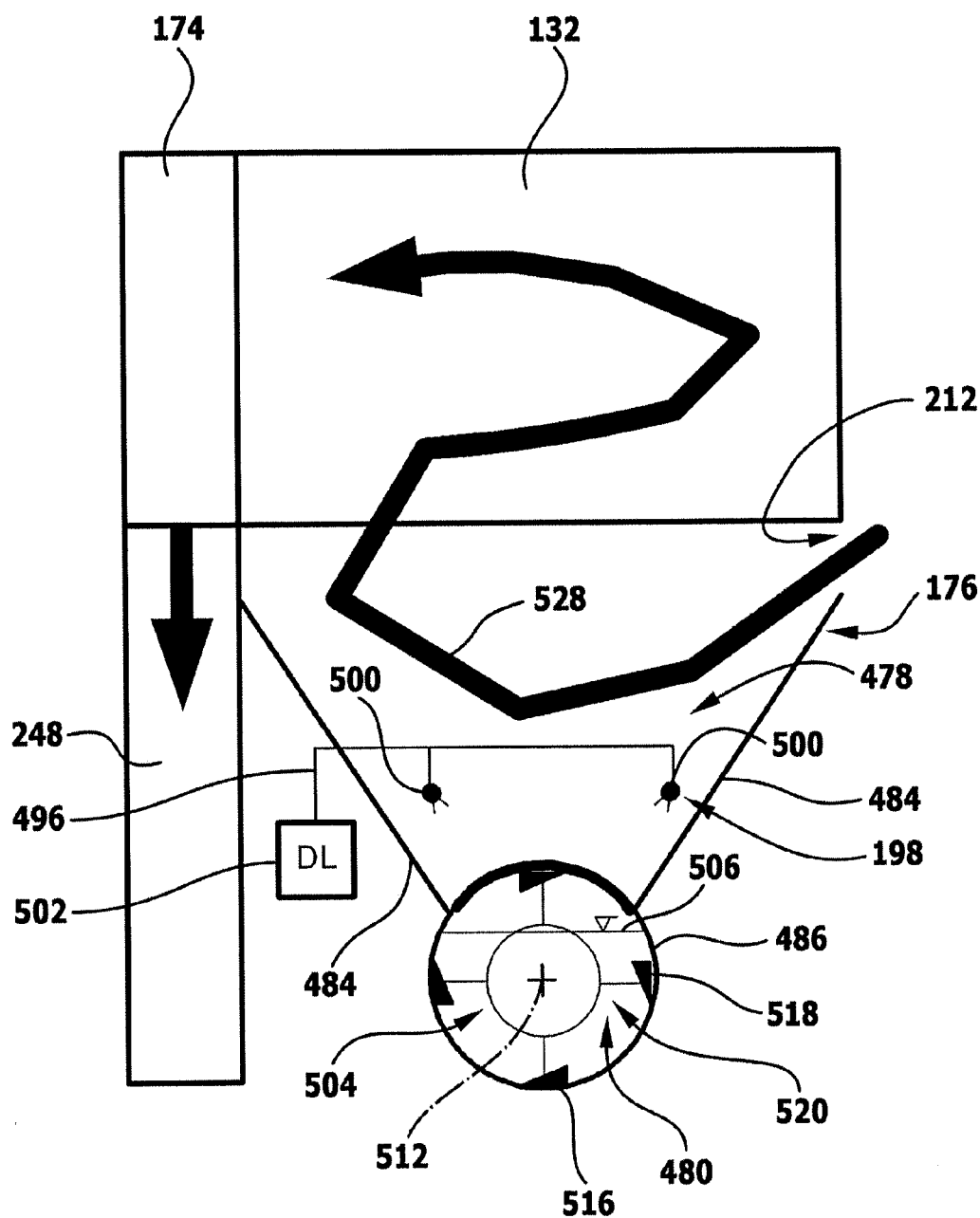
FIG. 29 a schematic cross section through a filter module and a reservoir with a mixing device which is arranged beneath it.
Figure 30:
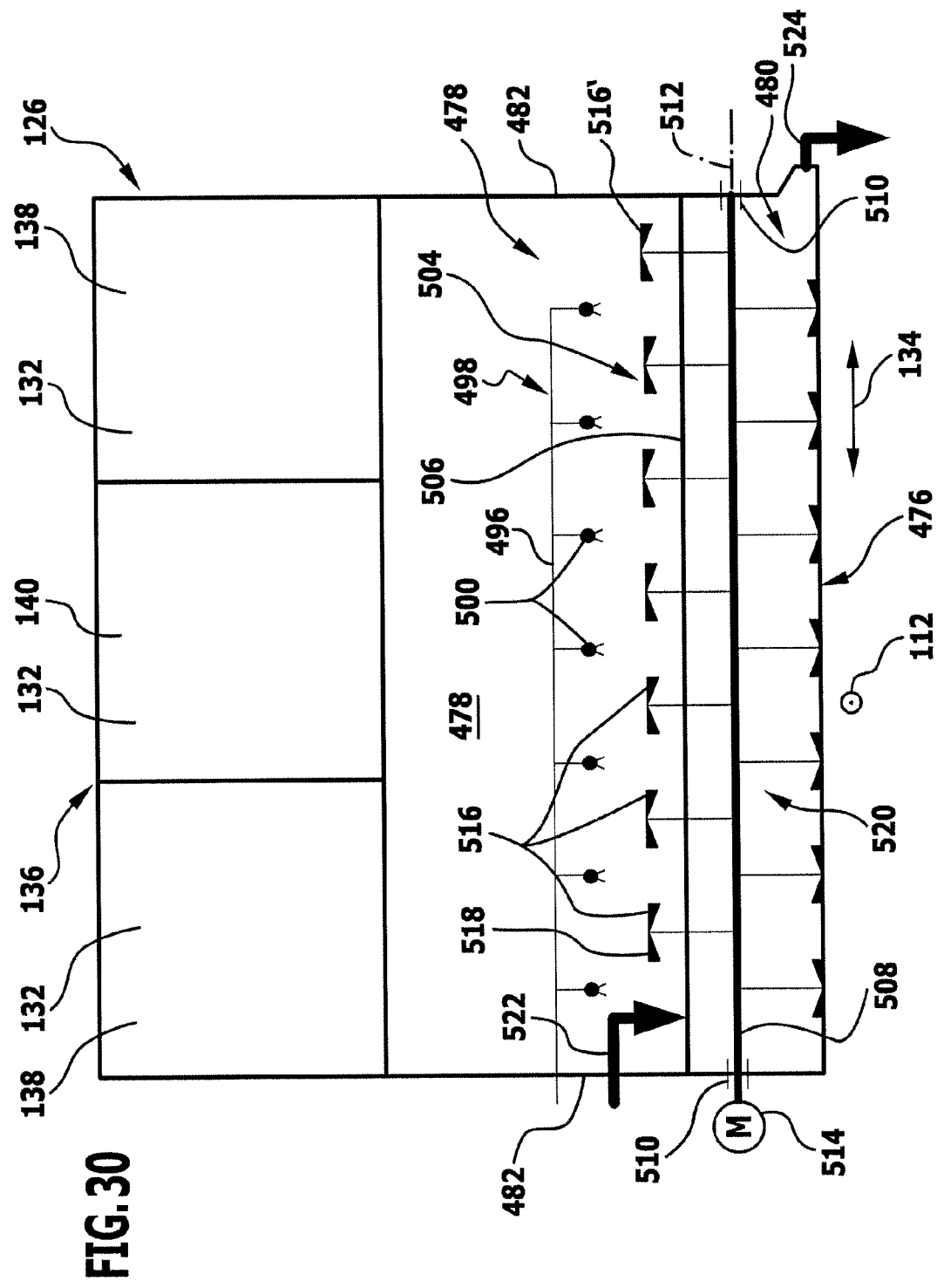
FIG. 30 a schematic longitudinal section through three filter modules that succeed one another in a longitudinal direction of the paint shop and a reservoir with a mixing device which is arranged underneath the filter modules.
Figure 31:
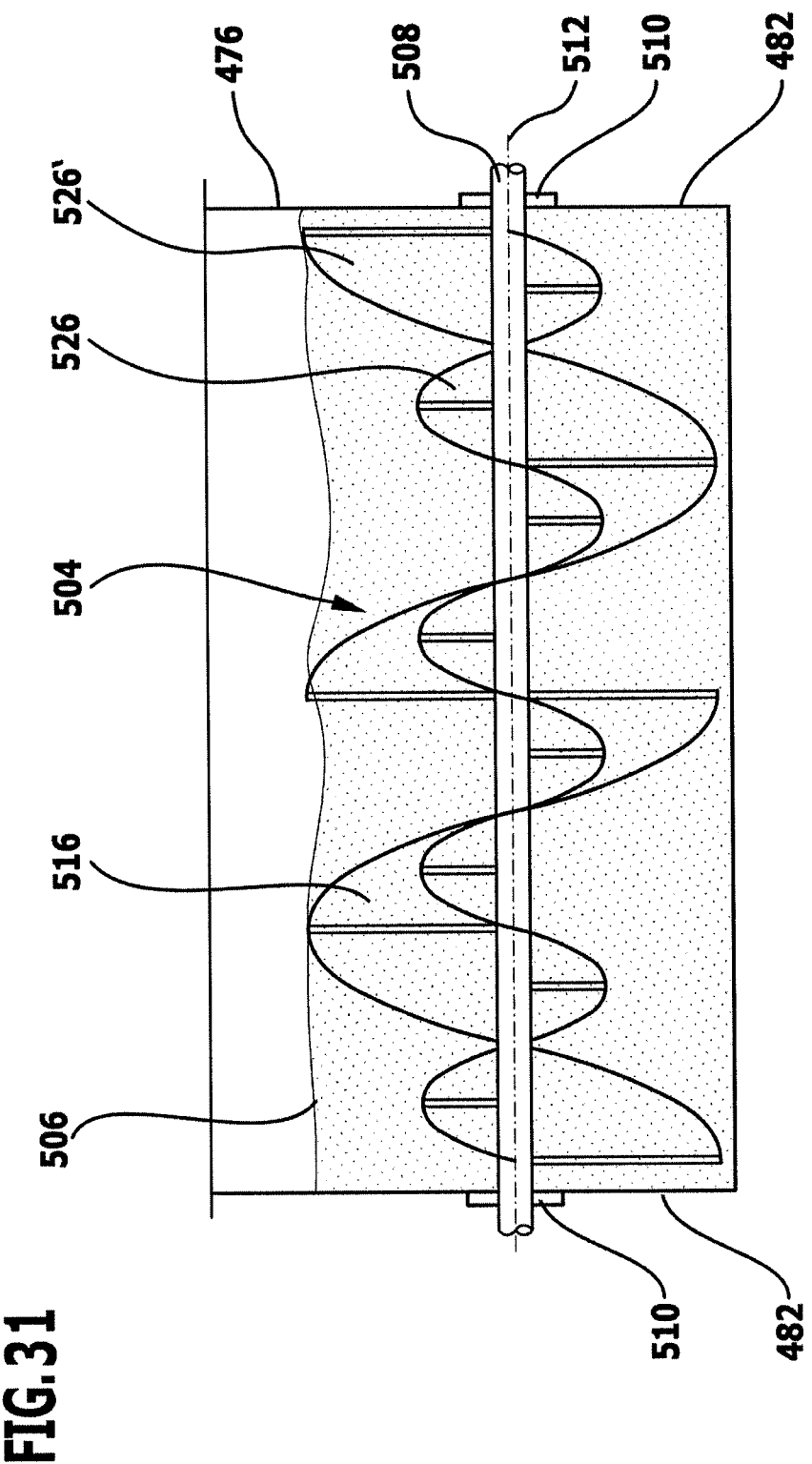
FIG. 31 a schematic side view of a mixing device comprising two helices having opposite directions of rotation which are rotatable about a horizontal axis of rotation.

In order to enable the auxiliary material to be supplied to the stream of crude gas without the danger that the auxiliary material will enter the application area 108 of the paint shop 100, and in order to enable auxiliary material cleaned off the filter elements 172 together with fluid paint overspray to be caught, each group of several e.g. three filter modules 132 is associated in the embodiment of a device 126 for separating fluid paint overspray from the stream of crude gas that is illustrated in FIGS. 29 to 31 with a common reservoir 176 which extends in the longitudinal direction 134 of the device 126 over the entire length of the e.g. three associated filter modules 132 (see FIG. 30).

The reservoir 176 is substantially in the form of a trough and comprises an upper inlet section 478 as well as a mixing section 480 which adjoins the inlet section 478 at the lower end thereof.

The inlet section 478 is bounded by two end walls 482 which extend perpendicularly relative to the longitudinal direction 134 and two mutually opposite side walls 484 which extend from the one end wall 482 up to the other end wall 482 and are inclined to the vertical at an angle of at least approximately 30°.

The mixing section 480 adjoining the lower end of the inlet section 478 is substantially cylindrical and comprises an outer wall 486 which is in the form of a section of a cylinder and extends over a peripheral angle of approximately 270° for example, the upper edges of the outer wall adjoining the lower edges of the side walls 484 of the inlet section 478 of the reservoir 176 so that the mixing section 480 opens out upwardly into the inlet section 478.

A fluidising device 198 which is held on one of the side walls 484 of the inlet section 478 of the reservoir 176 serves to deliver blasts of compressed air into the material accommodated in the reservoir 176 which is located therebelow in order to whirl up this material and thus introduce this material, including the auxiliary material contained therein, into the stream of crude gas which is being passed through the inlet section 478 of the reservoir 176.

When the plant 100 is functioning, the fluidising means 198 is operated intermittently, for example, four times per minute for approximately 5 seconds on each occasion.

The fluidising means 198 comprises a plurality of, at least two per filter module 132 for example, outlet nozzles 500 for the supply of compressed air, the nozzles being in the form of cone jets each of which can produce a cone of compressed air that widens out downwardly towards the mixing section 480 of the reservoir 176.

The outlet nozzles 500 are arranged in a compressed air pipeline 496 which is passed through one of the side walls 484 of the inlet section 478 of the reservoir 176 and leads to a source of compressed air 502 located outside the reservoir 176.

In the mixing section 480 of the reservoir 176, there is arranged a mixing device 504 for effecting the thorough mechanical mixing of the material which has been cleaned off the filter elements 172 of the different filter modules 132 and which fills the mixing section 480 up to a level 506 (FIG. 29).

As can best be perceived from FIG. 30, the mixing device 504 comprises a rotary shaft 508 which extends in parallel with the longitudinal direction 134 of the device 126 and is mounted by means of bearings 510 on the end walls 582 of the reservoir 176 such as to be rotatable about a horizontal axis of rotation 512 running parallel to the longitudinal direction 134.

One end of the rotary shaft 508 is passed in fluid-tight manner through one of the end walls 482 of the reservoir 176 and is coupled to a rotary drive means 514 (an electric drive motor for example) which is located outside the reservoir 176.

The rotary shaft 508 of the mixing device 504 can extend over the entire length of the paint booth 118 of approximately 20 m for example.

The volume of the material required to fill the mixing section 480 of the reservoir 176 can amount to at least 750 l for example.

Several mixing tools 516 which can be in the form of paddles 518 or ploughshares for example are fixed onto the rotary shaft 508 such as to rotate therewith.

The inner contour of the mixing section 580 of the reservoir 176 is adapted to the outer contour of the mixing tools 516 of the mixing device 504 in such a way that, in the course of a complete revolution of the rotary shaft 508 of the mixing device 504 about its axis of rotation 512, the mixing tools 516 sweep over a mixing region 520 having an outer contour which corresponds substantially to the inner contour of the mixing section 480 of the reservoir 176.

Preferably, the mixing device 504 sweeps over substantially the entirety of the mixing section 480 of the reservoir 176 whilst completing a full revolution about its axis of rotation 512.

Due to the mixing movement of the mixing device 504 as it is driven by means of the rotary drive means 514, the binding forces between the particles of which the material in the reservoir 176 consists is destroyed and mixing of the material in the longitudinal direction of the rotary shaft 508 is effected. Due to the mixing movement, there are no differences in concentration within the reservoir 176 and in particular, the proportion of fresh auxiliary material on the one hand to that of the auxiliary material cleaned off the filter elements 172 and fluid paint overspray on the other is substantially equally great everywhere in the reservoir 176.

In order to enable fresh auxiliary material to be supplied to the reservoir 176, an inlet 522 for fresh auxiliary material, which is connected to a (not illustrated) source of fresh auxiliary material, is provided in one end wall 482 of the reservoir 176.

In the end wall 482 facing the inlet 522 for fresh auxiliary material, there is provided a material outlet 524 which is arranged in the lower region of the mixing section 480 close to the lower peak of the cylindrical mixing section 480.

Auxiliary material that has been enriched with fluid paint overspray can be extracted from the reservoir 176 through this material outlet 524 in order to maintain the filling level 506 of the reservoir 176 substantially constant despite the supply of fresh auxiliary material through the inlet 522.

A mixing tool 516' which assists in the process of discharging the material through the material outlet 524 is arranged on the rotary shaft 508 near the material outlet 524, said mixing tool 516' protruding from the rotary shaft 508 in the radial direction or towards an end wall in the axial direction.

Instead of having just one paddle 518 protruding from the rotary shaft 508 in the radial direction, the mixing tools 516 of the mixing device 504 could also be in the form of a helix 526 which is coaxial with the axis of rotation 512 of the mixing device 504.

In particular, the mixing device 504 may be provided with two helices 526, 526' which have mutually opposed directions of rotation.

Hereby, these helices may have the same pitch but different radii.

Due to the opposite directions of rotation of the two helices 526, 526', particularly thorough mixing of the material located in the mixing section 480 is achieved.

Furthermore, due to the action of the mixing device 504, the surface of the material contained in the reservoir 176 is smoothed, and material bridges that may be formed in the reservoir 176 as a result of an undermining process are broken up.

Each filter module 132 is provided with a slot-like inlet opening 212 which is in the form of an inlet channel 214 and has a through-flow cross section narrowing in the direction of flow of the partial stream of crude gas 528 up to a narrow section 240. Hereby, the stream of crude gas entering the filter modules 132 from the flow chamber 128 is subdivided into respective partial streams of crude gas 528 that are associated with a respective filter module 132, these partial streams of crude gas 528 being deliberately diverted into the inlet section 178 of a respective reservoir 176 whereas direct access of the stream of crude gas from the flow chamber 182 to the filter elements 172 is prevented.

The filter elements 172 of the filter modules 132 are cleaned at certain time intervals by bursts of compressed air when the loading thereof with fluid paint overspray and auxiliary material has reached a given level.

This cleaning process may take place (in dependence on the increase in pressure loss across the filter elements 172) once to six times per 8-hour working shift, i.e. approximately every 1-8 hours for example.

In the device 126 for separating fluid paint overspray described hereinabove, the auxiliary material is supplied to the partial streams of crude gas 528 exclusively by the process of whirling up the auxiliary material in the respectively associated reservoir 176.

In order to be able to extract the auxiliary material mixed with overspray that has collected in the reservoir 176 and pass it on for disposal or reprocessing, the device 126 for separating fluid paint overspray comprises a (not illustrated) auxiliary material removal device which is attached to the material outlets 524 of the reservoir 176 and, for example, comprises a suction fan for sucking the material out from the reservoirs 176.

The material containing auxiliary material with overspray particles that has been removed from the reservoirs 176 may either be disposed of or—possibly after reprocessing—at least partly reused in the coating plant.

Figure 32:
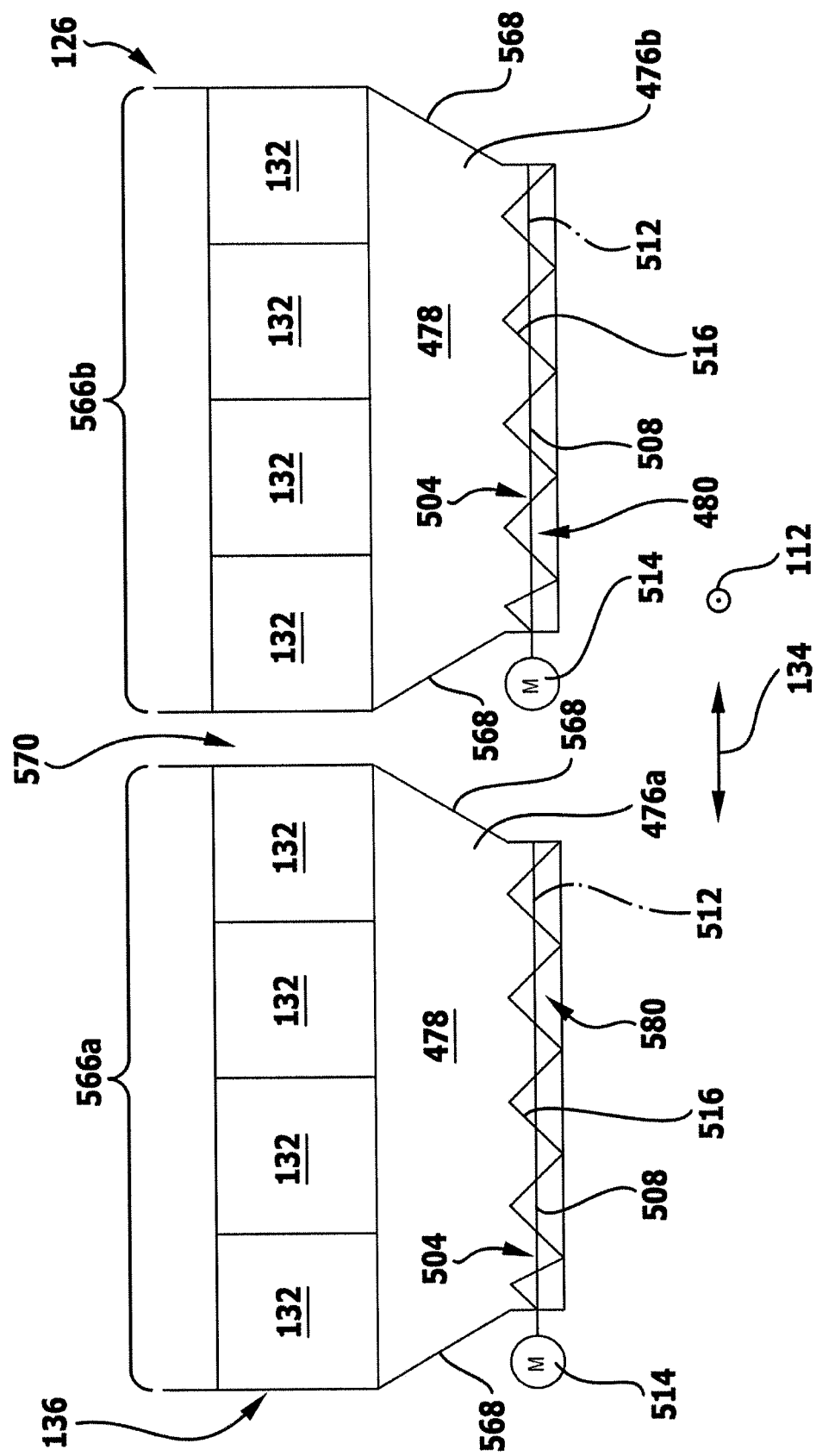
FIG. 32 a schematic side view of two groups each consisting of four filter modules, wherein each group of filter modules is associated with a reservoir having a mixing device for mixing material that has been cleansed from the filter modules of a respective group.

A second embodiment of a device 126 for separating fluid paint overspray that is illustrated in FIG. 32 in the form of a schematic side view of a module row 136, differs from the device 126 described hereinbefore in that not all of the filter modules 132 of a module row 136 that are arranged one behind the other in the longitudinal direction 134 of the device 126 are associated with just one reservoir 176 which extends over the entire length of the module row 136. Instead, each module row 136 is subdivided into a plurality of e.g. two groups of modules 566a, 566b which each comprise a plurality of e.g. four filter modules 132. Each group of modules 566a, 566b is associated with a respective reservoir 176a and 176b which accommodates the material (auxiliary material and fluid paint overspray) that has been cleaned off the filter elements 172 of the filter modules 132 of the respective group of modules of 566a, 566b.

Thus, in this embodiment of the device 126 for separating fluid paint overspray, at least two reservoirs 176a, 176b are arranged successively in the longitudinal direction 134, whereby however, each reservoir 176a, 176b still receives the material cleansed from a plurality of filter modules 132.

Furthermore, each of the reservoirs 176a, 176b comprises a mixing device 504 by means of which the material originating from different filter modules 132 and caught by the respective reservoir 176a, 176b is mixable.

In this embodiment, the end walls 482 of the reservoirs 176a, 176b are not continuous in the vertical direction, but rather, comprise an upper inclined end wall section 568 which borders the inlet section 478 at the front side and is inclined to the vertical in such a manner that the inclined end wall section 568 projects beyond the mixing section 480 of the relevant reservoir 176a, 176b in the longitudinal direction 134.

In consequence, sufficient space for accommodating a rotary drive means 514 for each mixing device 504 can be created below the inclined end wall sections 568 of the reservoirs 176a, 176b that follow each other in the longitudinal direction 134 and between the end walls of the mixing sections 480 of this reservoir 176a, 176b.

Furthermore, care should be taken to ensure that sufficient space is made available between the exhaust air pipes 248 and the storage tanks 176a, 176b for installing the rotary shaft 508 of each mixing device 504.

The groups of modules 566a, 566b which are arranged one behind the other in the longitudinal direction 134 of the device 126 may be associated with different paint booths or with differing painting sections within the same paint booth, for example a painting section for the interior paintwork of the vehicle bodies 102 on the one hand and a painting section for the external finish of the vehicle bodies 102 on the other.

As an alternative thereto, provision could also be made for different types of paint to be applied to the vehicle bodies 102 in the different painting sections with which the groups of modules 566a, 566b are associated, for example a primer on the one hand and a clear lacquer on the other.

Paint is not applied to the vehicle bodies 102 in that area of the paint shop located above the area between the groups of modules 566a, 566b.

In all other respects, the embodiment of a device 126 for separating fluid paint overspray which is illustrated in FIG. 32 corresponds in regard to the construction and functioning thereof with the embodiment illustrated in FIGS. 29 to 31 and so to this extent reference is made to the preceding description.

Figure 33:
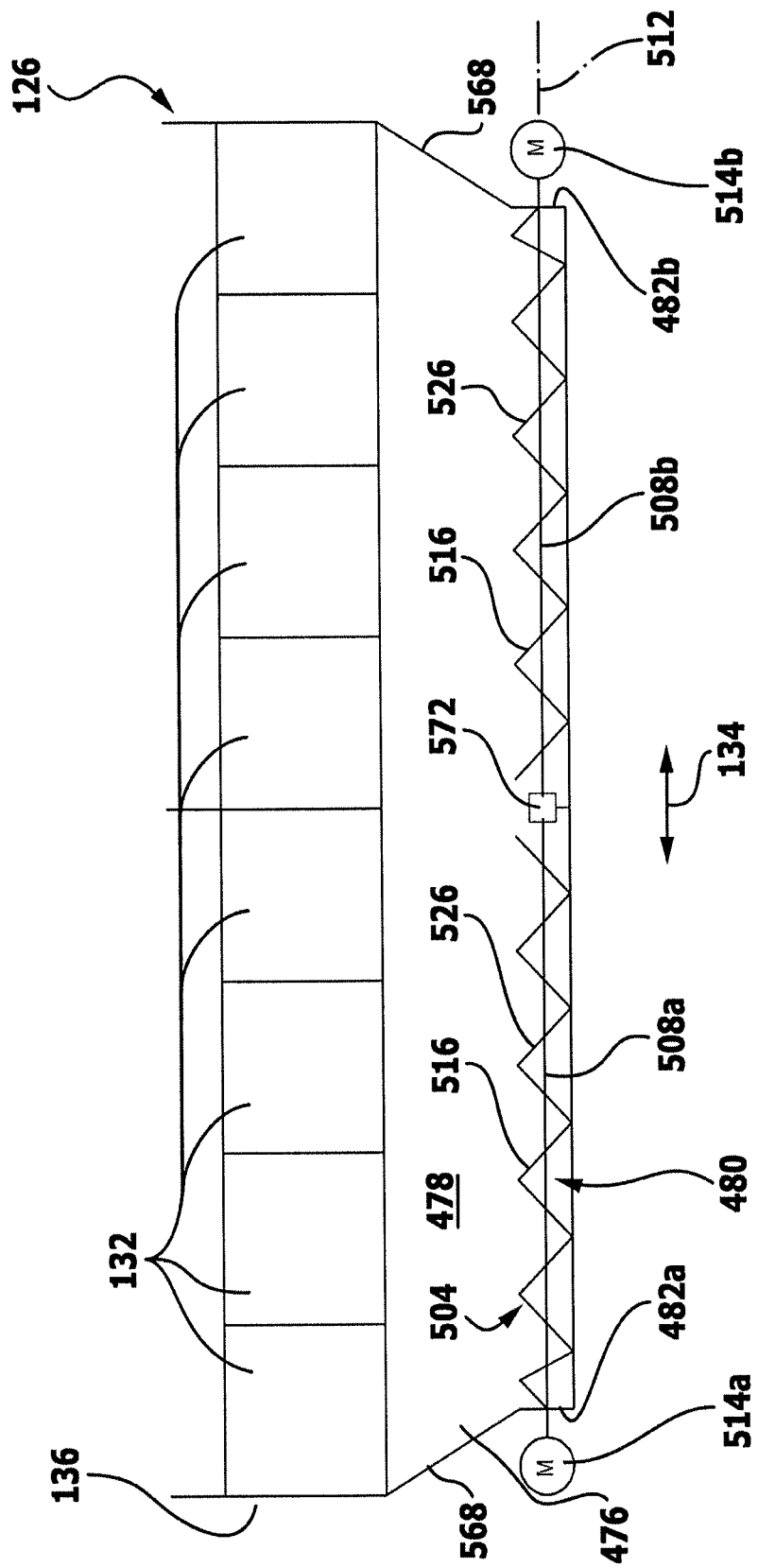
FIG. 33 a schematic side view of a group of eight filter modules, wherein a single long reservoir is associated with this large group of filter modules, and wherein the mixing device of said reservoir has two shafts for holding mixing tools that are rotatable about a substantially horizontally oriented axis of rotation, said tools being arranged one behind the other in the direction of the axis of rotation.

An embodiment of a device 126 for separating fluid paint overspray which is illustrated in FIG. 33 in the form of a schematic side view of a module row 136 differs from the embodiment illustrated in FIGS. 29 to 31 in that the number of filter modules 132 associated with the same reservoir 176 is larger (eight filter modules 132 for example). In consequence, the extent of the reservoir 176 in the longitudinal direction 134 of the device 126 is very large (being 16 m or more for example).

In the case of a reservoir 176 of such great length, a very high powered rotary drive means 514 would have to be used in order to set in motion a rotary shaft 508 which is provided with mixing tools 516 and extends over the entire length of the reservoir 176.

Consequently, in the case of the embodiment illustrated in FIG. 33, provision is made for the mixing device 504 to comprise two rotary shafts 508a, 508b which succeed one another in the longitudinal direction 134 and in the direction of the common axis of rotation 512 and each of which is driven by its own rotary drive means 514a, 514b, said drive means being respectively mounted in rotatable manner on the front end wall 482a and on the rear end wall 482b of the reservoir 176 as well as in a bearing 572 in the centre of the reservoir 176.

Each of the rotary shafts 508a, 508b is provided with one or more mixing tools 516, with helices 526 for example, for mixing the material accommodated in the reservoir 176.

Due to the mixing tools 516 being shared between two mutually separately mounted and independently driven rotary shafts 508a, 508b, the driving power of the rotary drive means 514a, 514b which is required for producing the rotary motion of the mixing tools 516 can be reduced.

In this embodiment too, the end walls 482a, 482b of the reservoir 176 are not continuous in the vertical direction, but rather comprise an upper inclined end wall section 568 which borders the inlet section 478 at the front side and is inclined to the vertical in such a manner that the inclined end wall section 568 projects beyond the mixing section 480 of the reservoir 176 in the longitudinal direction 134.

In consequence, sufficient space for accommodating a respective rotary drive means 514a, 514b for the mixing device 504 can be created below the inclined end wall sections 568.

In all other respects, the embodiment of a device 126 for separating fluid paint overspray which is illustrated in FIG. 33 corresponds in regard to the construction and functioning thereof with the embodiment illustrated in FIGS. 29 to 32, and so to this extent reference is made to the preceding description.

Figure 34:
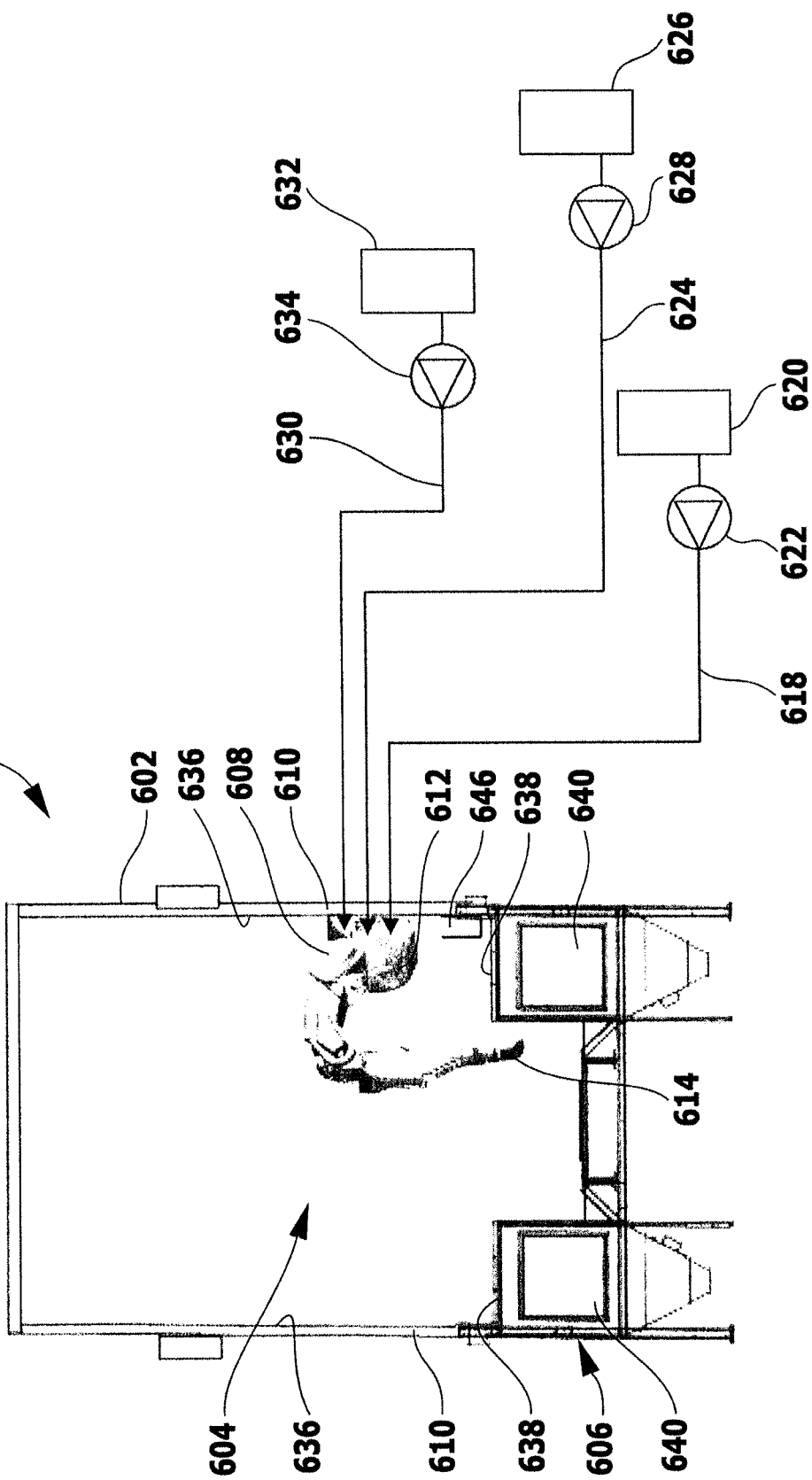
FIG. 34 a schematic vertical cross section through a paint shop with an application unit arranged on a painting robot.
Figure 35:
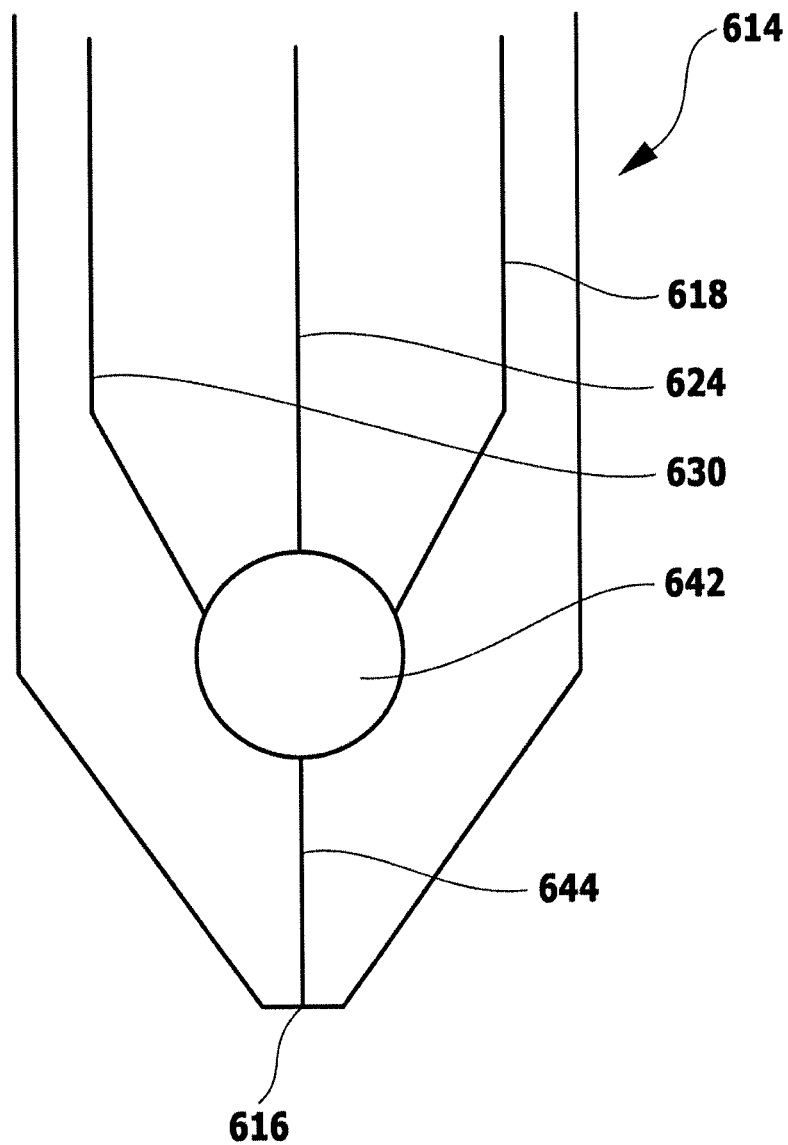
FIG. 35 a schematic side view of the application unit depicted in FIG. 34.

A further embodiment of a paint shop 100 that is illustrated in FIGS. 34 and 35, differs from the embodiments of such a plant described hereinabove in regard to the construction of the painting devices and in particular, of the application units in these painting devices. The special construction of these painting devices and of the application area of the paint shop 100 described below may be combined with each of the embodiments and manner of functioning of a device 126 for separating fluid paint overspray from the stream of crude gas containing overspray particles that have been described hereinabove.

The basic construction of the further embodiment of a paint shop 100 illustrated in FIGS. 34 and 35 is known from DE 10 2005 048 579 A1 for example, so that to this extent, reference is made thereto and the contents thereof are incorporated in this description.

The paint shop 100 illustrated in FIG. 34 in the form of a cross section comprises a paint booth 602 having an application area 604, a (not illustrated) plenum arranged above the paint booth 602 through which air is supplied to the paint booth 602, and a filter room 606 which is arranged underneath the paint booth 602 and wherein air that has been subjected to paint overspray in the paint booth 602 is cleaned.

Vehicle bodies are conveyable through the application area 604 in the paint booth 602 by means of a (not illustrated) conveyor device.

For the purposes of painting the vehicle bodies within the application area 604 of the paint booth 602, a painting device 608 is arranged in the paint booth 602.

The painting device 608 comprises a painting robot 612 which, for example, is arranged on a side wall 610 of the paint booth 602 and carries an application unit 614 in the form of a paint applicator for applying paint to the vehicle bodies.

The application unit 614 is arranged on a moveable end of the painting robot 612. An outlet opening 616 of the application unit 614 (see FIG. 35) can thus be directed toward a plurality of surfaces of the vehicle bodies in order to enable the vehicle bodies to be painted in a particularly simple manner.

The painting device 608 has a first supply line 618 for supplying a first paint from a first paint tank 620 to the application unit 614 by means of a first pump 622 arranged in the first supply line 618 and a second supply line 624 for supplying a second paint from a second paint tank 626 to the application unit 614 by means of a second pump 628 that is arranged in the second supply line 624.

A choice can thus be made between two different paints for painting the vehicle bodies by means of the painting device 608.

Furthermore, the outlet opening 616 of the application unit 614 can be directed toward a plurality of surfaces of the paint shop 100, which are not to be painted, by means of the painting robot 612 in order to provide them with a protective layer.

To this end, the painting device 608 has a third supply line 630 for supplying a medium from a medium tank 632 to the application unit 614, wherein a third pump 634 is provided in the third supply line 630 in order to supply the medium from the medium tank 632 by way of the third supply line 630 to the application unit 614.

The application unit 614 thus also serves as a medium delivery device.

The medium contained in the medium tank 632 is a medium which differs from the paint used for painting the vehicle bodies. In particular, the medium is a layer-forming medium.

A layer-forming medium for example is a precoat material or an auxiliary material which comprises, in particular, chalk, stone dust, aluminium silicate, aluminium oxide, silicon oxide, powder coating and/or the like. Furthermore, the layer-forming medium may comprise a substance which has chemically reactive groups such as amine groups for example.

The layer-forming medium is applicable by means of the application unit 614, in particular, to those surfaces of the paint shop 100 which are subjected to paint overspray when the paint shop 100 is performing a painting operation.

Such surfaces of the paint shop 100 are, in particular, the inner faces 636 of the side walls 610 of the paint booth 602, the upper surfaces 638 of the filter devices 640 arranged in the filter room 606 and a (not illustrated) grating base that is arranged between the paint booth 602 and the filter room 606.

Due to the application of the layer-forming medium onto surfaces that are subjected to paint overspray when the paint shop 100 is performing a painting operation, the paint overspray does not adhere directly to the surfaces of the paint shop 100, but rather, to a protective layer formed by means of the medium or it reacts chemically therewith so that a simple process for cleansing paint overspray from the surfaces of the paint shop 100 is ensured.

It is thereby possible in particular, to provide a process for cleaning the surfaces of the paint shop 100 that are contaminated with paint overspray wherein the contaminated surfaces of the paint shop 100 are subjected to a cleaning medium by means of the application unit 614.

After a cleaning process and especially when using an aqueous cleaning medium, the cleansed surfaces of the paint shop 100 are subjectable to a drying medium by means of the application unit 614.

For the purposes of switching between a paint delivery mode and a medium delivery mode of the painting device 608, there is provided a switching device 642 which is arranged on the application unit 614 for example (see FIG. 35).

A fluid connection between the first supply line 618 and a delivery line 644 that opens out into the outlet opening 616 of the application unit 614, between the second supply line 624 and the delivery line 644, or, between the third supply line 630 and the delivery line 644 is selectively producible by means of the switching device 642.

In order to prevent paint being applied to a surface which is not to be painted, or to prevent a vehicle body which is to be painted from having an e.g. layer-forming medium applied thereto, the painting device 608 comprises a reservoir 646 which is suppliable with any paint that is still disposed in the delivery line 644 when switching from a paint delivery mode into another paint delivery mode or into a medium delivery mode and/or with the medium that is still disposed in the delivery line 644 when switching from a medium delivery mode into a paint delivery mode or into another medium delivery mode.

In order to enable the application unit 614 to be supplied with mutually differing media, one could, on the one hand, arrange for the medium tank 632 to be replaceable.

On the other hand, one could provide further (not illustrated) supply lines which lead from further (not illustrated) medium containers to the switching device 642 so that a selection can be made there not just between different paints from the first paint tank 620 and the second paint tank 626 and a medium from the medium tank 632 but additionally, from a plurality of medium tanks containing different media.

The paint shop 100 described hereinabove functions as follows:

Before introducing a vehicle body by means of the conveyor device into the application area 604 of the paint booth 602 of the paint shop 100, a protective layer is applied to the surfaces of the paint shop 100 that will be subjected to paint overspray when a painting operation is occurring in the paint shop 100.

To this end, the outlet opening 616 of the application unit 614 of the painting device 608 is directed towards a surface such as the inner surfaces 636 of the side walls 610 of the paint booth 602 for example, onto which a layer-forming medium is to be applied.

The switching device 642 is switched into a medium delivery mode in which the third supply line 630 is in fluid connection with the delivery line 644 of the application unit 614 so as to supply a layer-forming medium from the medium tank 632 to the outlet opening 616 of the application unit 614 and thus to the inner surfaces 636 of the side walls 610 of the paint booth 602.

The medium is sucked in from the medium tank 632 and supplied by way of the third supply line 630 to the switching device 642 of the application unit 614 by means of the third pump 634.

Subsequently, further surfaces which are to be protected such as the upper surfaces 638 of the filter devices 640 or the (not illustrated) grating base of the paint booth 602 for example, have the layer-forming medium applied thereto so that a protective layer is formed on surfaces that may be subjected to paint overspray when a painting operation is occurring in the paint shop 100.

After these method steps have been concluded, the fluid connection between the third supply line 630 and the delivery line 644 is interrupted by means of the switching device 642 and, for example, a fluid connection is established between the first supply line 618 and the delivery line 644.

In order to supply the medium that is still present in the delivery line 644 to the reservoir 646, the outlet opening 616 is directed towards an interior space of the reservoir 646 and paint is supplied from the first paint tank 620 to the application unit 614 by means of the first pump 622 until such time as the delivery line 644 no longer contains any medium.

As an alternative or in addition thereto, provision may be made for the delivery line 644 to be rinsed with a detergent between the processes of delivering medium and delivering paint.

A vehicle body being conveyed to the paint booth 602 by means of the conveyor device is then painted in known manner by means of the application unit 614 of the painting device 608 which is arranged on the painting robot 612.

Hereby, the paint emerging from the outlet opening 616 is not applied in its entirety to the vehicle body being painted. Rathermore, paint overspray is formed and this falls down onto surfaces of the paint shop 100 that are not to be painted.

Due to the protective layer that has been previously applied to these surfaces by means of the application unit 614 of the painting device 608, the paint overspray does not adhere directly to the surfaces of the paint shop 100, but rather, to the protective layer that has been formed by means of the layer-forming medium or else it reacts chemically therewith.

After one or more painting processes and the removal from the paint booth 602 of the last vehicle body to have been painted in the paint booth 602, there follows a simple cleaning of the surfaces of the paint shop 100 that have been subjected to paint overspray whereby the protective layer formed by means of the layer-forming medium together with the paint overspray adhering thereto is removed from the surfaces of the paint shop 100.

This can be effected by a manual cleaning process for example.

As an alternative or in addition thereto, an automatic cleaning process can be effected by means of the application unit 614 of the painting device 608. To this end, the medium tank 632, which contains the layer-forming material, is replaced by another medium tank 632 which contains an aqueous cleaning medium for example.

After a change-over process has occurred at the switching device 642 for the purposes of establishing a fluid connection between the third supply line 630 and the delivery line 644, the surfaces of the paint shop 100 to which the layer-forming medium was previously applied are now subjected to the cleaning medium, whereby the protective layer that was formed by means of the layer-forming medium and has now absorbed the paint overspray is removed from the surfaces of the paint shop 100.

Thereafter, the material of the protective layer contaminated with paint overspray is removed from the paint shop 100 either manually or by means of (not illustrated) conveyor belts.

After the cleaning process, the medium tank 632 containing the cleaning medium is replaced by a medium tank 632 containing a drying medium such as a gaseous medium for example, and the cleansed surfaces of the paint shop 100 are subjected to the drying medium by means of the application unit 614.

As soon as the cleansed surfaces of the paint shop 100 are dry, the medium tank 632 containing the drying medium is replaced by the medium tank 632 which contains the layer-forming medium.

The paint shop 100 is in this way returned to its starting state so that a further coating process can be started in preparation for the painting operation of the paint shop 100.

Due to the fact that a stream of a medium forming a layer differing from a paint that is used for painting the workpieces is deliverable by means of the application unit for the purposes of applying a layer to a surface, the painting device is employable in a flexible and space-saving manner and comprises just a small number of components.

All the individual features of the different embodiments of paint shops 100 that have been described hereinabove may be freely and arbitrarily combined with the individual features of the other embodiments described, namely, both in regard to their construction as well as in regard to their use and manner of operation.

The invention claimed is:

1. A paint shop, comprising
    at least one painting device incorporating at least one application unit for painting workpieces with a fluid paint and
    a device for separating fluid paint overspray from a stream of crude gas which comprises at least one filter element for separating the overspray from the stream of crude gas,
    wherein the device for separating fluid paint overspray from a stream of crude gas comprises at least one filter device which incorporates at least one filter element for separating the overspray from the stream of crude gas and
    at least one auxiliary material reservoir for accommodating an auxiliary material,
    wherein the filter device comprises at least one inlet opening through which the stream of crude gas enters the filter device,
    wherein the inlet opening is configured and oriented in such a manner that the stream of crude gas enters the filter device such that it is directed into the auxiliary material reservoir in such a way that it is diverted in an interior space of the auxiliary material reservoir, and
    wherein the inlet opening is in the form of an inlet channel extending in a direction of flow of the stream of crude gas and having a through-flow cross section which narrows in the direction of flow of the stream of crude gas up to a narrow section.

2. A paint shop in accordance with claim 1, wherein the auxiliary material reservoir is provided with a balance.

3. A paint shop in accordance with claim 1, wherein the at least one filter device is in the form of a unit comprising the following:
- a filter element accommodating chamber for accommodating at least one filter element for separating the overspray from the stream of crude gas; and
- at least one partition wall for separating the filter element accommodating chamber from a flow chamber of the device for separating fluid paint overspray through which the crude gas stream flows before its entry into the unit.

4. A method for the operation of a paint shop, comprising the following processing steps:
- applying fluid paint to workpieces that are to be painted by means of at least one application unit of at least one painting device;
- introducing a stream of crude gas containing overspray particles into a filter device; and
- separating the overspray from the stream of crude gas by means of at least one filter element arranged in the filter device;
- wherein the stream of crude gas is introduced into the filter device through at least one inlet opening in such a way that the stream of crude gas enters the filter device such as to be directed into an auxiliary material reservoir for accommodating an auxiliary material, wherein the stream of crude gas is diverted in an interior space of the auxiliary material reservoir, and
- wherein the inlet opening is in the form of an inlet channel extending in a direction of flow of the stream of crude gas and having a through-flow cross section which narrows in the direction of flow of the stream of crude gas up to a narrow section.

5. A method in accordance with claim 4, wherein the auxiliary material is supplied to the stream of crude gas loaded with fluid paint overspray,
wherein a mixture of auxiliary material and fluid paint overspray is arranged in the auxiliary material reservoir and the weight or the mass of the mixture in the auxiliary material reservoir is determined by means of a balance.

6. A method in accordance with claim 4, wherein an auxiliary material reservoir is used which is provided with an agitator and a balance.

7. A method according to claim 4, wherein the workpieces that are to be painted are vehicle bodies.

8. A method for the operation of a paint shop, comprising the following processing steps:
- applying fluid paint to workpieces that are to be painted, by means of at least one application unit of at least one painting device;
- introducing a stream of crude gas containing overspray particles into a filter device; and
- separating the overspray from the stream of crude gas by means of at least one filter element arranged in the filter device;
- wherein an auxiliary material is supplied to the stream of crude gas loaded with fluid paint overspray,
- wherein a mixture of auxiliary material and fluid paint overspray is arranged in an auxiliary material reservoir and the weight or the mass of the mixture in the auxiliary material reservoir is determined by means of a balance,
- wherein material is whirled up from the auxiliary material reservoir and an effectiveness of the material contained in the auxiliary material reservoir is determined by a comparison of the weight or the mass of the material contained in the auxiliary material reservoir prior to a whirling-up phase and after the whirling-up phase, and
- wherein the stream of crude gas is introduced into the filter device through at least one inlet opening in such a way that the stream of crude gas enters the filter device such as to be directed into the auxiliary material reservoir for accommodating the auxiliary material,
- wherein the stream of crude gas is diverted in an interior space of the auxiliary material reservoir.

9. A method in accordance with claim 8, wherein material is extracted from the auxiliary material reservoir when a difference of the weight or mass of the material contained in the auxiliary material reservoir prior to the whirling-up phase and after the whirling-up phase falls below a given minimum value.

10. A method in accordance with claim 8, wherein the weight or the mass of material in an auxiliary material reservoir is measured by means of a balance prior to and after a whirling-up cycle during which a plurality of whirling-up phases are carried out, and the amount of material that has been withdrawn from the auxiliary material reservoir is determined by formulating the difference.

11. A method in accordance with claim 10, wherein the effectiveness of the material contained in the auxiliary material reservoir is determined by a comparison of the weight or the mass of the material contained in the auxiliary material reservoir prior to the whirling-up cycle and after the whirling-up cycle.

12. A method according to claim 8, wherein the workpieces that are to be painted are vehicle bodies.

* * * * *